US008281899B2

(12) United States Patent
Sutcliffe

(10) Patent No.: US 8,281,899 B2
(45) Date of Patent: Oct. 9, 2012

(54) METHODS AND APPARATUS FOR GENERATING FOOD BROKERING MENUS

(75) Inventor: Eric Sutcliffe, Ventura, CA (US)

(73) Assignee: Order Inn, Inc., Las Vegas, NV (US)

(*) Notice: Subject to any disclaimer, the term of this patent is extended or adjusted under 35 U.S.C. 154(b) by 1501 days.

(21) Appl. No.: 11/082,450

(22) Filed: Mar. 17, 2005

(65) Prior Publication Data

US 2006/0090966 A1   May 4, 2006

Related U.S. Application Data

(60) Provisional application No. 60/614,301, filed on Sep. 29, 2004.

(51) Int. Cl.
*G06Q 30/00* (2012.01)
*G06Q 50/00* (2012.01)

(52) U.S. Cl. ............................. 186/38; 705/15

(58) Field of Classification Search .............. 186/38, 186/35, 36; 705/1, 15, 53, 64, 77, 78, 300, 705/346; 434/82, 93, 127; 379/36, 133, 379/134, 201.01; 709/219, 239
See application file for complete search history.

(56) References Cited

U.S. PATENT DOCUMENTS

| | | | |
|---|---|---|---|
| 3,806,652 A * | 4/1974 | Woolf et al. | 379/127.03 |
| 4,111,696 A * | 9/1978 | Sirlin | 396/340 |
| 4,862,497 A | 8/1989 | Seto | |
| 5,651,058 A * | 7/1997 | Hackett-Jones et al. | 379/93.13 |
| 5,815,665 A | 9/1998 | Teper | |
| 5,987,116 A | 11/1999 | Petrunka | |
| 6,024,278 A | 2/2000 | Martin | |
| 6,026,375 A | 2/2000 | Hall | |
| 6,310,873 B1 | 10/2001 | Rainis | |
| 6,490,350 B2 | 12/2002 | McDuff | |
| 6,646,659 B1 * | 11/2003 | Brown et al. | 715/811 |
| 6,764,003 B1 | 7/2004 | Martschitsch | |
| 6,845,155 B2 | 1/2005 | Elsey | |
| 6,850,901 B1 * | 2/2005 | Hunter et al. | 705/26.35 |
| 6,906,643 B2 * | 6/2005 | Samadani et al. | 340/995.18 |
| 6,959,079 B2 * | 10/2005 | Elazar | 379/265.06 |
| 7,190,473 B1 * | 3/2007 | Cook et al. | 358/1.15 |
| 7,234,640 B2 * | 6/2007 | Pentel | 235/384 |
| 7,466,805 B2 | 12/2008 | Timmins | |
| 2002/0107747 A1 * | 8/2002 | Gerogianni | 705/26 |
| 2002/0133418 A1 * | 9/2002 | Hammond et al. | 705/26 |
| 2003/0013438 A1 | 1/2003 | Darby | |
| 2004/0024650 A1 | 2/2004 | Chen | |
| 2004/0158494 A1 * | 8/2004 | Suthar | 705/15 |

(Continued)

OTHER PUBLICATIONS

Nevotek VIP-Suite "Changing Telecommunications". Dec. 11, 2002. www.nevotek.com.

*Primary Examiner* — Mark Beauchaine
(74) *Attorney, Agent, or Firm* — Weide & Miller, Ltd.

(57) ABSTRACT

Methods and apparatus for brokering food services are disclosed. The methods and apparatus described herein provide quality controlled room service to guests of hotels that do not otherwise have traditional room service available. A call center operator routes each call to the appropriate restaurant and stays on the phone line to monitor the call. The restaurant delivers the order and collects the appropriate fee. Menus used by the system are generated by a process that maintains a consistent look and feel despite the fact that each area uses a unique menu.

21 Claims, 71 Drawing Sheets

U.S. PATENT DOCUMENTS

| | | |
|---|---|---|
| 2004/0184593 A1* | 9/2004 | Elsey et al. .............. 379/218.01 |
| 2004/0190687 A1 | 9/2004 | Baker |
| 2004/0240655 A1 | 12/2004 | Swick |
| 2005/0048956 A1 | 3/2005 | Das |
| 2005/0113649 A1* | 5/2005 | Bergantino ................... 600/300 |
| 2005/0119980 A1* | 6/2005 | Kohavi et al. ................... 705/80 |
| 2005/0220288 A1 | 10/2005 | Huey |
| 2006/0085264 A1* | 4/2006 | Forehand, Jr. ................... 705/15 |
| 2007/0088624 A1 | 4/2007 | Vaughn |
| 2007/0205278 A1 | 9/2007 | Lovett |

* cited by examiner (Normal Order)

(Normal Order)

(Complaint)

(Complaint)

(Non-integrated Call Center)

(Integrated Call Center)

FIG. 8

Catering & Corporate Orders Available

*All Quality Meals Are Prepared To Order*

804 — Soup & Salads

Our dressings Our Homemade Except The Ceasar & Fat Free Italian. Choose From: Ranch, Bleu Cheese, Red Wine Basil Vinaigrette, Mild Curry, Honey Mustard, 1000 Island, Soy Ginger, Caesar & Fat Free Italian

| | |
|---|---|
| *Minestrone Soup* A Souper Beginning To Your Meal | 3.95 |
| ★ *Soup Of The Day* | 3.95 |
| *House Salad* Lotsa Greens, Tomatoes, Onions, Carrots Croutons & A Dinner Roll | 5.10 |
| *Caesar Salad* Romaine Lettuce, Parmesan Cheese, Our Homemade Croutons & Caesar Dressing | 7.95 |
| *Caesar Salad w/Chicken* Same As Above With Chicken | 10.70 |
| *Spinach Salad* Served With Artichoke Hearts, Carrots, Onions Mushrooms, Pecans & Our Delicious Honey Mustard Dressing | 9.40 |
| *Antipasto Salad* A Rather Large Portion Of Greens, Meats Cheeses & Veggies. Big Enough To Be A Meal Or Shared | 10.70 |
| ★ *Chicken Salad Platter* Mixed Greens, Tomatoes, Dried Apricots, Onions, Carrots, Mushrooms & Strips Of Grilled Chicken Breast & Slivered Almonds, Served w/Our Soy Ginger Dressing | 10.70 |

Sides And Appetizers — 812

| | |
|---|---|
| *Garlic Bread* Garlic Breads Are Served With Marinara Sauce | 3.70 |
| *Garlic Cheese Bread* Garlic Breads Are Served With Marinara Sauce | 4.40 |
| *Tortellini Pasta Salad* Cheese Filled Tortellini, Tossed With An Assortment Of Fresh Veggies & Marinated In Olive Oil | 6.40 |
| *Stuffed Mushrooms (4 Piece)* A Blend Of Shrimp, Garlic Fresh Basil, Parmesan & Mozzarella Cheese Sautéed in White Wine | 6.40 |
| ★ *Stuffed Mushrooms (8 Piece)* Same As Above | 9.10 |
| *Buffalo Wings* 8 Spicy Wings Served With A Side Of Bleu Cheese Dressing | 6.70 |

806 — Deluxe Sandwiches

All Sandwiches Except The Chicago Pocket Are Served On Italian Rolls — 808 — 810

| | |
|---|---|
| *Chicago Pocket* A Pizza Dough Sandwich Stuffed With Turkey Or Italian Beef And Provolone Cheese. After Baking We Top It Off w/Dijon Mustard, Mayo, Sprouts & Tomatoes | 7.95 |
| *The Oprah* Our Traditional Meatball Sandwich, Topped With Red Onions & Provolone Cheese | 7.95 |
| ★ *The Lincoln Park* Provolone & Smoked Gouda Cheese Artichoke Hearts, Tomatoes, Cucumbers, Sprouts, Black Olives & A Hint Of Red Wine Basil Vinaigrette Dressing | 7.95 |
| ★ *The Papa Bear* Our Hot Italian Beef Smothered In Red Onions, Topped With Sport Peppers & Provolone Cheese With Gravy For Dipping | 7.95 |

Pasta Entrees

Our Pastas Are Served With A House Salad & Garlic Bread And Your Choice Of Marinara, Pesto Or Alfredo Sauce

| | |
|---|---|
| *Lasagna* Our Homemade Version Is Made With Mushrooms & Spinach | 10.70 |
| ★ *Ravioli* Portabello Mushroom & Chicken Or Sun-Dried Tomato & Smoked Cheese Served w/Your Choice Of Marinara, Pesto Or Alfredo Sauce | 10.70 |
| *Angel Hair Pasta* Made w/Fresh Basil, Garlic, Diced Tomatoes & Goat Cheese In Marinara Sauce | 9.40 |
| *Fettuccini Alfredo* Fettucini Noodles In A Light Alfredo Sauce w/Shiitake Mushrooms, Broccoli, Diced Tomatoes And Cracked Black Pepper | 9.40 |
| ★ *Fettuccini Alfredo w/Chicken* Same As Above w/Chicken | 12.10 |
| *Tortellini* Cheese Filled Tortellini w/Your Choice Of Marinara Pesto Or Alfredo Sauce | 9.40 |

Calzones

| | |
|---|---|
| ★ *The Ditka* A Calzone That Starts Out As Pizza Dough Then We Add Pizza Sauce, Provolone Cheese, Spinach, Black Olives, Fresh Garlic, Basil And Pepperoncini | 9.40 |
| *Create Your Own Calzone* Choose Up To 4 Pizza Toppings To Create Your Own Masterpiece (Sorry, No Sausage Or Shrimp In The Calzones) | 9.40 |

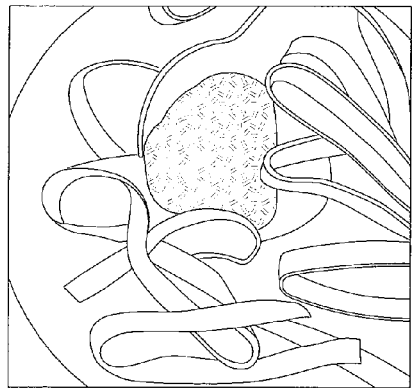

814 — ★ Try The Order Inn Favorites, Our Specialties!

816 — No phone charges in most hotels. All quality meals are prepared to order. Please allow approximately 45 minutes for your order, your actual delivery time will be quoted by your order taker. A $15.00 minimum order is required for delivery. Prices do not include sales tax, gratuity or $3.50 packaging fee, gratuities are greatly appreciated. Prices subject to change without notice. Order Inn Room Service is an independent company & is made available with no guarantee from this hotel. Cash, travelers checks & most major credit cards accepted. Sorry, no checks.

FIG. 9

Order Inn Pizzas

*All Quality Meals Are Prepared To Order*  
Catering & Corporate Orders Available

|  | Small | Med. | Large |
|---|---|---|---|
| Cheese | 13.20 | 16.55 | 19.60 |
| Any One Topping | 14.40 | 17.55 | 21.10 |
| Any Two Toppings | 15.70 | 19.40 | 23.70 |
| Any Three Toppings | 16.95 | 21.40 | 26.20 |
| Any Four Toppings | 18.30 | 23.45 | 26.85 |
| Extra Toppings | 1.30 | 1.95 | 2.50 |

Pizza Toppings

BBQ Chicken, Canadian Bacon, Fajita Chicken, Anchovies, Spicy Shrimp, Meatballs, Sausage, Pepperoni, Teriyaki Chicken, Linguiça, Fresh Basil, Exotic Mushrooms, Sun-dried Tomatoes, Artichoke Hearts, Broccoli, Dried Apricots, Extra Cheese, Fresh Spinach, Green Peppers, Mushrooms, Pepperoncini, Red Onions, Slivered Almonds, Spinach/Ricotta Mix, Sport Peppers, Zucchini, Black Olives, Cilantro, Roasted Garlic, Garlic, Fresh Tomatoes, Smoked Gouda, Onions, Pesto, Ricotta Cheese, Pineapple, Roasted Red Bell Peppers, Sweet Red Peppers, Roasted Garlic

Famous Gourmet Pizzas

Also Offer Cholesterol - Free Soy - Milk Mozzarella. All Of Our Delicious Pizzas Come With Diced Tomatoes Except The Untouchables. Air Jordan & Cubby Bear

|  | Small | Medium | Large |
|---|---|---|---|
| *Untouchables* BBQ Sauce, Chicken, Smoked Gouda Cheese, Red Onions & Cilantro | 17.60 | 22.90 | 26.60 |
| *The Eddie Gaedel* Spicy Gulf Shrimp, Garlic, Red Onions & Thyme | 17.60 | 22.90 | 26.60 |
| ★ *The Two Thumbs Up* (Vegetarian) A Delicious Blend Of Mozzarella, Provolone, Romano, Swiss & Fontina Cheeses | 18.10 | 21.90 | 25.60 |
| *The Fridge* Pepperoni, Canadian Bacon, Sausage, Green Peppers, Mushrooms, Black Olives & Onions | 17.60 | 22.90 | 26.90 |
| *The John Dillinger* (Vegetarian) Pesto Sauce, Slivered Almonds, Roasted Red Bell Peppers, Roasted Garlic & Romano Cheese | 18.10 | 21.60 | 25.60 |
| *The Sears Tower* (Vegetarian) Onions, Sweet Red Peppers, Zucchini, Marinated Artichoke Hearts & Black Olives | 17.60 | 22.90 | 26.90 |
| *The Harry Cary* Canadian Bacon & Pineapple | 14.60 | 20.20 | 24.20 |
| *The Al Capone* (Vegetarian) Fresh Spinach, Ricotta Cheese, Onions & Slivered Almonds | 18.10 | 21.50 | 25.60 |
| ★ *The Rush Street* Pepperoni, Canadian Bacon, Sausage, Linguiça & Meatballs | 17.60 | 22.90 | 26.90 |
| *Great Chicago Fire* Italian Sausage, Sport Peppers, Fresh Garlic & Cilantro | 18.10 | 21.90 | 25.60 |
| *The Al Bundy* (Vegetarian) Feta Cheese, Fresh Roasted Garlic, Fresh Basil & Sun-dried Tomatoes | 17.60 | 22.90 | 26.90 |
| *Black Hawk* Sausage, Ricotta Cheese, Sweet Red Pepper, Lemon Zest, Fresh Oregano & Cracked Black Pepper | 17.60 | 22.90 | 26.90 |
| ★ *Joliet Jake* (Vegetarian) 4 Kinds Of Mushrooms: Shiitake, Portabello, Crimini & Button With Apricots & Fresh Basil | 17.60 | 22.90 | 26.90 |
| *Cubby Bear* (Vegetarian) Spinach, Tomatoes, Black Olives, Red Onion, Garlic, Spices & Cholesterol Free Soy Milk Mozzarella Cheese | 18.10 | 21.50 | 25.60 |
| *Dennis Rodman* Spicy Pesto Chicken, Cheese & Red Peppers, Red Onions & Fresh Garlic | 17.50 | 22.80 | 25.60 |
| *The Wrigley Field* Pesto Sauce, Feta Cheese, Teriyaki Chicken, Roasted Garlic & Sun-dried Tomatoes | 17.60 | 22.90 | 26.90 |
| *Air Jordan* Fresh Tomatoes, Basil & Garlic | 14.60 | 20.20 | 24.20 |

Beverages

| Bottled Water | 1.30 |
|---|---|
| Canned Soft Drinks | 1.30 |
| Fountain Soft Drinks Coke, Diet Coke, Sprite | |
| Lemonade, Iced Tea | 1.70 |
| Milk (12 oz.) | 1.55 |
| Coffee Regular Or Unleaded | 1.55 |
| I.B.C Root Beer | 1.85 |

Desserts

★ New York Cheesecake A Classic Cheesecake Blended To A Rich, Creamy Texture & Topped With Raspberry Sauce — 5.10

Carrot Cake A Big Ol' Piece Filled With Chunks Of Carrots, Pineapple And Walnuts Covered With A Creamy Frosting — 5.10

★ Chocolate Supreme Our Sinfully Rich And Moist Dark Chocolate Cake With A Creamy Fudge Frosting — 5.10

To Order Call Toll Free 1-800-XXX-XXXX Area 176

► Service Hours: Open Daily 11:00am to 9pm  Seasonal Hours May Vary  Closed Most Major Holidays
Room Copy. Please Leave For Next Guest  A 15.00 minimum order is required for delivery ► *Order Inn Is Highly Recommended By But Not Affiliated With This Hotel-Menu Last Updated 2/26/04*

FIG. 10

Order Inn
HOTEL ROOM SERVICE
*Providing Quality Meals & Service Nationwide*™

Daily Orders Report For:

Restaurant ID/Number: 101

| Ref # | Date | Time | Call Type | Minutes | Order Taker | Hotel Name And Address | Room # | Comment - Resolution | Code1 | Code2 | Code3 | DelTQ | HRmCon | Total Difference | Order Total | Rest. Total | O.I. Total |
|---|---|---|---|---|---|---|---|---|---|---|---|---|---|---|---|---|---|
| I010931 | 1/28/2004 | 14:40 | ORDER | 3.67 | JUSTIN | HOLIDAY INN EXPRESS - 17 W HALEY ST (805)963-9757 | 304 | - | GUE | 00 | 00 | 0.50 | N | $0.27 | $19.42 | $14.56 | $4.86 |
| I010934 | 1/28/2004 | 16:10 | ORDER | 3.08 | JUSTIN | BESTWESTERN SOUTHCOAST INN - 5620 CALLE REAL (805)967-3200 | 257 | - | GUE | 00 | 00 | 0.50 | Y | $0.83 | $22.95 | $17.26 | $5.69 |
| I010964 | 1/28/2004 | 19:35 | ORDER | 2.13 | GEORGE | MARINA BEACH MOTEL - 21 BATH ST (805)963-9311 | FDESK | - | EMP | 00 | 00 | NQ | Y | ($0.18) | $8.73 | $6.64 | $2.09 |
| I010965 | 1/28/2004 | 19:41 | ORDER | 8.27 | GEORGE | BESTWESTERN BEACHSIDE INN 336 W CABRILLO BLVD (805)965-6556 | 314 | CUST ORDERED CHICKEN TAQUITOS, NOT ON MENU, PUT TOSTADOS INSTEAD - | GUE | 00 | 00 | 0.75 | Y | $0.04 | $23.18 | $17.44 | $5.74 |
| I010966 | 1/28/2004 | 19:56 | ORDER | 2.22 | GEORGE | MARINA BEACH MOTEL - 21 BATH ST (805)963-9311 | 12 | - | GUE | 00 | 00 | 0.75 | Y | $0.26 | $21.31 | $16.01 | $5.30 |
| I010967 | 1/28/2004 | 20:06 | ORDER | 4.15 | GEORGE | BESTWESTERN BEACHSIDE INN 336 W CABRILLO BLVD (805)965-6556 | 217 | - | GUE | 00 | 00 | 0.75 | Y | $0.30 | $40.04 | $30.33 | $9.71 |
| I010968 | 1/28/2004 | 20:10 | ORDER | 3.32 | CHRISTINA | HOLIDAY INN EXPRESS - 17 W HALEY ST (805)963-9757 | 106 | - | GUE | 00 | 00 | 0.50 | Y | ($1.52) | $14.36 | $10.69 | $3.67 |
| I010973 | 1/28/2004 | 20:40 | STATUS | 3.86 | REFUSED | MARINA BEACH MOTEL - 21 BATH ST (805)963-9311 | FT DE | ORDERED OVER AN HOUR AGO, IT WAS ON IT's way there - REST HANDLED | EMP | | 00 | | | $0.00 | $0.00 | $0.00 | $0.00 |
| I010975 | 1/28/2004 | 20:48 | ORDER | 4.55 | GEORGE | HOLIDAY INN EXPRESS - 17 W HALEY ST (805)963-9757 | 220 | - | GUE | 00 | 00 | 0.50 | Y | ($1.79) | $24.17 | $18.19 | $5.98 |
| I010976 | 1/28/2004 | 20:51 | CUST SVC | 0.67 | | | | - | | CX | CN | 00 | | $0.00 | $0.00 | $0.00 | $0.00 |
| I010977 | 1/28/2004 | 20:53 | CUST SVC | 3.03 | GEORGE | MARINA BEACH MOTEL - 21 BATH ST (805)963-9311 | FRONT | HIS FOOD IS COLD AND LATE. - REST HANDLED | GUE | | 00 | | | $0.00 | $0.00 | $0.00 | $0.00 |

FIG. 11

Order Inn
HOTEL ROOM SERVICE
Providing Quality Meals & Service Nationwide™

Daily Orders Report For:     512 (cont.)     Restaurant ID Number: 101

| | | | | | | | | | | | | | |
|---|---|---|---|---|---|---|---|---|---|---|---|---|---|
| I010978 | 1/28/2004 | 20:56 | STATUS | 1.87 | GEORGE | BESTWESTERN BEACHSIDE INN 336 W CABRILLO BLVD (805)965-6556 | 217 | - REST HANDLED | GUE | 00 | | | $0.00 | $0.00 | $0.00 | $0.00 |
| I010980 | 1/28/2004 | 20:59 | ORDER | 8.38 | GEORGE | HOLIDAY INN EXPRESS - 17 W HALEY ST (805)963-9757 | 214 | - | GUE | 00 | 0.50 | Y | $3.61 | $41.59 | $31.52 | $10.07 |
| I010982 | 1/28/2004 | 21:00 | ORDER | 4.52 | GEORGE | BESTWESTERN SOUTHCOAST INN - 5620 CALLE REAL 805-967-3200 | 132 | - | GUE | 00 | 0.50 | Y | -$0.26 | $18.10 | $13.55 | $4.55 |
| I010983 | 1/28/2004 | 21:03 | ORDER | 7.38 | GEORGE | BESTWESTERN SOUTHCOAST INN - 5620 CALLE REAL 805-967-3200 | 233 | - | GUE | 00 | 0.75 | Y | ($0.85) | $16.34 | $12.20 | $4.14 |
| I010987 | 1/28/2004 | 21:26 | STATUS | 1.58 | GEORGE | HOLIDAY INN EXPRESS - 17 W HALEY ST (805)963-9757 | 106 | CHEKING ON ORDER, IT WAS ON IT'S WAY - REST HANDLED | GUE | 00 | | | $0.00 | $0.00 | $0.00 | $0.00 |
| I010988 | 1/28/2004 | 21:41 | ORDER | 3.93 | CHRISTINA | BRISAS DEL MAR - 223 CASTILLO ST (805)966-2219 | 27 | - | GUE | 00 | 0.75 | Y | $0.29 | $38.51 | $29.16 | $9.35 |
| I010989 | 1/28/2004 | 21:56 | STATUS | 2.77 | | BESTWESTERN SOUTHCOAST INN 5620 CALLE REAL 805-967-3200 | 233 | - REST HANDLED | GUE | 00 | | | $0.00 | $0.00 | $0.00 | $0.00 |
| I010994 | 1/28/2004 | 23:07 | ORDER | 4.25 | GEORGE | BESTWESTERN BEACHSIDE INN 336 W CABRILLO BLVD (805)965-6556 | 218 | - | GUE | 00 | 0.50 | Y | ($0.37) | $38.06 | $28.82 | $9.24 |
| I010995 | 1/28/2004 | 23:13 | CUST SVC | 3.02 | GEORGE | BESTWESTERN BEACHSIDE INN 336 W CABRILLO BLVD (805)965-6556 | 218 | WANTS TO MAKE SURE SHE WILL BE ABLE TO OPEN THE WINE BOTTLE - REST HANDLED | GUE | 00 | | | $0.00 | $0.00 | $0.00 | $0.00 |

FIG. 12

Order Inn
HOTEL ROOM SERVICE

Providing Quality Meals & Service Nationwide™

Daily Orders Report For:

Restaurant ID Number: 101

Totals -  $1.15  $326.76 $246.37  $80.39  } 1022

← 512 (cont.)

*Call Code Definitions*

Regular Codes
- CC  Credit card declined or not accepted
- CF  Complaint about food quality or food service
- CM  Changed mind
- CX  Called back to cancel order
- HU  Hung Up
- LT  Late Order, customer called back to complain
- O3  Order taker needs training
- O4  Order taker was rude to customer

Regular Codes
- OO  Billable order
- RB  Restaurant closed during business hours
- RC  Restaurant closed legitimately
- RM  Refused minimum, no order
- RP  Refused/Cancelled order because prices too high
- RT  Refused because delivery time too long
- VD  Restaurant called Order Inn to void order

System Codes
- CM  Changed Mind
- HU  Hung Up
- IN  Info Lookup
- DS  Delivery Status
- TS  Test

Additional Codes
- EMP  Employee (Hotel)
- GUE  Guest
- Y  Store Op Confirmed Hotel Name & Rm. #
- N  Store Op Did not Confirm Hotel Name & Rm. #

*Heading Descriptions*
Time = Minutes hotel guest is connected with restaurant
Order Taker = Restaurant order taker name
DelTQ = Delivery time quoted by rest. Order taker
HRmCon = Did Restaurant order taker confirm hotel name & room number

*Note:* The following numbers reflect delivery times quoted:
.50 = 1/2 hour   0.75 = ¾ hour   1.00 = 1 hour   1.25 = 1 hour & 15 min.   1.50 = 1 hour & a half   1.50P = over 1 ½ hours

*Finance Descriptions*
Order Total = Total order amount calculated by Call Center operator
Restaurant Total = Total restaurant revenue plus all sales tax
Order Inn Total = Total Order Inn revenue
Total Difference = If difference is in a credit position Restaurant charged more than Order Inn-If difference is in a debit position Restaurant charged less than Order Inn-
if difference equals the "order total" then no total was entered form the Restaurant
*Note:* The Order Inn revenue is calculated from the "order total" figure

FIG. 13

Order Inn, Inc.

*Order Inn*
HOTEL ROOM SERVICE
Providing Quality Meals & Service Nationwide™

*Order Inn, Inc. Proprietary Information -- Confidential*

*Weekly Invoice For: RID 101*         Monday, January 3, 2004 — 1310

Date Of EFT:   01/10/04 — 1308

|  | Day Total | Total Due |
|---|---|---|
| Total for 12/27/2003-15 order(s) | $445.33 | $108.22 |
| Total for 12/28/2003-12 order(s) | $324.15 | $79.76 |
| Total for 12/29/2003-5 order(s) | $122.92 | $30.14 |
| Total for 12/30/2003-4 order(s) | $79.70 | $19.91 |
| Total for 12/31/2003-9 order(s) | $205.34 | $49.85 |
| Total for 1/1/2004-7 order(s) | $168.72 | $41.44 |
| Total for 1/2/2004-7 order(s) | $188.15 | $46.02 |
| 59 order(s) |  | $375.34 |

1302 points to Day Total column; 1304 to Total Due column; 1306 to the $375.34 subtotal row.

| Credit One | $0.00 |
| Credit Two | $0.00 |
| TOTAL | $375.34 |

FIG. 15B

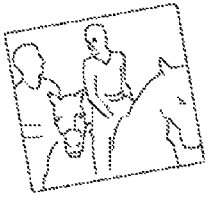
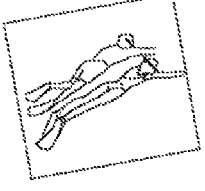
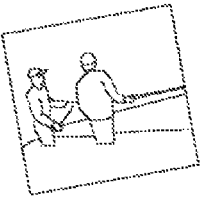

*Guide Line*
*Attractions & Services*

*Restaurants & Nightlife*

| | |
|---|---|
| Pizza Delivery | 11 |
| Breakfast & Brunches | 12 |
| Casual Lunch & Dinner | 13 |
| Coffee Houses & Bakeries | 14 |
| Nightclubs & Sports Bars | 15 |
| Fine Dining & International Cuisine | 16 |
| Top Five Restaurants & Local Favorites | 17 |
| Stearns Wharf, Dinner Cruises & Ocean Front | 18 |
| Catering Services | 19 |

*Places to Go & Things to Do*

Golf Courses & Pro Shops — 20
Favorite Local Courses        Driving & Putting Ranges
Pro Shops                     Lessons

Unique Local Attractions — 21
Casinos                   Parks & Gardens
Whale Watching            Family Entertainment
Stearns Wharf & Shops     Zoos & Marine Aquariums
Museums & Missions        Art Galleries, Theatre & Movies

California's Favorite Destination Attractions — 22
Theme Parks                 Zoos & Animal Parks
Amusement & Water Parks     Lakes & River Rafting
Snow Skiing & Mtn. Resorts  Castles & Island Tours
Aquariums & Museums

Water Sports & Activities — 23
Fishing & Charters          Parasailing
Scuba Diving & Sailing      Surfing & Windsurfing
Jet Skis & Water Skiing     Kayaking
Boating & Island Cruises

Outdoor Sports & Recreation — 24
Bicycle & Roller Blading    Horseback Riding
Skiing & Snowboarding       Motorcycle & Jeep Rentals

Fun In The Sky — 25
Helicopter Tours            Hang Gliding & Gliders
Balloon Flights             Sky Diving & Sky Surfing

Wineries, Tasting Rooms & Vineyards — 26
Central Santa Barbara County   Northern Santa Barbara County
Destination

Current & Special Events — 27

For Guide Line, Call Toll Free: 800-XXX-XXXX

FIG. 15C

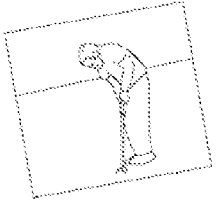

*Guide Line*
*Attractions & Services*

*Local Services & Shops* — 1504

Shopping & General Merchandise 28
Local Shopping Centers        Antique Shops
Waterfront Businesses         Dept. Stores & Factory Outlets
Fine Jewelers                 Destination Shopping Centers
Gift Shops                    Sporting & Outdoor Stores
Florist

Personal Services 29
Concierge Services            Tanning Salons
Dry Cleaning & Laundry        Beauty Salons & Hair Care
Fitness, Gyms & Trainers      Banking & Money Wires

Business Services 30
Office Supplies & Copies      Computer Repair & Shops
Courier & Overnight Services  Web & Local ISP Services

Massage & Entertainment 31
Adult Entertainment           Massage

Transportation & Travel 32
Taxi Cabs                     Airport & Bus Shuttles
Car Rentals                   Limousine Service

Medical 33
Medical Centers               Chiropractors
Preferred Doctors             Veterinarians
Eye Care & Glasses            Acupuncture
Pharmacies & Health Stores

Real Estate & Vacation Rentals 34 — 1504

Local Information 35
Visitors Bureau               Chamber of Commerce

Using the Guide Line — 1502

- Dial the toll free Guide Line Number: 800-XXX-XXXX
- When Guide Line Answers, enter [#] and your two digit
- extension.
- Once you make a selection you may press [*] to go back or [#] to go forward to the next selection.
- Dial [0] to return to the main menu.
- To connect directly to a business, dial [1] at any time.

If you have suggestions or comments about
Guide Line or one of its featured services,
or inquiries about advertising,
please leave a message at Extension 36.

Room Copy - Please Leave For Next Guest

1506

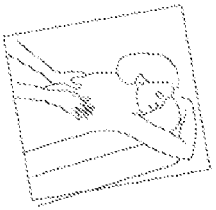
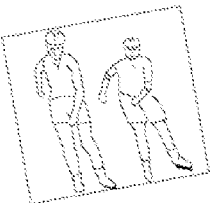
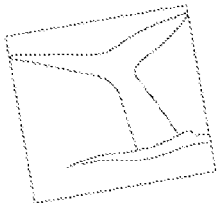

```
Order Inn Room Service                          11:29 AM 6/2/2004

Enter your initials: SDS      Date: 11:29 AM 6/2/2004

Are you calling to place a room service order:

What is the extension number after the phone number:

01> ORDER ROOM SERVICE
                                    02> STATUS OF DELIVERY
                                    03> ADD TO ORDER
                                    04> CANCEL MY ORDER
                                    05> OTHER
```

FIG. 16

```
Order Inn Room Service                          11:29 AM 6/2/2004

Enter your initials: SDS      Date: 11:29 AM 6/2/2004

Are you calling to place a room service order:

What is the extension number after the phone number:

A0> NONE
                                              A1> 100
                                              A2> 101
                                              A4> 104
                                              A5> 105
                                              A6> 106
                                              A7> 107
                                              A8> 108
                                              B0> 110
```

FIG. 17

```
Order Inn Room Service                          11:29 AM 6/2/2004

What hotel are you calling from:
        BEST WESTERN COTTONTREE INN 2230 N UNIVERSITY
PKWY 801-373-7044
What is your hotel room/unit #:  1234
Are you a guest at the hotel:    GUE    Phone    - -
First & last name of REGISTERED Guest:      Stephanie    Santana
        **Continue with the order?
```
| | |
|---|---|
| B2> | BEST WESTERN COTTONTREE INN 2230 N UNIVERSITY PKWY 801-373-7044 |
| D1> | DAYS INN 1675 N 200 W 801-375-8600 |
| E1> | ECONOLODGE 1625 W CENTER 801-373-0099 |
| E2> | EXECUTIVE INN & SUITES 250 S UNIVERSITY AVE 801-373-9672 |
| L1> | LA QUINTA 1555 N CANYON RD 801-374-6020 |
| N1> | NATIONAL 9 INN 1380 S UNIVERSITY DR 801-374-6800 |
| S1> | SLEEP INN 1505 S 40 EAST 801-377-6597 |

FIG. 18

```
Order Inn Room Service                          11:29 AM 6/2/2004

Order Inn Room Service (Room Service)    1907 #00000220, 11:29
am, 06/02/2004

What hotel are you calling from:
        BEST WESTERN COTTONTREE INN 2230 N UNIVERSITY
PKWY 801-373-7044
What is your hotel room/unit #:  1234
Are you a guest at the hotel:    GUE    Phone    - -
First & last name of REGISTERED Guest:      Stephanie    Santana
        **Continue with the order?
```

A> YES, HOTEL GUEST
B> NO, EMPLOYEE OF THE HOTEL

FIG. 19

```
Order Inn Room Service                              11:29 AM 6/2/2004

Order Inn Room Service (Room Service)      1907 #00000220, 11:29
am, 06/02/2004

What hotel are you calling from:
        BEST WESTERN COTTONTREE INN 2230 N UNIVERSITY
PKWY 801-373-7044
What is your hotel room/unit #:   1234
Are you a guest at the hotel:     GUE    Phone    - -
First & last name of REGISTERED Guest:       Stephanie     Santana
        **Continue with the order?
BEST WESTERN COTTONTREE INN 2230 N UNIVERSITY PKWY ┌─────────────────────────────┐
                          │ A> YES; CONTINUE WITH ORDER │
                          │ B> NO; SKIP TO COMMENTS     │
                          └─────────────────────────────┘
```

FIG. 20

```
Order Inn Room Service                              11:29 AM 6/2/2004

CONFIRMATION PAGE

Let me confirm your hotel information. You are in Room 1234
at BEST WESTERN COTTONTREE INN 2230 N UNIVERSITY PKWY
807-373-7044
Is this information correct: YES
Did you confirm this info: YES
```

FIG. 21

Order Inn Room Service      11:29 AM 6/2/2004

Order I~~am, 06~~ ~~READ~~

> MUST GET ORDER TAKERS NAME!!! THIS WAY WE CAN CALL THEM IF WE HAVE A PROBLEM, WE KNOW WHO TO ASK FOR AND WHO TOOK THE ORDER!!!!! IF THEY REFUSE, TYPE IN "REFUSED"

11:29

~~Say "Thank you very much, please remain on the line for~~ just a moment, I will connect you with the order taker"
    Say "This is ................... The Order Inn Operator, I have a room service order for you from     STEPHANIE SANTANA in room 1234 at the <<BEST WESTERN COTTONTREE INN 2230 N UNIVERSITY PKWY 801-373-7044>>
    Say "What is your name":
    "Please remember to confirm the hotel & room number with the guest"
    Did the order taker confirm the info with the guest?:
    **Continue with the order?

Order Inn Room Service      11:29 AM 6/2/2004

READ SCRIPT BELOW
    Say "Thank you very much, please remain on the line for just a moment, I will connect you with the order taker"
    Say "This is ................... The Order Inn Operator, I have a room service order for you from     STEPHANIE SANTANA in room 1234 at the <<BEST WESTERN COTTONTREE INN 2230 N UNIVERSITY PKWY 801-373-7044>>
    Say "What is your name": JOE
    "Please remember to confirm the hotel & room number with the guest"
    Did the order taker confirm the info with the guest?:
    **Continue with the order?

01> YES
02> NO

FIG. 23

```
Order Inn Room Service                        11:29 AM 6/2/2004

READ SCRIPT BELOW
        Say "Thank you very much, please remain on the line for just a
moment, I will connect you with the order taker"
        Say "This is .................... The Order Inn Operator, I have a
room service order for you from        STEPHANIE SANTANA in room
1234 at the <<BEST WESTERN COTTONTREE INN 2230 N
UNIVERSITY PKWY 801-373-7044>>
        Say "What is your name": JOE
        "Please remember to confirm the hotel & room number with the
guest"
        Did the order taker confirm the info with the guest?:
        **Continue with the order?

A> YES; CONTINUE WITH ORDER
                                      B> NO; SKIP TO COMMENTS
```

FIG. 24

```
Order Inn Room Service                        11:29 AM 6/2/2004

Items          Description          Price          Qty
Inventory for Category 100
Item     Descript        Qty      Price
100001 Brisket, 1Lb.     999999 12.10
100002 Brisket, 1/2 Lb.  999999 7.95
100009 Combo Platter     999999 18.80
100010 Corned Beef       999999 13.40
<Alt PgUp>Sort<Alt PgDn>Find<?>Image<Space>More<Enter>Select --------------------------------------------------------------
Employee disc 0.00    Delivery      0.00    SalesTax    0.00
==============================================================
Markup        0.00    Container     0.00    CallCtr     0.00
Delivery      0.00    Container     0.00    Rt          0.00
Del to OI     0.00    Emp Cal       0.00    Rest Emp%   0.00
OrderInn Emp%0.00     OI Comm       9.99    RestComm    0.00
```

FIG. 25

```
Order Inn Room Service                          11:29 AM 6/2/2004

Items          Description         Price           Qty
               Amount
100001 Brisket, 1LB.               12.10           0

Subtotal           0.00
                         Restaurant Quote   0.00
   0   ┌─────────────────────────────────────────────────┐
       │ 100001 Brisket, 1 Lb.                           │
       │ Includes 2 Sides: Macaroni And Cheese, Coleslaw, Baked │
   0   │ Beans, Applesauce, Potato Chips                 │
       └─────────────────────────────────────────────────┘
-------------------------------------------------------------------
Employee disc 0.00    Delivery      0.00    SalesTax      0.00
===================================================================
Markup         0.00   Container     0.00    CallCtr       0.00
Delivery       0.00   Container     0.00    Rt            0.00
Del to OI      0.00   Emp Cal       0.00    Rest Emp%     0.00
OrderInn Emp%0.00     OI Comm       9.99    RestComm      0.00
```

FIG. 26

```
Order Inn Room Service                          11:29 AM 6/2/2004

Items          Description         Price           Qty
               Amount
100001 Brisket, 1LB.               12.10           0

Subtotal           0.00
                         Restaurant Quote   0.00
   0                     Order Inn Total    0.00
                         Difference         0.00
   0                     Payment Type -------------------------------------------------------------------
Employee disc 0.00    Delivery      0.00    SalesTax      0.00
===================================================================
Markup        0.00    Container     0.00    CallCtr       0.00
┌─────────────────────────────────────────────────────────────────┐
│ Enter the amount that the restaurant quotes to the caller. If they do not │
│ give a total, just press [Enter] to bypass this field.          │
└─────────────────────────────────────────────────────────────────┘
OrderInn Emp%0.00     OI Comm       9.99    RestComm      0.00
```

FIG. 27

```
Order Inn Room Service                           11:29 AM 6/2/2004

Items           Description         Price         Qty
         Amount
100001 Brisket, 1LB.          12.10            0

Subtotal          0.00
                         Restaurant Quote  15.01
0                        Order Inn Total   0.00
                         Difference        0.00
0                        Payment Type
                         ┌─────────────────────────┐
                         │ 01> CASH                │
─────────────────────────│ 02> CREDIT              │─────────────────
Employee disc  0.00  Deliv│ 03> UNKNOWN            │         0.00
═════════════════════════│ 04> TRAVELERS CHECK     │═════════════════
Markup       0.00    Cont│ 05> AIRLINE VOUCHER     │         0.00
Delivery     0.00    Cont└─────────────────────────┘         0.00
Del to OI    0.00    Emp Cal      0.00     Rest Emp%         0.00
OrderInn Emp%0.00    OI Comm      9.99     RestComm          0.00
```

FIG. 28

```
Go to NEXT page to finish

Items           Description         Price         Qty
         Amount
100001 Brisket, 1LB.          12.10            0

Subtotal          12.10
                         Restaurant Quote  15.01
0                        Order Inn Total   16.48
                         Difference        -1.47
0                        Payment Type ─────────────────────────────────────────────────────────────────
Employee disc  0.00   Delivery     0.00     SalesTax        0.00
═════════════════════════════════════════════════════════════════
Markup       0.00     Container    0.00     CallCtr         0.00
Delivery     0.00     Container    0.00     Rt              0.00
Del to OI    0.00     Emp Cal      0.00     Rest Emp%       0.00
OrderInn Emp%0.00     OI Comm      9.99     RestComm        0.00
```

FIG. 29

| Order Inn Room Service | 11:29 AM 6/2/2004 |
|---|---|

Delivery time quoted:

Result of Call:

Reason for Cancel:

Other Comments:

Comments:

```
01> 30 MINUTES
02> 45 MINUTES
03> 1 HOUR
04> 1 HOUR 15 MINUTES
05> 1 HOUR 30 MINUTES
06> MORE THAN 1 HOUR 30 MINUTES
07> NOT QUOTED
```

FIG. 30

| Order Inn Room Service | 11:29 AM 6/2/2004 |
|---|---|

Delivery time quoted:     0.50

Result of Call:

Reason for Cancel:

Other Comments:

Comments:

```
A> GOOD ORDER
B> STATUS OF DELIVERY
C> CUSTOMER SERVICE
D> ADD TO ORDER
E> CANCEL ORDER
```

FIG. 31

| Order Inn Room Service | 11:29 AM 6/2/2004 |
|---|---|

Delivery time quoted: 0.50

Result of Call: 00

Reason for Cancel:

Other Comments:

Comments:

```
01> NONE
02> STATUS     : WONDERING WHERE THEIR ORDER IS
03> PROBLEM    : RESTAURANT WAS CLOSED (Should be OPEN)
04> PROBLEM    : RESTAURANT WAS CLOSED (After Restaurant Hours)
05> COMPLAINT  : BAD FOOD, FOOD QUALITY OR SERVICE
06> COMPLAINT  : ORDER TAKER NEEDS TRAINING
07> COMPLAINT  : ORDER TAKER WAS RUDE TO CUSTOMER
```

FIG. 32

| Order Inn Room Service | 11:29 AM 6/2/2004 |
|---|---|

Delivery time quoted:

Result of Call:

Reason for Cancel:

Other Comments:

Comments:

Enter all comments & issues pertaining to this call.

FIG. 33

| Order Inn Room Service | 11:29 AM 6/2/2004 |
|---|---|

FINISH THE ENTIRE CALL

FIG. 34

| Order Inn Room Service | 11:29 AM 6/2/2004 |
|---|---|

Enter your intials: SDS          E      E084882
11:36      06/02
Are you calling to place a room service order: STATUS
                                             E>>
What's the extension number after the phone number on your menu?

01> ORDER ROOM SERVICE
02> STATUS OF DELIVERY
03> ADD TO ORDER
04> CANCEL MY ORDER
05> OTHER

FIG. 35

```
Order Inn Room Service                            11:29 AM 6/2/2004

Enter your intials: SDS           E      E084882
11:36           06/02
Are you calling to place a room service order: STATUS
                                       E>>
What's the extension number after the phone number on your menu?

A0>    NONE
                                          A1>    100
                                          A2>    101
                                          A3>    104
                                          A5>    105
                                          A6>    106
                                          A7>    107
                                          A8>    108
                                          B0>    110
```

FIG. 36

```
Order Inn Room Service                            11:29 AM 6/2/2004

What hotel are you calling from:
    B2>    BEST WESTERN INN 2230 N UNIVERSITY PKWY 801-373-7044
W   D1>    DAYS INN 1675 N 200 W 801-375-8600
    E1>    ECONOLODGE 1625 W CENTER 801-373-0099
Ar  E2>    EXECUTIVE INN & SUITES 250 S UNIVERSITY AVE 801-373-9672
    L1>    LA QUINTA 1555 N CANYON RD 801-374-6020
    N1>    NATIONAL 9 INN 1380 S UNIVERSITY DR 801-374-6800
Fi  S1>    SLEEP INN 1505 S 40 EAST 801-377-6597

**Continue with the order?
```

FIG. 37

| Order Inn Room Service | 11:29 AM 6/2/2004 |

What hotel are you calling from:
    BEST WESTERN COTTONTREE INN 2230 N UNIVERSITY PKWY 801-373-7044

What is your room/unit #:      1234

Are you a guest at the hotel:

First & last name of REGISTERED Guest

**Continue with the order?

```
A> YES, HOTEL GUEST
B> NO, EMPLOYEE OF THE HOTEL
```

| Order Inn Room Service | 11:29 AM 6/2/2004 |

What hotel are you calling from:
    BEST WESTERN COTTONTREE INN 2230 N UNIVERSITY PKWY 801-373-7044

What is your room/unit #:      1234

Are you a guest at the hotel:      GUE      Phone
- -

First & last name of REGISTERED Guest:      STEPHANIE
    STANTANA

**Continue with the order?
    BEST WESTERN INN 2230 N UNIVERSITY PKWY 801-373-7044

```
A> YES; CONTINUE WITH ORDER
B> NO; SKIP TO COMMENTS
```

FIG. 39

| Order Inn Room Service | 11:29 AM 6/2/2004 |
|---|---|

CONFIRMATION PAGE

Let me confirm your hotel information, You are in Room 1234
at BEST WESTERN COTTONTREE INN 2230 N UNIVERSITY PKWY
801-373-7044

Is this information correct:    YES
Did you confirm this info:      YES

| Order Inn Room Service | 11:29 AM 6/2/2004 |
|---|---|

Firstname    STEPHANIE        Lastname    STANTANA
    Room#1234
    Phone           - -

Message: <<
    Say "One moment, let me connect you to your order take."
    Put caller on hold, then call the restaurant & come back to DLS.
    Say "Hello, this is Order Inn Operator, we have STEPHANIE
from Room <<1234
    at << BEST WESTERN INN 2230 N UNIVERSITY PKWY 801-
373-    7044 inquiring about the status of their delivery."
    You may either connect the caller to the order taker or you may
    relay the answer to the caller What is your name?

Was the issue resolved:

FIG. 41

| Order Inn Room Service | 11:29 AM 6/2/2004 |

Order Inn Room Service (Room Service)     1907 #00000223, 11:36 am, 06/02/2004

Firstname     STEPHANIE     Lastname     STANTANA
        Room#1234
        Phone        805-882-2000

Message: <<WONDERING WHERE HER ORDER IS; IT'S ON IT'S WAY
        Say "One moment, let me connect you to your order take."
        Put caller on hold, then call the restaurant & come back to DLS.
        Say "Hello, this is Order Inn Operator, we have STEPHANIE from Room <<1234
        at << BEST WESTERN INN 2230 N UNIVERSITY PKWY 801-373-     7044 inquiring about the status of their delivery."
        You may either connect the caller to the order taker or you may Give Details of the problem/ issue.

FIG. 42

Order Inn Room Service        11:29 AM 6/2/2004
If OrderTaker doesn't give his/her name just type in "REFUSED"

Room#1234
        Phone        805-882-2000

Message: <<WONDERING WHERE HER ORDER IS; IT'S ON IT'S WAY
        Say "One moment, let me connect you to your order take."
        Put caller on hold, then call the restaurant & come back to DLS.
        Say "Hello, this is Order Inn Operator, we have STEPHANIE from Room <<1234
        at << BEST WESTERN INN 2230 N UNIVERSITY PKWY 801-373-     7044 inquiring about the status of their delivery."
        You may either connect the caller to the order taker or you may relay the answer to the caller What is your name? JOE Was the issue resolved:

FIG. 43

| Order Inn Room Service | 11:29 AM 6/2/2004 |
|---|---|

Firstname   STEPHANIE        Lastname    STANTANA
    Room#1234
    Phone         805-882-2000

Message: <<WONDERING WHERE HER ORDER IS; IT'S ON IT'S WAY
    Say "One moment, let me connect you to your order take."
    Put caller on hold, then call the restaurant & come back to DLS.
    Say "Hello, this is Order Inn Operator, we have STEPHANIE
from Room <<1234
    at << BEST WESTERN INN 2230 N UNIVERSITY PKWY 801-
373-    7044 inquiring about the status of their delivery."
    You may either connect the caller to the order taker or you may
    relay the answer to the caller A> YES:       Taken care of by Restaurant or Order In Cust Svc Rep
B> NO: Not taken care of by Restaurant or Cust Svc Rep Was the issue resolved:

FIG. 44

| Order Inn Room Service | 11:29 AM 6/2/2004 |
|---|---|

FINISH THE ENTIRE CALL

FIG. 45

```
Order Inn Room Service                         11:29 AM 6/2/2004

Enter your initials: SDS        E E084883
11:41            06/02
Are you calling to place a room service order:

What's the extension number after the phone number on your menu?

01> ORDER ROOM SERVICE
                                    02> STATUS OF DELIVERY
                                    03> ADD TO ORDER
                                    04> CANCEL MY ORDER
                                    05> OTHER
```

FIG. 46

```
Order Inn Room Service                         11:29 AM 6/2/2004

Enter your initials: SDS        E E084883
11:41            06/02
Are you calling to place a room service order: ADD What's the extension number after the phone number on your menu?

A0> NONE
                                            A1> 100
                                            A2> 101
                                            A4> 104
                                            A5> 105
                                            A6> 106
                                            A7> 107
                                            A8> 107
                                            B0> 110
```

FIG. 47

```
Order Inn Room Service                          11:29 AM 6/2/2004

What hotel are you calling from:

B2>    BEST WESTERN INN 2230 N UNIV. PKWY 801-373-7044
  D1>    DAYS INN 1675 N 200 W 801-375-8600
  E1>    ECONOLODGE 1625 W CENTER 801-373-0099
  E2>    EXECUTIVE INN 250 S UNIVERSITY AVE 801-373-9672
  L1>    LA QUINTA 1555 N CANYON RD 801-374-6020
  N1>    NATIONAL 9 INN 1380 S UNIVERSITY DR 801-374-6800
  S1>    SLEEP INN 1505 S 40 EAST 801-377-6597
```

FIG. 48

```
Order Inn Room Service                          11:29 AM 6/2/2004

What hotel are you calling from:
        BEST WESTERN INN 2230 N UNIVERSITY PKWY 801-373-7044

What is your hotel room/unit #:        1234

Are you a guest at the hotel:

First & last name of REGISTERED Guest:

**Continue with the order?

A> YES, HOTEL GUEST
                              B> NO, EMPLOYEE OF THE HOTEL
```

FIG. 49

```
Order Inn Room Service                        11:29 AM 6/2/2004

What hotel are you calling from:
        BEST WESTERN COTTONTREE INN 2230 N UNIVERSITY
PKWY 801-373-7044

What is your hotel room/unit #:        1234

Are you a guest at the hotel:    GUE         Phone  - -

First & last name of REGISTERED Guest: STEPHANIE
        SANTANA
            **Continue with the order?

BEST WESTERN INN 2230 N UNIV. PKWY 801-373-7044

┌─────────────────────────────┐
                    │ A> YES; CONTINUE WITH ORDER │
                    │ B> NO; SKIP TO COMMENTS     │
                    └─────────────────────────────┘
```

FIG. 50

```
Order Inn Room Service                        11:29 AM 6/2/2004

CONFIRMATION PAGE

Let me confirm your hotel information. You are in Room 11234 at BEST
WESTERN INN 2230 N UNIV. PKWY 801-373-7044

Is this information correct: YES

Did you confirm this info: YES

┌─────────────────────┐
                                    │ <Enter> for Next Page│
                                    └─────────────────────┘
```

FIG. 51

Order Inn Room Service                              11:29 AM 6/2/2004

R| MUST GET ORDER TAKERS NAME!!! THIS WAY WE CAN CALL THEM IF WE HAVE A PROBLEM, WE KNOW WHO TO ASK FOR AND WHO TOOK THE ORDER!!!!! IF THEY REFUSE, TYPE IN "REFUSED"

service order for you
        from       STEPHANIE       SANTANA
        AT THE << BEST WESTERN COTTONTREE INN 2230 N UNIVERSITY PKWY 801-373-7044>>

Say   "What is your name": ____
       "Please remember to confirm the hotel & room number with the guest"
       Did ordertaker confirm the info with the guest?:

**Continue with the order?

Order Inn Room Service                              11:29 AM 6/2/2004

READ SCRIPT BELOW
Say   "Thank you very much, please remain on the line for just a moment, I will connect you with the order taker"
Say   "This is.......... The Order Inn Operator, I have a room service order for you
       from       STEPHANIE       SANTANA
       AT THE << BEST WESTERN COTTONTREE INN 2230 N UNIVERSITY PKWY 801-373-7044>>

Say   "What is your name": JOE
       "Please remember to confirm the hotel & room number with the guest"
       Did ordertaker confirm the info with the guest?: Y

**Continue with the order?     01> YES
                                              02> NO

FIG. 53

| Order Inn Room Service | 11:29 AM 6/2/2004 |
|---|---|

| Order Inn Room Service | 11:29 AM 6/2/2004 |
|---|---|

READ SCRIPT BELOW

Say  "Thank you very much, please remain on the line for just a moment, I will connect you with the order taker"

Say  "This is......... The Order Inn Operator, I have a room service order for you
from    STEPHANIE    SANTANA
AT THE << BEST WESTERN COTTONTREE INN 2230 N UNIVERSITY PKWY 801-373-7044>>

Say  "What is your name": JOE
"Please remember to confirm the hotel & room number with the guest"
Did ordertak

A> YES; CONTINUE WITH THE ORDER
    B> NO; SKIP TO COMMENTS

**Continue with the order?

FIG. 54

| Order Inn Room Service | 11:29 AM 6/2/2004 |
|---|---|

Inventory for Category 100
Item    Descript    Qty    Price
100001 Brisket, 1Lb.    999999 12.10
100002 Brisket, 1/2 Lb.    999999 7.95
100009 Combo Platter    999999 18.80
100010 Corned Beef    999999 13.40
<Alt PgUp>Sort<Alt PgDn>Find<?>Image<Space>More<Enter>Select Difference    0.00
0    Payment Type

| Employee disc | 0.00 | Delivery | 0.00 | SalesTax | 0.00 |
|---|---|---|---|---|---|
| Markup | 0.00 | Container | 0.00 | CallCtr | 0.00 |
| Delivery | 0.00 | Container | 0.00 | Rt | 0.00 |
| Del to OI | 0.00 | Emp Cal | 0.00 | Rest Emp% | 0.00 |
| OrderInn Emp% | 0.00 | OI Comm | 9.99 | RestComm | 0.00 |

FIG. 55

| Order Inn Room Service | | | | 11:29 AM 6/2/2004 | |
|---|---|---|---|---|---|
| Items | Description | Price | Qty | Amount | |
| 100001 | Brisket, 1LB. | 12.10 | 0 | | |

100001 Brisket, 1 Lb.
Includes 2 Sides: Macaroni And Cheese, Coleslaw, Baked Beans, Applesauce, Potato Chips

0

0                    Payment Type

| Employee disc | 0.00 | Delivery | 0.00 | SalesTax | 0.00 |
|---|---|---|---|---|---|
| Markup | 0.00 | Container | 0.00 | CallCtr | 0.00 |
| Delivery | 0.00 | Container | 0.00 | Rt | 0.00 |
| Del to OI | 0.00 | Emp Cal | 0.00 | Rest Emp% | 0.00 |
| OrderInn Emp% | 0.00 | OI Comm | 9.99 | RestComm | 0.00 |

FIG. 56

| Order Inn Room Service | | | | 11:29 AM 6/2/2004 |
|---|---|---|---|---|
| Items | Description | Price | Qty | Amount |
| 100001 | Brisket, 1LB. | 12.10 | 0 | |
| | Subtotal | 0.00 | | |
| | Restaurant Quote | 0.00 | | |
| 0 | Order Inn Total | 0.00 | | |
| | Difference | 0.00 | | |
| 0 | Payment Type | | | |

| Employee disc | 0.00 | Delivery | 0.00 | SalesTax | 0.00 |
|---|---|---|---|---|---|

Enter the amount that the restaurant quotes to the caller. If they do not give a total, just press [Enter] to bypass this field.

FIG. 57

```
Order Inn Room Service                              11:29 AM 6/2/2004
    ┌─────────────────────────────────────┐
 It │ Go to NEXT page to finish           │
    └─────────────────────────────────────┘
         Amount
100001 Brisket, 1LB.         12.10              0

Subtotal            0.00
                     Restaurant Quote    0.00
 0                   Order Inn Total     0.00
                     Difference          0.00
 0                   Payment Type
-----------------------------------------------------------------
Employee disc  0.00   Delivery     0.00    SalesTax      0.00
=================================================================
Markup         0.00   Container    0.00    CallCtr       0.00
Delivery       0.00   Container    0.00    Rt            0.00
Del to OI      0.00   Emp Cal      0.00    Rest Emp%     0.00
OrderInn Emp%0.00     OI Comm      9.99    RestComm      0.00
```

FIG. 58

```
Order Inn Room Service                              11:29 AM 6/2/2004

Delivery time quoted:

Result of Call:

Reason for Cancel:

Other Comments:

┌──────────────────────────────────────┐
Comments:                │ 01> 30 MINTUES                       │
                         │ 02> 45 MINUTES                       │
                         │ 03> 1 HOUR                           │
                         │ 04> 1 HOUR 15 MINUTES                │
                         │ 05> 1 HOUR 30 MINUTES                │
                         │ 06> MORE THAN 1 HOUR 30 MINUTES      │
                         │ 07> NOT QUOTED                       │
                         └──────────────────────────────────────┘
```

FIG. 59

| Order Inn Room Service | 11:29 AM 6/2/2004 |

Delivery time quoted: 0.50

Result of Call:

Reason for Cancel:

Other Comments:

Comments:

> A> GOOD ORDER
> B> STATUS OF DELIVERY
> C> CUSTOMER SERVICE
> D> ADD TO ORDER
> E> CANCEL ORDER

FIG. 60

| Order Inn Room Service | 11:29 AM 6/2/2004 |

Delivery time quoted:       0.50

Result of Call:       00

Reason for Cancel:

Other Comments:

Comments:

> 01> NONE
> 02> STATUS      :WONDERING WHERE THEIR ORDER IS
> 03> PROBLEM    :RESTAURANT CLOSED (Should be OPEN)
> 04> PROBLEM    : RESTAURANT CLOSED (After Restaurant Hours)
> 05> COMPLAINT :BAD FOOD, FOOD QUALITY OR SERVICE
> 06> COMPLAINT :ORDER TAKER NEEDS TRAINING
> 07> COMPLAINT : ORDER TAKER WAS RUDE TO CUSTOMER

FIG. 61

| Order Inn Room Service | 11:29 AM 6/2/2004 |
|---|---|

Delivery time quoted: 0.50

Result of Call: 00

Reason for Cancel:

Other Comments:

Comments:

Enter all comments & issues pertaining to this call.

FIG. 62

| Order Inn Room Service | 11:29 AM 6/2/2004 |
|---|---|

FINISH THE ENTIRE CALL

FIG. 63

```
Order Inn Room Service                    11:29 AM 6/2/2004

Enter your intials:  SDS E  E084884
11:45   06/02
Are you calling to place a room service order:

What's the extension number after the phone number

01>    ORDER ROOM SERVICE
                              02>    STATUS OF DELIVERY
                              03>    ADD TO ORDER
                              04>    CANCEL MY ORDER
                              05>    OTHER
```

FIG. 64

```
Order Inn Room Service                    11:29 AM 6/2/2004

Enter your intials:  SDS          E  E084884
11:45   06/02
Are you calling to place a room service order:  CANCEL What's the extension number after the phone number on your menu?

A0>    NONE
                              A1>    100
                              A2>    101
                              A4>    104
                              A5>    105
                              A6>    106
                              A7>    107
                              A8>    108
                              B0     110
```

FIG. 65

```
Order Inn Room Service                          11:29 AM 6/2/2004

Order Inn Room Service (Room Service)   190 #00000225,11:45 am, 06/
02/2004

What hotel are you calling from:

B2>    BEST WESTERN INN 2230 N UNIV. PKWY 801-373-704
    D1>    DAYS INN 1675 N 200 W 801-375-8600
    E1>    ECONOLODGE 1625 W CENTER 801-373-0099
    E2>    EXECUTIVE INN & SUITES 250 S UNIVERSITY AVE 801-
    373-9672
    L1>    LA QUINTA 1555 N CANYON RD 801-374-6020
    N1>    NATIONAL 9 INN 1380 S UNIVERSITY DR 801-374-6800
    S1>    SLEEP INN 1505 S 40 EAST 801-377-6597
```

FIG. 66

```
Order Inn Room Service                          11:29 AM 6/2/2004

What hotel are you calling from:
        BEST WESTERN INN 2230 N UNIV. PKWY 801-373-7044

What is your hotel room/unit #:  1234

Are you a guest at the hotel:

First & last name of REGISTERED Guest

<<Continue with the order?

A>    YES, HOTEL GUEST
                        B>    NO, EMPLOYEE OF THE HOTEL
```

FIG. 67

```
Order Inn Room Service                          11:29 AM 6/2/2004

What hotel are you calling from:
        BEST WESTERN  INN 2230 N UNIV. PKWY 801-373-7044

What is your hotel room/unit #:  1234

Are you a guest at the hotel:  GUE      Phone        -        -

First & last name of REGISTERED Guest:     STEPHANIE    SANTA
              <<Continue with the order?

BEST WESTERN  INN 2230 N UNIV. PKWY 801-373-7044

┌─────────────────────────────────┐
                            │ A>    YES; CONTINUE WITH ORDER  │
                            │ B>    NO; SKIP TO COMMENTS      │
                            └─────────────────────────────────┘
```

FIG. 68

```
Order Inn Room Service                          11:29 AM 6/2/2004

CONFIRMATION PAGE

Let me confirm your hotel information. You are in Room 1234
At BEST WESTERN  INN 2230 N UNIV. PKWY 801-373-7044

Is this information correct:      YES
Did you confirm this info:        YES
```

FIG. 69

```
Order Inn Room Service                          11:29 AM 6/2/2004

What is your room number      1234    <<1234

Are you at <<BEST WESTERN  INN 2230 N UNIV. PKWY 801-373-7040

And are you SEPHANIE

Reason for canceling
            01>    DELIVERY TAKING TOO LONG
OI Total    02>    GUEST CHANGED MINE
Dtotal      03>    GUEST NOT IN ROOM
Delivery    04>    RESTAURANT NO LONGER ACCEPTS VOUCHER/COUPON
            05>    CREDIT CARD DECLINED
rmu         06>    OTHER: Give details
oimu You must enter a reason; Be specific!!
```

FIG. 70

```
Order Inn Room Service                          11:29 AM 6/2/2004

Say "Thank you very much, your order has been canceled"

Hang up with caller, then call the restaurant & come back to DLS.

Say "Hello, This is Order Inn Operator, we have a cancellation for an
order
From Room 1234
At <<BEST WESTERN  INN 2230 N UNIV. PKWY 801-373-7044

What is your name:
```

FIG. 71

Order Inn Room Service　　　　　　　　　　　　　　11:29 AM 6/2/2004

Say "Thank you very much, your order has been canceled"

Hang up with caller, then call the restaurant & come back to DLS.

Say "Hello, This is Order Inn Operator, we have a cancellation for an order
From Room 1234
At <<BEST WESTERN  INN  2230 N UNIV. PKWY  801-373-7044

What is your name: JOE_

> If Order Taker doesn't give his/her name, type in "REFUSED"

Order Inn Room Service　　　　　　　　　　　　　　11:29 AM 6/2/2004

Delivery time quoted:

Result of Call:

Reason for Cancel:

```
01>    CANCEL:CHANGED MIND
02>    CANCEL:DELIVERY TIME TOO LONG, CUSTOMER CANCELED
03>    CANCEL:CUSTOMER HUNG UP
04>    CANCEL:$12 MINIMUM ORDER
05>    CANCEL:GUEST NOT IN ROOM
06>    CANCEL:CREDIT CARD DECLINED
07>    CANCEL:PRICES TOO HIGH
08>    NONE
```

FIG. 73

```
Order Inn Room Service                          11:29 AM 6/2/2004

Delivery time quoted:

Result of Call:

Reason for Cancel:  ,CM

Other Comments
   ┌─────────────────────────────────────────────────────────────┐
   │ 01>    NONE                                                 │
   │ 02>    STATUS       :WONDERING WHERE THEIR ORDER IS         │
 C │ 03>    PROBLEM      :RESTAURANT CLOSED (Should be OPEN)     │
   │ 04>    PROBLEM      :RESTAURANT CLOSED (After Restaurant Hours)│
   │ 05>    COMPLAINT    :BAD FOOD, FOOD QUALITY OR SERVICE      │
   │ 06>    COMPLAINT    :ORDER TAKER NEEDS TRAINING             │
   │ 07>    COMPLAINT    :ORDER TAKER WAS RUDE TO CUSTOMER       │
   └─────────────────────────────────────────────────────────────┘
```

FIG. 74

```
Order Inn Room Service                          11:29 AM 6/2/2004

Result of Call:

Reason for Cancel:  ,CM
Other Comments :

Comments:
       RESTAURANT NO LONGER ACCEPTS VOUCHER/COUPON

┌──────────────────────────────────────────────┐
                   │ Enter all comments & issues pertaining to this call. │
                   └──────────────────────────────────────────────┘
```

FIG. 75

| Order Inn Room Service | 11:29 AM 6/2/2004 |

FINISH THE ENTIRE CALL

FIG. 76

| Order Inn Room Service | 11:29 AM 6/2/2004 |

Enter your intials:  SDS          E          E084885
11:47   06/02
Are you calling to place a room service order:

What's the extension number after the phone number

| 01> | ORDER ROOM SERVICE |
| 02> | STATUS OF DELIVERY |
| 03> | ADD TO ORDER |
| 04> | CANCEL MY ORDER |
| 05> | OTHER |

FIG. 77

```
Order Inn Room Service                          11:29 AM 6/2/2004

Enter your initials:    SDS           E  E084885
11:47  06/02
Are you calling to place a room service order:  CUST SVC What's the extension number after the phone number on your menu?

┌─────────────────┐
                                          │ A0>    NONE     │
                                          │ A1>    100      │
                                          │ A2>    101      │
                                          │ A4>    104      │
                                          │ A5>    105      │
                                          │ A6>    106      │
                                          │ A7>    107      │
                                          │ A8>    108      │
                                          │ B0>    110      │
                                          └─────────────────┘
```

FIG. 78

```
Order Inn Room Service                          11:29 AM 6/2/2004

What hotel are you calling from:
        BEST WESTERN INN 2230 N UNIV. PKWY  801-373-7044
What is your hotel/room unit#:  (not shown)
Are you a guest at the hotel:  GUE   Phone - -
First & last name of REGISTERED Guest: (Not shown)
        **Continue with the order?

┌──────────────────────────────────────────────────────────────┐
  │ B2>    BEST WESTERN  INN 2230 N UNIV. PKWY 801-373-7044      │
  │ D1>    DAYS INN 1675 N 200 W 801-375-8600                    │
  │ E1>    ECONOLODGE 1625 W CENTER 801-373-0099                 │
  │ E2>    EXECUTIVE INN & SUITES 250 S UNIV. AVE 801-373-9672   │
  │ L1>    LA QUINTA 1555 N CANYON RD 801-374-6020               │
  │ N1>    NATIONAL 9 INN 1380 S UNIV. DR 801-374-6800           │
  │ S1>    SLEEP INN 1505 S 40 EAST 801-377-6597                 │
  └──────────────────────────────────────────────────────────────┘
```

FIG. 79

```
Order Inn Room Service                          11:29 AM 6/2/2004

What hotel are you calling from:
         BEST WESTERN  INN 2230 N UNIV. PKWY 801-373-7044
What is your hotel room/unit#:           1234
Are you a guest at the hotel:
                              A> YES, HOTEL GUEST
                              B> NO, EMPLOYEE OF THE HOTEL
First & last name of REGISTERED Guest:
      **Continue with the order?

┌─────────────────────────────┐
                              │ A > YES, HOTEL GUEST        │
                              │ B > NO, EMPLOYEE OF THE HOTEL│
                              └─────────────────────────────┘
```

FIG. 80

```
Order Inn Room Service                          11:29 AM 6/2/2004

What hotel are you calling from:
         BEST WESTERN  INN 2230 N UNIV. PKWY 801-373-7044
What is your hotel room/unit#:           1234
Are you a guest at the hotel:  GUE           Phone - -
First & last name of REGISTERED Guest:       STEPHANIE
      SANTANA
      **Continue with the order?

┌─────────────────────────────┐
                              │ A> YES; CONTINUE WITH ORDER │
                              │ B>  NO; SKIP TO COMMENTS    │
                              └─────────────────────────────┘
```

FIG. 81

```
Order Inn Room Service                              11:29 AM 6/2/2004

CONFIRMATION PAGE

Let me confirm your hotel information.  You are in Room 1234
at BEST WESTERN INN 2230 UNIV. PKWY 801-373-7044

Is this information correct:             YES
Did you confirm this information:         YES
```

FIG. 82

```
Order Inn Room Service                              11:29 AM 6/2/2004

Firstname: STEPHANIE         Last Name:  SANTANA         Room
#1234
      Phone: 805-966-9136
Message: <<
          Say "One moment, let me connect you to your order taken."
          Put caller on hold, then call the restaurant & come back to DLS.
          Say "Hello, this is Order Inn Operator, we have STEPHANIE
          from Room <<1234
          at BEST WESTERN INN 2230 N UNIV. PKWY 801-373-7044
          You may either connect the caller to the order taker or you may
relay the answer to the caller
What is your name?:
Was the issue resolved?
```

FIG. 83

```
Order Inn Room Service                            11:29 AM 6/2/2004

Firstname:  STEPHANIE      Lastname:    SANTANA
         #Room 1234
         Phone: 805-966-9136
Message:  <<WAS DOUBLE CHARGED Say "One moment, let me connect you to your order taker."
Put caller on hold, then call the restaurant & and come back to DLS.
Say "Hello, this is Order Inn Operator, we have STEPHANIE
at BEST WESTERN  INN 2230 N UNIV. PKWY 801-373-7044
inquiring about the status of their delivery."
You may either connect the caller to the order taker or you may relay the
answer to the caller.

Give Details of the problem/issue.
```

FIG. 84

```
Order Inn Room Service                            11:29 AM 6/2/2004

If OrderTaker doesn't give his/her name just type in "REFUSED"

Message:  <<WAS DOUBLE CHARGED
         Say "One moment, let me connect you to your order taker."
Put caller on hold, then call the restaurant & come back to DLS.
Say "Hello, this is Order Inn Operator, we have   STEPHANIE from
Room <<1234
at BEST WESTERN  INN 2230 N UNIV. PKWY 801-373-7044
inquiring about the status of their delivery.
You may either connect the caller to the order taken or you may relay the
answer to the caller.

What is your name? :
Was the issue resolved:
```

FIG. 85

```
Order Inn Room Service                              11:29 AM 6/2/2004

Firstname   STEPHANIE        Lastname    SANTANA Room 1234
        Phone 805-966-9136
Message:  <<WAS DOUBLE CHARGED
        Say "One moment, let me connect you to your order taker."
        Put caller on hold, then call the restaurant & come back to DLS.
        Say "Hello, this is Order Inn Operator, we have   STEPHANIE
        from Room <<1234 at <<BEST WESTERN  INN 2230 N
        UNIV.   PKWY 801-373-7044 inquiring about the status of their
delivery.
        You may either connect the caller to the order taker or you may
relay the answer
        to the caller.

What is your name? : JOE
        Was the issue resolved:
          A>  YES:  Taken care of by Restaurant or Order Inn Customer
          B>  NO:   Not taken care of by Restaurant or Customer Svc
```

FIG. 86

```
Order Inn Room Service                              11:29 AM 6/2/2004

FINISH THE ENTIRE CALL
```

FIG. 87

```
Order Inn Room Service                           11:29 AM 6/2/2004

Order Inn Room Service (Room Service)  1907 #00000228, 11:50 am,
06/02/2004
Enter your initials:  SDS          E.  E084887
11:50  06/02
Are you calling to place a room service order:
What's the extension number after the phone number? :

┌─────────────────────────────┐
                                    │ 01>  ORDER ROOM SERVICE     │
                                    │ 02>  STATUS OF DELIVERY     │
                                    │ 03>  ADD TO ORDER           │
                                    │ 04>  CANCEL MY ORDER        │
                                    │ 05>  OTHER                  │
                                    └─────────────────────────────┘
```

FIG. 88

```
Order Inn Room Service                           11:29 AM 6/2/2004

Enter your initials:  SDS              E  E084887
11:50  06/02
Are you calling to place a room service order:  ORDER
                                    E>>
What's the extension number after the phone number on your menu?:

┌──────────────┐
                                              │ A0>  NONE    │
                                              │ A1>  100     │
                                              │ A2>  101     │
                                              │ A4>  104     │
                                              │ A5>  105     │
                                              │ A6>  106     │
                                              │ A7>  107     │
                                              │ A8>  108     │
                                              │ B0>  110     │
                                              └──────────────┘
```

FIG. 89

Order Inn Room Service            11:29 AM 6/2/2004

What hotel are you calling from:

> B2> BEST WESTERN INN 2230 N UNIV. PKWY 801-373-7044
> D1> DAYS INN 1675 N 200 W 801-375-8600
> E1> ECONOLODGE 1625 W CENTER 801-373-0099
> E2> EXECUTIVE INN & SUITES 250 S UNIV. AVE 801-373-9672
> L1> LA QUINTA 1555 N CANYON RD 801-374-6020
> N1> NATIONAL 9 INN 1380 S UNIV. DR 801-374-6800
> S1> SLEEP INN 1505 S 40 EAST 801-377-6597

First & last name of REGISTERED Guest:
    **Continue with the order?

Order Inn Room Service            11:29 AM 6/2/2004

What hotel are you calling from:
    BEST WESTERN INN 2230 N UNIV. PKWY 801-373-7044

What is your hotel room/unit #: FRONT

Are you a guest at the hotel:

First & last name of REGISTERED Guest
    **Continue with the order?

> A> YES, HOTEL GUEST
> B> NO, EMPLOYEE OF THE HOTEL

FIG. 91

```
Order Inn Room Service                    11:29 AM 6/2/2004

What hotel are you calling from:
        BEST WESTERN  INN 2230 N UNIV. PKWY 801-373-7044

What is your hotel room/unit#:   FRONT

Are you a guest at the hotel:     EMP              Phone

First & last name of REGISTERED Guest:          STEPHANIE
    SANTANA
        **Continue with the order?

BEST WESTERN  INN 2230 N UNIV. PKWY 801-373-7044

┌─────────────────────────────────┐
                        │ A >  YES; CONTINUE WITH ORDER   │
                        │ B >  NO; SKIP TO COMMENTS       │
                        └─────────────────────────────────┘
```

FIG. 92

```
Order Inn Room Service                    11:29 AM 6/2/2004

CONFIRMATION PAGE

Let me confirm your hotel information.  You are in Room FRONT at BEST WESTERN  2230 N UNIV. PKWY 801-373-7044

Is this information correct:  YES

Did you confirm this info:   YES
```

FIG. 93

| Order Inn Room Service | 11:29 AM 6/2/2004 |

MUST GET ORDER TAKERS NAME!!! THIS WAY WE CAN CALL THEM IF WE HAVE A PROBLEM, WE KNOW WHO TO ASK FOR AND WHO TOOK THE ORDER!!!!! IF THEY REFUSE, TYPE IN "REFUSED"

will connect you with the order taker"

Say    "This is .........The Order Inn Operator, I have a room service order for you from STEPHANIE SANTANA in room FRONT at the <<BEST WESTERN INN 2230 N UNIV. PKWY 801-373-70

Say    "What is your name":
"Please remember to confirm the hotel & room number with the guest"
Did order taker confirm the info with the guest?:

**Continue with the order?

FIG. 94

| Order Inn Room Service | 11:29 AM 6/2/2004 |

READ SCRIPT BELOW

Say    "Thank you very much, please remain on the line for just a moment, I will connect you with the order taker"

Say    "This is ........ The Order Inn Operator, I have a room service order for you from STEPAHNIE SANTANA in room FRONT at the <<BEST WESTERN INN 2230 N UNIV. PKWY 801-373-70

Say    "What is your name": JOE
"Please remember to confirm the hotel & room number with the guest"
Did order taker confirm the info with the Guest?:

**Continue with the order?

01> YES
02> NO

FIG. 95

```
Order Inn Room Service                          11:29 AM 6/2/2004

READ SCRIPT BELOW

Say   "Thank you very much, please remain on the line for just a
      moment, I will connect you with the order taker"

Say   "This is....... The Order Inn Operator, I have a room service order
      for you from STEPHANIE SANTANA in room FRONT at the
      <<BEST WESTERN  INN 2230 N UNIV. PKWY 801-373-70

Say   "What is your name":  JOE
      "Please remember to confirm the hotel & room number with the
      guest"
      Did order taker confirm the info with the guest?:  Y "Continue with the Order?
                          ┌─────────────────────────────────┐
                          │ A> YES; CONTINUE WITH THE ORDER │
                          │ B> NO; SKIP TO COMMENTS         │
                          └─────────────────────────────────┘
```

FIG. 96

```
Order Inn Room Service                          11:29 AM 6/2/2004

Items          Description         Price         Qty
               Amount
┌──────────────────────────────────────────────────────────────┐
│ Inventory for Category 100                                   │
│ Item     Descript       Qty      Price                       │
│ 100001 Brisket, 1Lb.    999999 12.10                         │
│ 100002 Brisket, 1/2 Lb. 999999 7.95                          │
│ 100009 Combo Platter    999999 18.80                         │
│ 100010 Corned Beef      999999 13.40                         │
│ <Alt PgUp>Sort<Alt PgDn>Find<?>Image<Space>More<Enter>Select │
│                                                              │
└──────────────────────────────────────────────────────────────┘
--------------------------------------------------------------------
Employee disc 0.00   Delivery      0.00   SalesTax     0.00
====================================================================
Markup          0.00  Container    0.00   CallCtr      0.00
Delivery        0.00  Container    0.00   Rt           0.00
Del to OI       0.00  Emp Cal      0.00   Rest Emp%    0.00
OrderInn Emp%0.00     OI Comm      9.99   RestComm     0.00
```

FIG. 97

```
Order Inn Room Service                              11:29 AM 6/2/2004

Items        Description         Price         Qty
         Amount
100001 Brisket, 1LB.             12.10          0

Subtotal            0.00
                        Restaurant Quote    0.00
0                       Order Inn Total     0.00
                        Difference          0.00
0                       Payment Type Employee disc  0.00   Delivery      0.00    SalesTax      0.00
==================================================================
M┌─────────────────────────────────────────────────────────────┐
D│ Enter the amount that the restaurant quotes to the caller.  │
D│ If they do not give a total, just press [Enter] to bypass   │
 │ this field.                                                 │
O└─────────────────────────────────────────────────────────────┘
```

FIG. 98

```
Order Inn Room Service                              11:29 AM 6/2/2004
  ┌─────────────────────────────┐
It│ Go to NEXT page to finish   │
  └─────────────────────────────┘
100001 Brisket, 1LB.             12.10          0

Subtotal           12.10
                        Restaurant Quote   15.01
0                       Order Inn Total    16.48
                        Difference         -1.47
0                       Payment Type Employee disc  0.00   Delivery      0.00    SalesTax      0.00
==================================================================
Markup         0.00   Container     0.00    CallCtr       0.00
Delivery       0.00   Container     0.00    Rt            0.00
Del to OI      0.00   Emp Cal       0.00    Rest Emp%     0.00
OrderInn Emp%0.00     OI Comm       9.99    RestComm      0.00
```

FIG. 99

Order Inn Room Service    11:29 AM 6/2/2004

Delivery time quoted:

Result of Call:

Reason for Cancel:

Other Comments:

Comments:

```
01> 30 MINUTES
02> 45 MINUTES
03> 1 HOUR
04> 1 HOUR 15 MINUTES
05> 1 HOUR 30 MINUTES
06> MORE THAN 1 HOUR 30 MINUTES
07> NOT QUOTED
```

FIG. 100

Order Inn Room Service    11:29 AM 6/2/2004

Delivery time quoted:

Result of Call:

Reason for Cancel

Other Comments

Comments:

```
A >    GOOD ORDER
B >    STATUS OF DELIVERY
C >    CUSTOMER SERVICE
D >    ADD TO ORDER
E >    CANCEL ORDER
```

FIG. 101

Order Inn Room Service                          11:29 AM 6/2/2004

Delivery time quoted:

Result of Call: 00

Reason for Cancel:

Other Comments:

Comments:

| | |
|---|---|
| 01> | NONE |
| 02> | STATUS: WONDERING WHERE THEIR ORDER IS |
| 03> | PROBLEM:     RESTAURANT CLOSED (Should be OPEN) |
| 04> | PROBLEM:     RESTAURANT CLOSED (After Restaurant Hours |
| 05> | COMPLAINT: BAD FOOD, FOOD QUALITY OR SERVICE |
| 06> | COMPLAINT: ORDER TAKER NEEDS TRAINING |
| 07> | COMPLAINT: ORDER TAKER WAS RUDE TO CUSTOMER |

FIG. 102

Order Inn Room Service                          11:29 AM 6/2/2004

Enter all comments & issues pertaining to this call.

Result of Call:   00

Reason for Cancel:

Other Comments:

Comments:

FIG. 103

| Order Inn Room Service | 11:29 AM 6/2/2004 |

| FINISH THE ENTIRE CALL |

FIG. 104

| Order Inn Room Service | 11:29 AM 6/2/2004 |

TRAINING

Enter your initials:   SDS   E   E000624

12:00   06/02

Are you calling to place a room service order:

What's the extension after the phone number?

| 01> | ORDER ROOM SERVICE |
| 02> | STATUS OF DELIVERY |
| 03> | ADD TO ORDER |
| 04> | CANCEL MY ORDER |
| 05> | OTHER |

FIG. 105

```
Order Inn Room Service                           11:29 AM 6/2/2004

TRAINING

Enter your initials:      SDS      E        E000624

12:00   06/02

Are you calling to place a room service order:    ORDER

What's the extension number after the phone number on your menu?

```
Order Inn Room Service                           11:29 AM 6/2/2004

TRAINING

What hotel are you calling from:
    A4>    ARROYO ROBLE RESORT 100 ARROYO ROBLE  928-282-7777
    B1>    BEST WESTERN 400 N HWY 89A  928-282-4001
    B2>    BEST WESTERN SODONA (A) 1200 W HWY 89A  (928)-282-3072
    C1>    CEDARS RESORT HWY 89A @ HWY 179  (928)282-7010
    D1>    DAYS INN 2991 W HWY 89A  (928) 282-9166
    F1>    FAIRFIELD SEDONA 1500 KESTRAL CIR  (928)203-1026
    H1>    HAMPTON INN 1800 W HWY 89A  928-282-4700
    H2>    HOUSE DELIVERY  (PUT ADDRESS IN COMMENT FIELD)
    I1>    IRIS GARDEN INN 390 JORDAN RD  (928)282-2552

First & last name of REGISTERED Guest:

**Continue with the order?

Sedona, Arizona
```

FIG. 107

Order Inn Room Service                          11:29 AM 6/2/2004

TRAINING

What hotel are you calling from:
                HOUSE DELIVERY (PUT ADDRESS IN COMMENT FIELD)

What is your hotel room/unit #:        1234

Are you a guest at the hotel:

First & last name of REGISTERED Guest:

**Continue with the order?

> A>    YES, HOTEL GUEST
> B>    NO, EMPLOYEE OF THE HOTEL

FIG. 108

Order Inn Room Service                          11:29 AM 6/2/2004

TRAINING

What hotel are you calling from:
        HOUSE DELIVERY (PUT ADDRESS IN COMMENT FIELD)
What is you hotel room/unit#:  1234
Are you a guest at the hotel:  GUE      Phone - -

> What number can we reach you at in the event we need to contact you?
>
> If caller doesn't know the number, then get caller id from Infinity..
>
> If caller id not available...then leave blank

FIG. 109

```
Order Inn Room Service                              11:29 AM 6/2/2004

TRAINING

What hotel are you calling from:
         HOUSE DELIVERY (PUT ADDRESS IN COMMENT FIELD)
What is you hotel room/unit#: 1234
Are you a guest at the hotel:  GUE      Phone  888-123-4515

First & last name of REGISTERED Guest:  STEPHANIE SANTANA

**Continue with the order?
HOUSE DELIVERY (PUT ADDRESS IN COMMENTS)

A> YES; CONTINUE WITH ORDER
                                 B> NO; SKIP TO COMMENTS
```

FIG. 110

```
Order Inn Room Service                              11:29 AM 6/2/2004

TRAINING

CONFIRMATION PAGE

Let me confirm your hotel information. You are in Room 1234
at HOUSE DELIVERY (PUT ADDRESS IN COMMENT FIELD)

Is this information correct:      YES
Did you confirm this info:        YES
```

FIG. 111

| Order Inn Room Service | 11:29 AM 6/2/2004 |
|---|---|

MUST GET ORDER TAKERS NAME!! THIS WAY WE CAN CALL THEM IF WE HAVE A PROBLEM, WE KNOW WHO TO ASK FOR AND WHO TOOK THE ORDER!!!! IF THEY REFUSE, TYPE IN "REFUSED"

will connect you with order taker"

Say, "This is........The Order In Operator, I have room service order for you
from STEPHANIE SANTANA
in room 1234
at the <<HOUSE DELIVERY (PUT ADDRESS IN COMMENT FIELD)

Say, "what is your name":
"Please remember to confirm the hotel & room number with the guest"
Did order taker confirm the info with the guest?:

**Continue with the order?

FIG. 112

| Order Inn Room Service | 11:29 AM 6/2/2004 |
|---|---|

TRAINING

READ SCRIPT BELOW

Say "Thank you very much, please remain on the line for just a moment, I will connect you with the order taker"

Say "This is ............The Order Inn Operator, I have room service order for you
from    STEPHANIE    SANTANA
in room 1234
at the <<HOUSE DELIVERY (PUT ADDRESS IN COMMENT FIELD)

Say "What is your name":  JOE
"Please remember to confirm the hotel & room number with the guest"
Did order taker confirm the info with the guest?:

01> YES
02> NO

FIG. 113

Order Inn Room Service              11:29 AM 6/2/2004

TRAINING
READ SCRIPT BELOW

Say "Thank you very much, please remain on the line for just a moment, I will connect you with the order taker:

Say "This is...........The Order Inn Operator, I have room service order for you
from     STEPHANIE     SANTANA
in room 1234
at the <<HOUSE DELIVERY (PUT ADDRESS IN COMMENT FIELD)

Say "What is your name":    A> YES; CONTINUE WITH THE ORDER
"Please remember to confir   B> NO; SKIP TO COMMENTS
Did order taker confirm the info with the guest?:

**Continue with the order?

FIG. 114

| Item | Descript | Qty | Price |
|---|---|---|---|
| 106001 | Buffalo Chicken Tenders | 999994 | 10.20 |
| 106002 | Buffalo Wings, 10 Piece | 999987 | 7.40 |
| 106003 | Buffalo Wings, 20 Piece | 999994 | 12.90 |
| 106004 | Buffalo Wings, 40 Piece | 999997 | 19.40 |
| 106005 | Burger, Bacon | 999994 | 9.95 |
| 106006 | Burger, Bacon and Cheese | 999995 | 10.30 |
| 106007 | Burger, Double Burger | 999993 | 10.95 |
| 106008 | Burger, Mushroom Burger | 999986 | 9.70 |
| 106109 | Burger, Cheese | 999990 | 9.20 |
| 106010 | Calzone, All Meat | 999994 | 15.40 |

<Alt-PgUp>Sort<Alt-PgDn>Find<?>Image<Space>More<Enter>Select

| Employee disc | 0.00 | Delivery | 0.00 | Sales Tax | 0.00 |
|---|---|---|---|---|---|
| Markup | 0.00 | Container | 0.00 | CallCtr | 0.00 |
| Delivery | 0.00 | Container | 0.00 | Rt | 0.00 |
| Del to OI | 0.00 | Emp Cal | 0.00 | Rest Emp% | 0.00 |
| OrdrInn Emp% | 0.00 | OI Comm | 0.00 | RestComm | 0.00 |
| Per Rest | 0.00 | Gross | 0.00 | OIMU | 0.00 |

FIG. 115

```
Order Inn Room Service                    11:29 AM 6/2/2004

Items      Description          Price          Qty            Amount
100001     Buffalo Chicken Tenders   10.20     2              20.40

Subtotal         20.40
                        Restaurant Quote 23.00
    0                   Order Inn Total  0.00
                        Difference       0.00
    0                   Payment Type ─────────────────────────────────────    ┌──────────────────────────┐
Employee disc   0.00    Delivery 0.00    │ 01>    CASH              │
═════════════════════════════════════    │ 02>    CREDIT            │
Markup         0.00    Container          │ 03>    UNKNOWN           │
Delivery 0.00  Container     0.00         │ 04>    TRAVELERS CHECK   │
Del to OI 0.00 Emp Cal 0.00  Rest Er     │ 06>    AIRLINE VOUCHER   │
OrderInn Emp%0.00      OI Comm    └──────────────────────────┘
                                 9.99    RestComm       0.00
```

FIG. 116

```
Order Inn Room Service                    11:29 AM 6/2/2004

Order Inn Room Service                    11:29 AM 6/2/2004

Items      Description          Price          Qty            Amount
100001     Buffalo Chicken Tenders   10.20     2              20.40

Subtotal         20.40
                        Restaurant Quote 23.00
    0                   Order Inn Total  25.81
                        Difference       -2.81
    0                   Payment Type ─────────────────────────────────────────────────────────────────
Employee disc   0.00    Delivery 0.00    SalesTax0.00
═════════════════════════════════════════════════════════════════
Markup         0.00    Container     0.00    CallCtr        0.00
Delivery 0.00  Container     0.00    Rt             0.00
Del to OI 0.00 Emp Cal 0.00  Rest Emp%   0.00
OrderInn Emp%0.00      OI Comm    9.99    RestComm       0.00

┌──────────────────────────┐
                                    │ Go to NEXT page to finish │
                                    └──────────────────────────┘
```

FIG. 117

```
Order Inn Room Service                    11:29 AM 6/2/2004

TRAINING

Delivery time quoted:

Result of Call:

Reason for Cancel:

Other Comments:
                    ┌─────────────────────────────────────┐
                    │ 01>  30 MINUTES                     │
Comments:           │ 02>  45 MINUTES                     │
                    │ 03>  1 HOUR                         │
                    │ 04>  1 HOUR 15 MINUTES              │
                    │ 05>  1 HOUR 30 MINUTES              │
                    │ 06>  MORE THAN 1 HOUR 30 MINUTES    │
                    │ 07>  NOT QUOTED                     │
                    └─────────────────────────────────────┘
```

FIG. 118

```
Order Inn Room Service                    11:29 AM 6/2/2004

TRAINING

Delivery time quoted:   0.50

Result of Call:

Reason for Cancel:

Other Comments:

Comments:
                              ┌──────────────────────────┐
                              │ A>  GOOD ORDER           │
                              │ B>  STATUS OF DELIVERY   │
                              │ C>  CUSTOMER SERVICE     │
                              │ D>  ADD TO ORDER         │
                              │ E>  CANCEL ORDER         │
                              └──────────────────────────┘
```

FIG. 119

Order Inn Room Service      11:29 AM 6/2/2004

TRAINING

Delivery time quoted: 0.50

Result of Call: 00

Reason for Cancel:

Other Comments:

```
01>  NONE
02>  STATUS : WONDERING WHERE THEIR ORDER IS
03>  PROBLEM: RESTAURANT CLOSED (Should be OPEN)
04>  PROBLEM: RESTAURANT CLOSED (After restaurant Hours)
05>  COMPLAINT: BAD FOOD, FOOD QUALITY OR SERVICE
06>  COMPLAINT: ORDER TAKER NEEDS TRAINING
07>  COMPLAINT: ORDER TAKER WAS RUDE TO CUSTOMER
```

Order Inn Room Service      11:29 AM 6/2/2004

Result of Call: 00

Reason for Cancel:

Other Comments:

Comments:
    ADDR: 345 SMITH ST, SEDONA

Enter all comments & issues pertaining to this call.

FIG. 121

METHODS AND APPARATUS FOR GENERATING FOOD BROKERING MENUS

CROSS-REFERENCE TO RELATED APPLICATIONS

This application claims priority from U.S. Provisional Application No. 60/614,301, filed Sep. 29, 2004.

FEDERALLY SPONSORED RESEARCH OR DEVELOPMENT

Not applicable.

TECHNICAL FIELD

The present application relates in general to methods and apparatus for brokering food services and, in particular, to methods and apparatus for handling customer service issues associated with brokering food services.

BACKGROUND OF THE INVENTION

Many hotels do not offer traditional room service. Guests of these hotels who want to eat in their rooms must bring their own meals or use a traditional delivery service. Traditional delivery services include many pizzerias, local restaurants with a delivery service, and "meta-delivery" services.

Local restaurants and pizzerias with a delivery service operate in a well-known manner. The customer discovers the restaurant from a flier placed by the hotel room door or via a yellow pages advertisement. The customer then calls the restaurant to place an order. An order taker at the restaurant records the order, and a delivery person associated with the restaurant delivers the order and collects the money from the customer.

Meta-delivery services act as a middle-man between the customer and a plurality of restaurants. The meta-delivery service typically prints a menu that includes the menus of several different local restaurants. Often, the included restaurants do not include a delivery service of their own. The customer then calls the meta-delivery service to place his order. An order taker at the meta-delivery service records the customer's order and location information. The order taker at the meta-delivery service then hangs up with the customer and calls the restaurant to relay the order. A delivery person associated with the meta-delivery service pays for and picks up the order at the restaurant. The delivery person then delivers the order to the customer and charges a higher fee than he paid the restaurant.

Both of these traditional delivery services suffer from certain drawbacks. Local restaurants and pizzerias with a delivery service have poor customer service because the order taker and the delivery person typically have no stake in the operation and are not closely monitored by the restaurant owner. As a result, hotel guests become upset by late deliveries, missing items, incorrect charges, rude employees, etc. Hotel managers do not like upset guests, so they typically try to keep the menus of these restaurants out of their rooms.

Meta-delivery services do not "directly connect" the consumer to the restaurant. Therefore, the meta-delivery service order taker (acting as a middle-man) often makes mistakes. For example, the restaurant may be temporarily out of stock on a certain menu item. However, the meta-delivery service order taker takes the order anyway, because he is not at the restaurant and does not know they are out of that item. Similarly, the meta-delivery service order taker cannot reliably quote the customer a delivery time, because he does not know how busy the restaurant is at the time the order is taken. Again, these mistakes result in upset hotel guests and hotel managers. The present invention is provided to solve these and other problems.

BRIEF DESCRIPTION OF THE DRAWINGS

To understand the present invention, it will now be described by way of example, with reference to the accompanying drawings in which:

FIGS. 7-9 illustrate an example in-room menu.

FIGS. 10-12 illustrate an example restaurant report.

FIG. 13 illustrates an example restaurant invoice.

FIGS. 15a-15c are an example of a services directory.

FIGS. 16-34 are a series of example screenshots associated with the script window for taking an order from a hotel guest.

FIGS. 35-45 are a series of example screenshots associated with the script window for processing a status request from a hotel guest.

FIGS. 46-63 are a series of example screenshots associated with the script window for adding to an order.

FIGS. 64-76 are a series of example screenshots associated with the script window for canceling an order.

FIGS. 77-87 are a series of example screenshots associated with the script window for a handling other types of calls (e.g., customer service calls).

FIGS. 88-104 are a series of example screenshots associated with the script window for taking an order from a hotel employee.

FIGS. 105-122 are a series of example screenshots associated with the script window for taking an order from a house.

DETAILED DESCRIPTION

Figure 1:
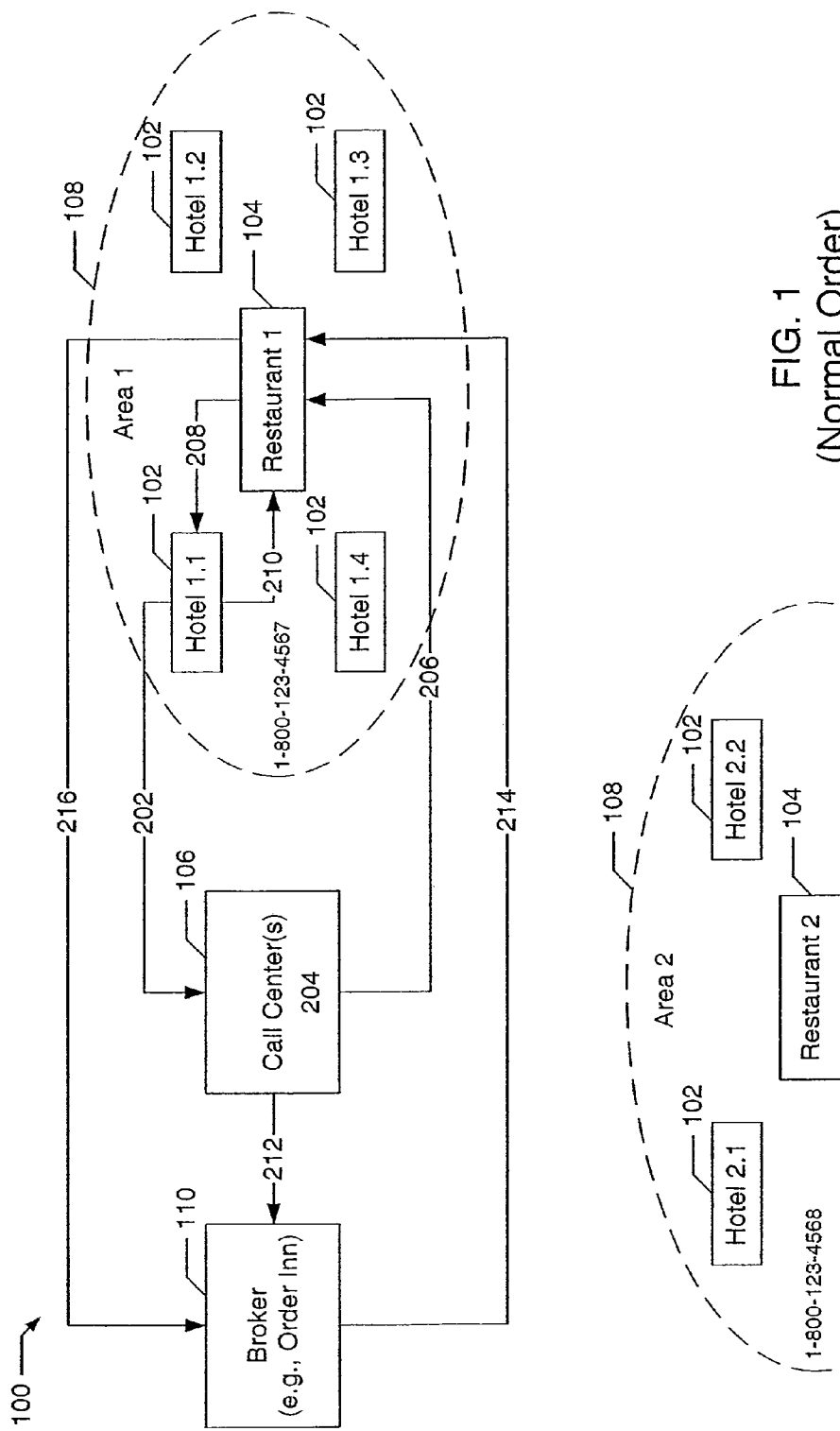
FIG. 1 illustrates an example of the overall order management system.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

In general, the methods and apparatus described herein provide quality controlled room service to guests of hotels that do not otherwise have traditional room service available. A call center operator routes each call to the appropriate restaurant and stays on the phone line to monitor the call. The restaurant delivers the order and collects the appropriate fee. Data captured by the call center is transmitted to a broker, and the broker uses this data to maintain customer service and to determine the amount of money each restaurant collected on behalf of the broker.

FIG. 1 illustrates an example of the overall order management system 100. Generally, room service orders coming from guests of hotels 102 are routed to an area restaurant 104 via a call center 106. An operator employed by the call center 106 connects a hotel guest to the appropriate restaurant 104 for that geographical area 108, and stays on the phone line to monitor the call. A order taker employed by the restaurant 104 takes the hotel guest's order. A delivery person employed by the restaurant 104 delivers the order to the hotel guest and collects the appropriate fee from the hotel guest. In this manner, there is a "direct connection" between the hotel guest and the restaurant order taker. This direct connection reduces order taking errors caused by menu ambiguities, temporary food unavailabilities, fluctuating delivery times, etc. By staying on the phone line to monitor the call, the call center operator is able to record important data related to customer service and brokerage fees which are important to the broker 110 that is running the order management system 100 (e.g., Order Inn, Inc). Each of these aspects of the order management system 100 is described in more detail below.

In the example of FIG. 1, two geographical areas 108 are shown. Of course, a person of ordinary skill in the art will readily appreciate that a large number of geographical areas 108 are typically used in practice (e.g., hundreds of areas covering a large portion of the United States). Each geographical area 108 includes a plurality of hotels 102. Preferably, each of these hotels 102 is a "limited service" hotel that does not have its own kitchen and does not provide traditional room service. Each room of each hotel 102 in the order management system 100 receives a menu. This menu preferably includes a unique toll free telephone number for that area or area number identifier 108.

Each hotel 102 in an area 108 is preferably located within a reasonable delivery range of a restaurant 104. Preferably, a single restaurant 104 services a particular area 108. However, a person of ordinary skill in the art will readily appreciate that any number of restaurants 104 may service a single area 108 having an area number identifier. Similarly, a single restaurant 104 may service more than one area 108. The menu placed in each hotel room shows food items available from the area restaurant 104. However, the menu is preferably modified from the restaurant's typical delivery menu in that the prices are marked up beyond the restaurant's typical delivery prices, and the logos and style typically used by the restaurant 104 are replaced by a nationwide logo and menu style format (e.g., Order Inn, Inc.).

In order to coordinate the efforts of a restaurant 104 with the orders coming from the hotels 102 in the restaurant's area 108, one or more call centers 106 are used. Preferably, the call center 106 is associated with one toll-free telephone number for each geographical area 108. However, a person of ordinary skill in the art will readily appreciate that any number of toll-free and/or toll-based telephone numbers may be associated with a single geographical area 108. Similarly, a single toll-free or toll-based telephone number may be associated with a plurality of geographical areas 108. Likewise, multiple toll-free and/or toll-based telephone numbers may be associated with each call center 106.

The call center 106 performs three primary functions. First, the call center 106 connects incoming telephone calls for order placement from hotel guests with the appropriate restaurant 104 for the area 108. Second, the call center monitors each phone call for customer service reasons. For example, the call center operator records delivery times promised, rude order taker comments, follow up on complaint calls from hotel guests, etc. Third, the call center records the items ordered by the hotel guest and the price quoted by the restaurant order taker. This information is used to calculate a "cut" which is owed to the broker 110 (e.g., Order Inn, Inc). Although the first function (connecting hotel guest phone calls to restaurant order takers) could be accomplished by simply placing the restaurant's telephone number in the room service menu (instead of the toll free telephone number associated with the area 108 by the order management system 100), doing so would defeat at least the second and third primary functions (customer service monitoring, brokerage fee calculation, and other quality control functions).

Figure 2:
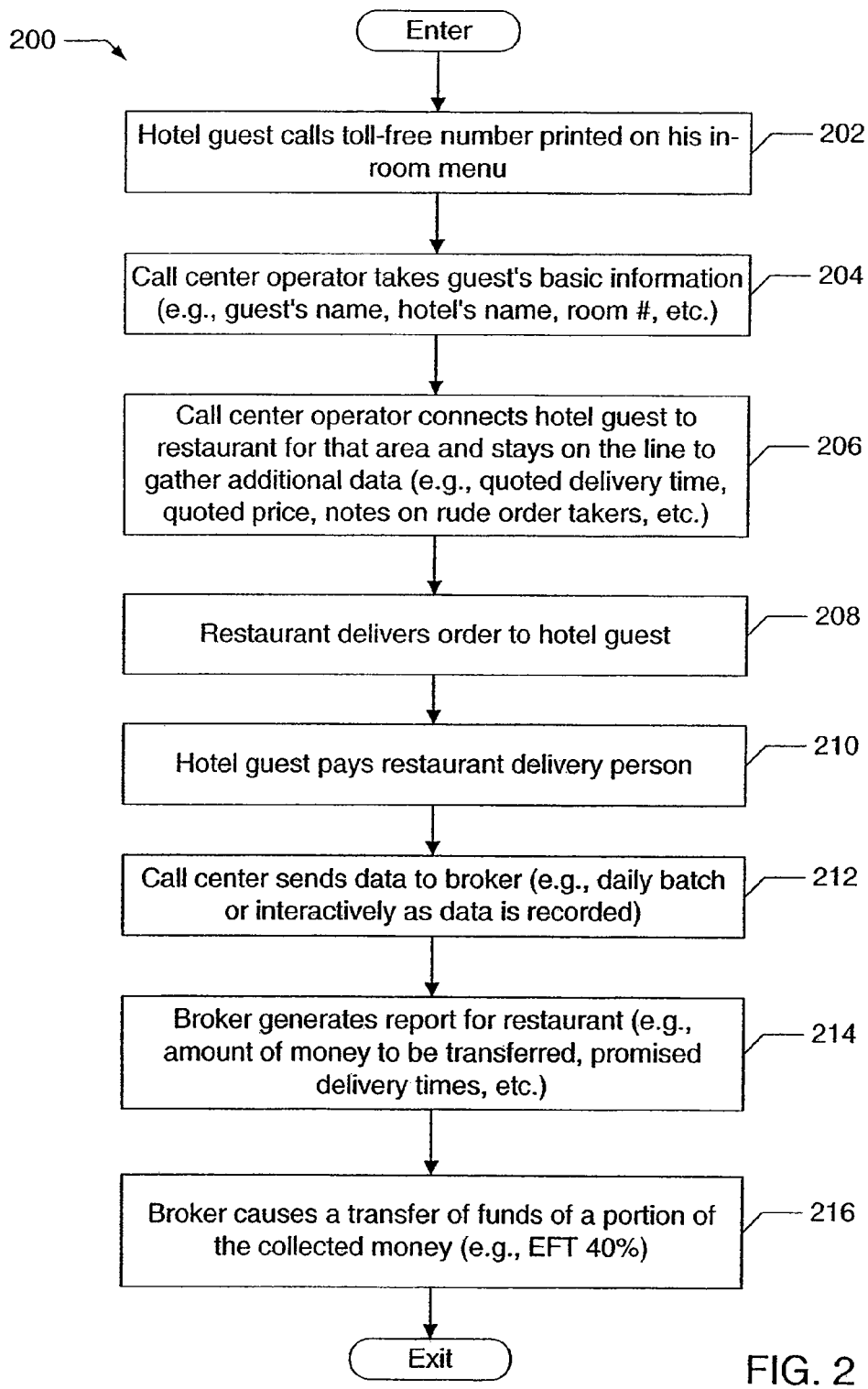
FIG. 2 is a flowchart of an example process for processing a normal order using the order management system.

FIG. 2 is a flowchart of an example process 200 for processing a normal order using the order management system 100. One or more of the steps of the process 200 may be embodied in one or more software programs which are stored in one or more memories and executed by one or more processors. In addition, one or more of the steps of the process 200 may be performed by one or more people. Although the process 200 is described with reference to the flowchart illustrated in FIG. 2, a person of ordinary skill in the art will readily appreciate that many other methods of performing the acts associated with process 200 may be used. For example, the order of many of the steps may be changed. In addition, many of the steps described are optional.

Generally, a call center operator receives a call from a hotel guest, takes down some basic information, and connects the hotel guest to the appropriate restaurant 104 for that geographical area 108. The call center operator then stays on the phone line to monitor the call and record additional data. Subsequently, the restaurant 104 delivers the order to the hotel guest and collects the appropriate fee from the hotel guest. The data captured by the call center 106 is transmitted to the broker 110, and the broker 110 uses this data to generate reports for the restaurants 104 and to determine the amount of money each restaurant 104 collected on behalf of the broker 110. Each of these steps is described in more detail below.

Figure 7:
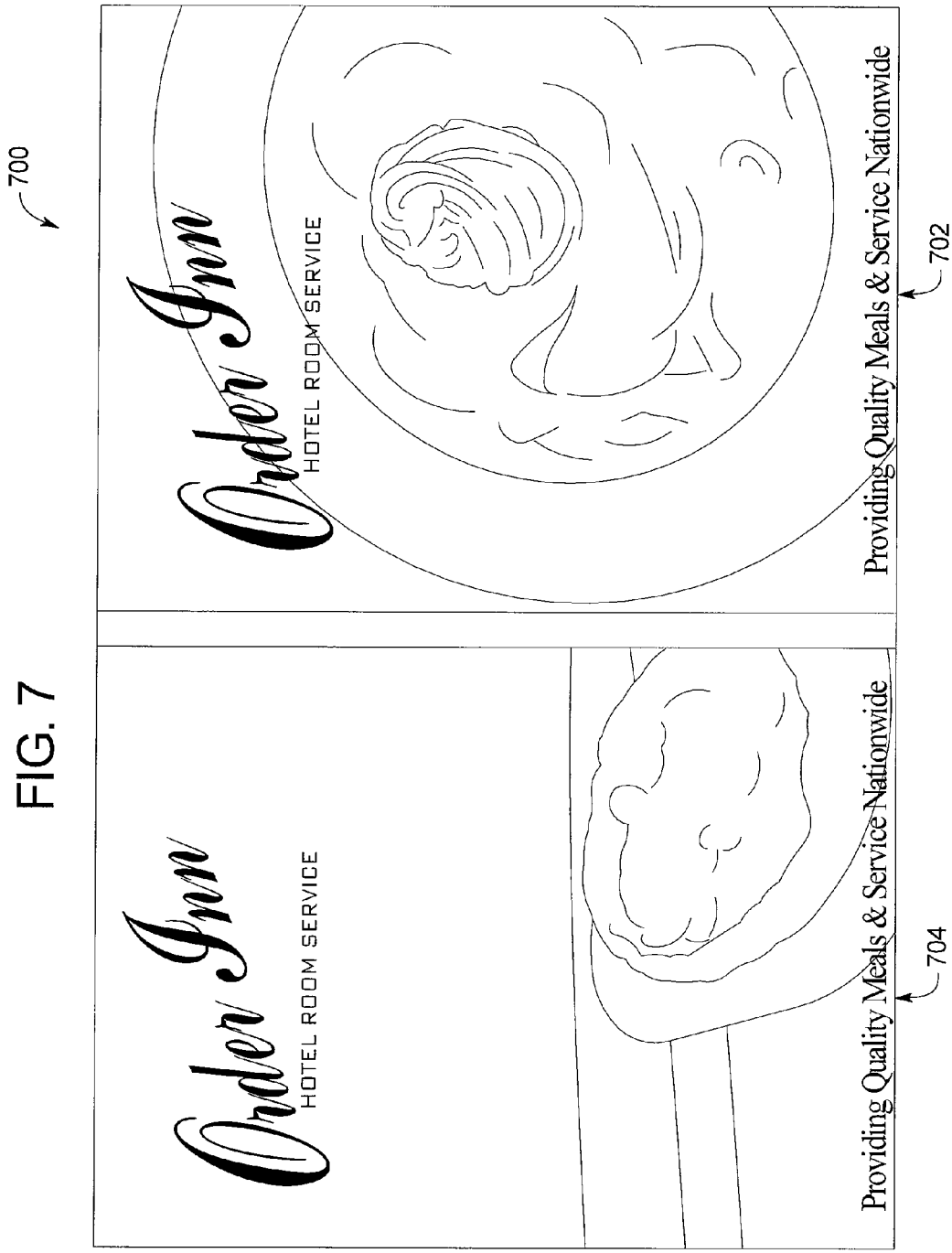

The example process 200 begins when a hotel guest calls the toll-free (or toll based) telephone number printed on his in-room menu (block 202). An example of an in-room menu is illustrated in FIGS. 7-9. Preferably, each area 108 is associated with its own toll-free telephone number and menu. In fact, the menu items available in one area 108 are typically different than the menu items available in another area 108. This is a result of "repackaging" the menu of the restaurant 104 associated with that area 108, wherein the restaurant 104 associated with one area 108 may be a different style of restaurant 104 with different owners than a restaurant 104 in another area 108. In order to "repackage" a menu, the menu normally used by a restaurant 104 is modified from the restaurant's typical delivery menu in that the prices are marked up beyond the restaurant's typical delivery prices, and the logos and style typically used by the restaurant 104 are replaced by a nationwide logo and menu style format.

Once the call center operator receives a call from a hotel guest, the call center operator asks the hotel guest for some basic information such as the guest's name, the name of the hotel the guest is calling from, an area number or identifier printed on the menu, and the room number the guest is staying in (block 204). Preferably, the call center operator's computer displays a list of possible hotels for the area 108 based on the toll-free telephone number used by the guest. In other words, the call center operator preferably sees one list of hotels to choose from when a call comes in from one area and another list of hotels to choose from when a call comes in from another area.

In addition, the call center operator may see "ambiguity hints" displayed on her computer screen. Ambiguity hints are questions the call center operator may ask the guest in order to clarify the hotel the guest is staying at. For example, if the guest indicates he is staying at the La Quinta in Charleston, and there are two La Quinta hotels in (or near) Charleston that are both serviced by the same restaurant (i.e., they are in the same area 108 and use the same toll-free telephone number for ordering), the call center operator may be prompted to ask the guest if he is near the lake in order to resolve the ambiguity.

Similarly, the call center operator may see "hotel aliases" displayed on her computer screen. For example, the caller may say he is at the La Quinta in Arlington Heights. If there is no La Quinta in Arlington Heights, but people at the La Quinta in Palatine frequently refer to it as the La Quinta in Arlington Heights, then the call center operator may select the alias in order to avoid confusion.

Figure 122:
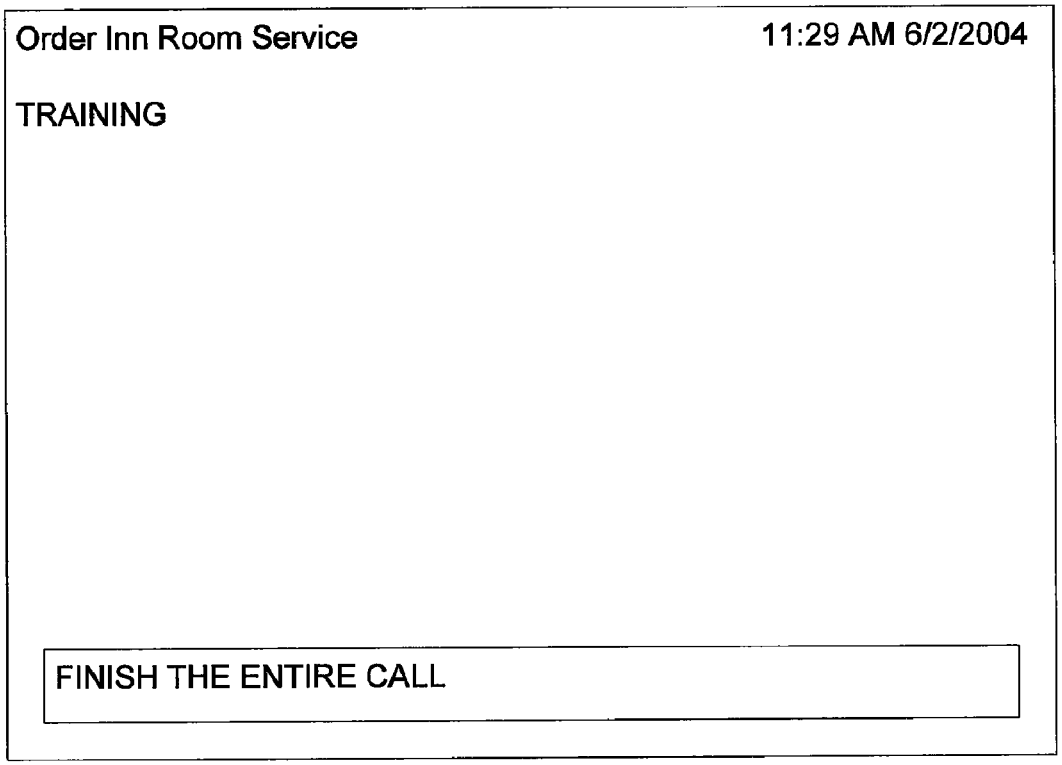

Of course, the operator may ask for the address of the hotel, but often guests do not know the address of the hotel they are staying at without referencing printed materials that may not be readily accessible. In addition, the call center operator may use caller identification information to identify the hotel. A more detailed discussion of call center operations is discussed in detail below with reference to FIGS. 16-122.

Once the call center operator records certain basic information, the call center operator connects the guest to an order taker at the restaurant associated with that area 108 (block 206). When making this connection, the call center operator preferably indicates to the order taker that she has a hotel guest on the line. Alternatively, the restaurant 104 may use a separate phone line and/or caller identification technology to know that the incoming call is via the broker 110 as opposed to the restaurant's normal delivery business. As a result, the order taker knows to use the modified menu when responding to questions and/or calculating the appropriate price (i.e., the marked up price). For example, the hotel guest may ask what types of calzones are available. Knowing to use the modified menu, the order taker lists three prearranged calzone combinations (even though that restaurant's normal delivery menu allows a build your own calzone option).

The restaurant order taker preferably repeats certain questions already asked by the call center operator. For example, the order taker may confirm the guest's name, hotel, and room number. Once the order taker has the basic information, the order taker asks the guest what they would like to order. Because the guest is "directly connected" to the actual restaurant that prepares and delivers his food items (as opposed to a middle-man order taker that delivers from multiple restaurants), the order taker may be able to better satisfy the guest. For example, the order taker may be aware that the restaurant is temporarily out of a certain menu item, or the order taker may know to ask the guest if he means the sandwich or the dinner when he ordered the "chicken parmesan." After taking the order, the order taker preferably quotes the guest a price for the order and an estimated delivery time.

The call center operator records the price quote and the estimated delivery time given by the order taker in her computer for several reasons. First, the delivery time estimate may be used in the event that the guest calls back to check the status of his order. In addition, the delivery time estimate (as well as other data described below) may be used as part of a report generated for the restaurant 104. The total charge quoted to the guest and/or the menu items ordered (as entered by the call center operator) may be used to determine the amount of money the restaurant 104 owes to the broker 110. In addition, the call center operator records notes regarding the order taker's performance. For example, if the order taker placed the guest on hold for a long period of time and/or the order taker was rude to the guest, the call center operator makes a note of the circumstances in her computer. For example, the call center operator may enter the amount of time the guest was on hold and/or the phrases and/or demeanor used by the order taker. In addition, the amount of time the guest is on the call and/or on hold (by the call operator and/or the restaurant order taker) may be automatically recorded by the call center software.

Once the order is taken and prepared, the restaurant 104 delivers the order to the hotel guest (block 208). Upon delivery, the hotel guest pays the restaurant delivery person (block 210).

At some point, the data collected by the call center 204 is transmitted to the broker 110 (block 212). For example, the call center data may be collected locally via a local software program and stored in a call center database. Periodically (e.g., daily), the call center data may be transmitted to the broker 110. In such an instance, the broker 110 preferably adds the data to a broker database each time the broker receives an update from the call center 204. This type of "non-integrated" call center is described in more detail below with reference to FIG. 5. Alternatively, the call center data may be stored in the broker database in real-time. For example, the call center computer may interact with a broker website to produce call center script prompts and receive operator inputs such as drop-down selections and notes. This type of "integrated" call center is described in more detail below with reference to FIG. 6.

Once the broker 110 receives a predetermined amount of call center data (e.g., one day's worth of data), the broker 110 generates a report for each restaurant (block 214). An example of a restaurant report is illustrated in FIGS. 10-12. Each report preferably includes a line item for each call processed by the call center 106. In this example, each line item shows the date and time of the call, the order taker name, the hotel, comments entered by the call center operator, the promised delivery time, and the total price, among other information as described in detail below. The generated reports are periodically (e.g., daily) sent to the restaurants 104 by fax and/or e-mail.

Each report also includes the amount of money collected by the restaurant 104 on behalf of the broker 110 (as calculated by the broker 110 based on the call center data). Preferably, this amount of money is periodically (e.g., weekly) transferred from the restaurant's account to the broker's account (block 216). For example, the broker may initiate an electronic funds transfer (EFT) for the amount. Of course, each restaurant 104 is given a period of time (e.g., one week) in which to dispute and resolve any discrepancies before the funds are transferred.

Figure 3:
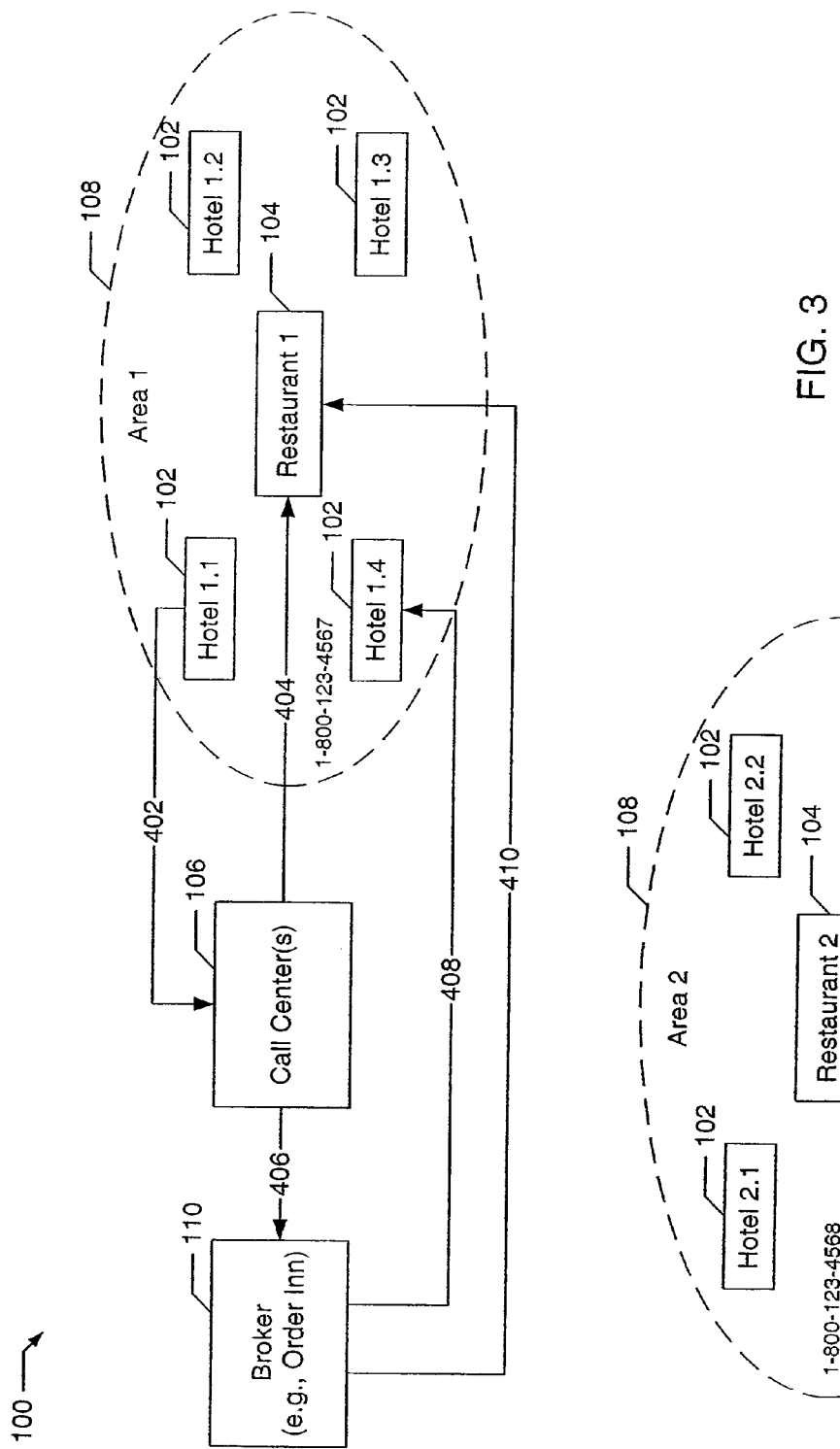
FIGS. 3-4 illustrate an example use of the order management system for recording customer complaints.
Figure 4:
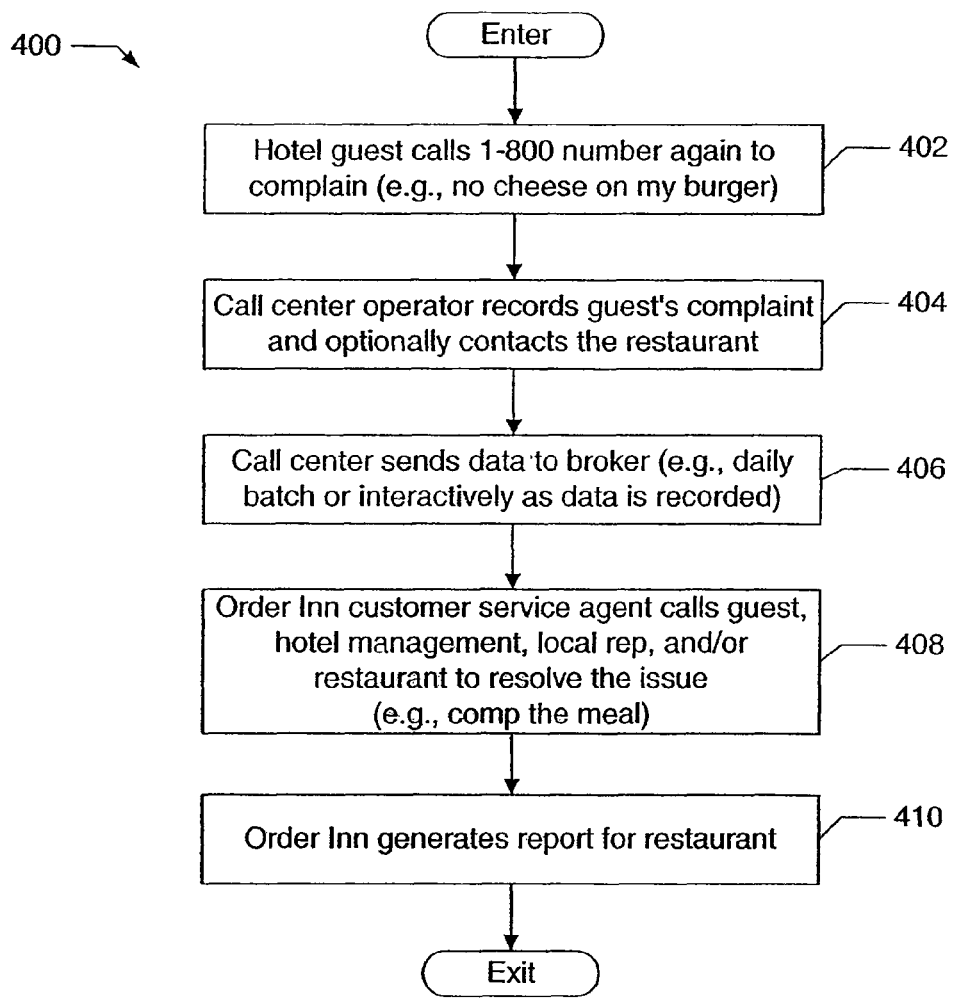

FIGS. 3-4 illustrate an example use of the order management system 100 for recording customer complaints. A complaining guest may call the same toll-free (or toll-based) telephone number printed on his in-room menu that he used to place his order (block 402). For example, the guest may be calling to find out the status of his order, or the guest may be calling to complain that one or more of the food items he ordered were not included with the delivery.

The call center operator records the guest's complaint(s) and optionally contacts the restaurant 104 (block 404). For example, if the guest's complaint is that the food has not arrived, the call center operator may check the time of the order and the promised delivery time. If the order is late, the call center operator preferably contacts the restaurant 104 to determine the status of the order. The status is preferably recorded in the call center database. If the order is not late, the call center operator may simply inform the guest when to expect the order. In another example, if the guest's complaint is directed to the food (e.g., missing an item, cold, or tastes bad), the call center operator preferably contacts the restaurant 104 in an effort to resolve the problem immediately (e.g., the restaurant 104 follows up with new food items and "comps" the entire meal).

In addition, the data collected by the call center 106 is transmitted to the broker 110 (block 406). Again, the call center data may be collected locally via a local software program and stored in a call center database which is periodically transmitted to the broker 110 (i.e., a "non-integrated" call center), or the call center data may be stored in the broker database in real-time (i.e., an "integrated" call center).

Once the call center data is received, a customer service agent of the broker 110 scans the data for complaints, rude service, etc. The customer service agent then calls the guest, the hotel management, a local representative, and/or the restaurant 104 in order to resolve the issue (block 408). For example, the customer service agent may call the guest to apologize and better understand the problem. Subsequently, the customer service agent may call the restaurant 104 to see how the restaurant 104 resolved or plans to resolve the issue. Next, the customer service agent may call the hotel manager to inform him that an issue arose with one of his guests and how the issue is being resolved.

Finally, as described above, once the broker 110 receives a predetermined amount of call center data (e.g., one day's worth of data), the broker 110 generates a report for each restaurant (block 410). An example of a restaurant report is illustrated in FIGS. 10-12.

Figure 5:
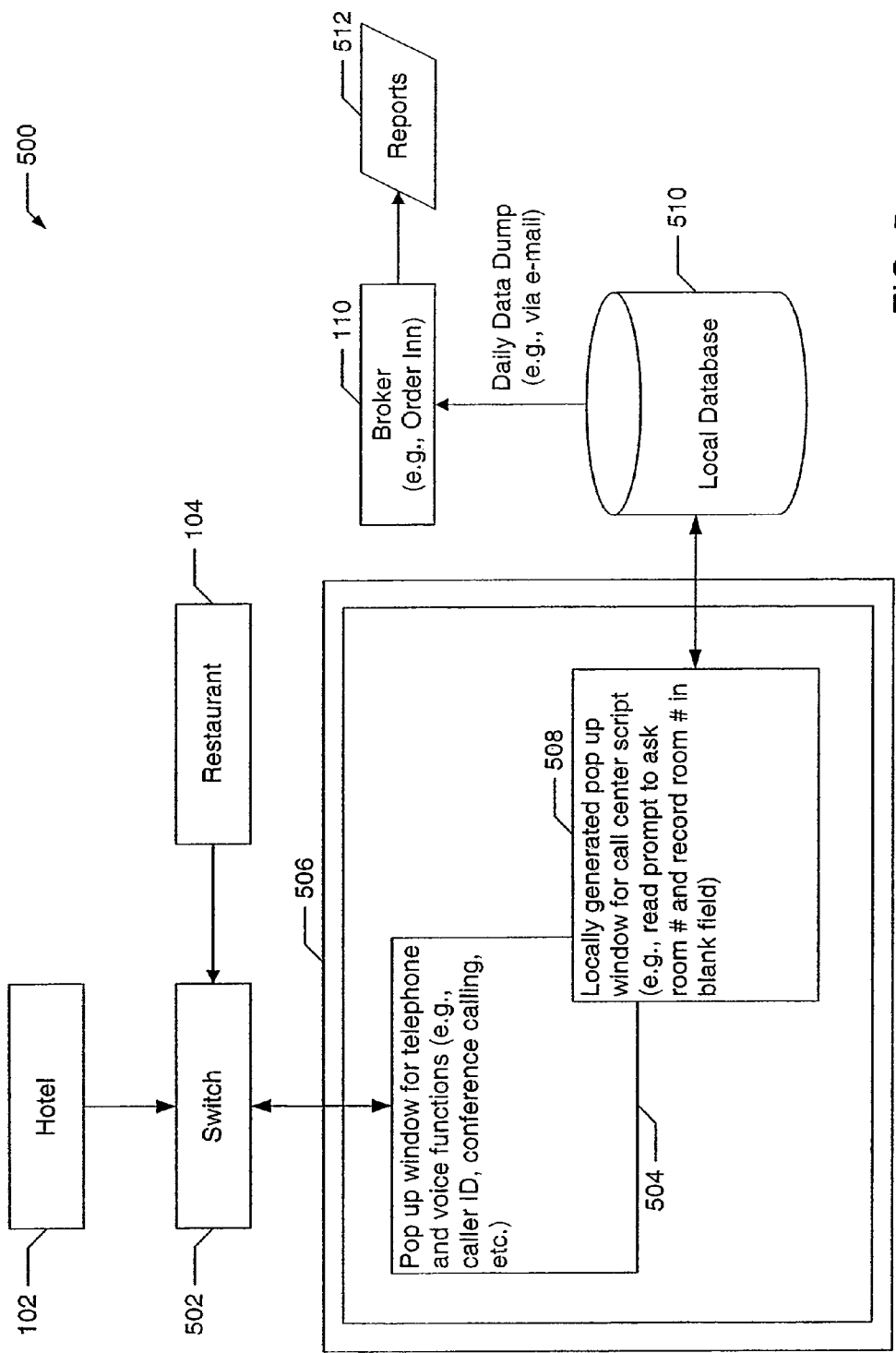
FIG. 5 is a block diagram illustrating an example call center arrangement that is "not integrated" with the broker.

FIG. 5 is a block diagram illustrating an example call center arrangement 500 that is "not integrated" with the broker 110. In this example, the hotel phone system and the restaurant phone system connect to the call center over conventional phone lines and a telephone switching device 502. When a hotel guest calls the telephone number printed on his in-room menu, the call causes a telephone window 504 to appear to one of the call center operators on a computer workstation 506. The telephone window 504 is a standard call center tool used to identify incoming calls, make outgoing calls, connect incoming calls to outgoing calls, etc.

In addition, the call center operator sees a locally-generated script window 508. The script window 508 prompts the call center operator with what to say to the hotel guest including questions for the hotel guest. For example, the operator may thank the hotel guest for calling "Order Inn" and ask the guest what hotel they are calling from. A more detailed discussion of call center operations is discussed in detail below with reference to FIGS. 16-122.

In the non-integrated call center system 500, the script window 508 is generated by a local software application running at the call center 106. As a result, changes to the call center script require call center based programming. For example, the addition of a hotel to an area requires the broker 110 to contact the call center 106, and the call center 106 to reliably enter the data associated with the new hotel (e.g., address, telephone number, area, etc.). Similarly, a change in the order the questions are asked, the phrases used to ask those questions, and/or the addition or deletion of questions requires a change to the call center program.

In the non-integrated call center system 500, information gathered by the call center operator (e.g., the guest's name, location, etc.) is stored in a call center database 510. The call center database 510 may be any type of data store such as a simple text file, an Oracle database file, a Microsoft Access database file, a Microsoft SQL database, etc.

Periodically, this data is transferred to the broker 110. For example, a call center 106 may e-mail one day's worth of data to the broker 110 each morning. Once the broker 110 receives a predetermined amount of call center data (e.g., one day's worth of data), the broker 110 generates a report 512 for each restaurant. An example of a restaurant report 512 is illustrated in FIGS. 10-12. The generated reports are periodically (e.g., daily) sent to the restaurants 104 by fax, e-mail and/or ftp file transaction.

Figure 6:
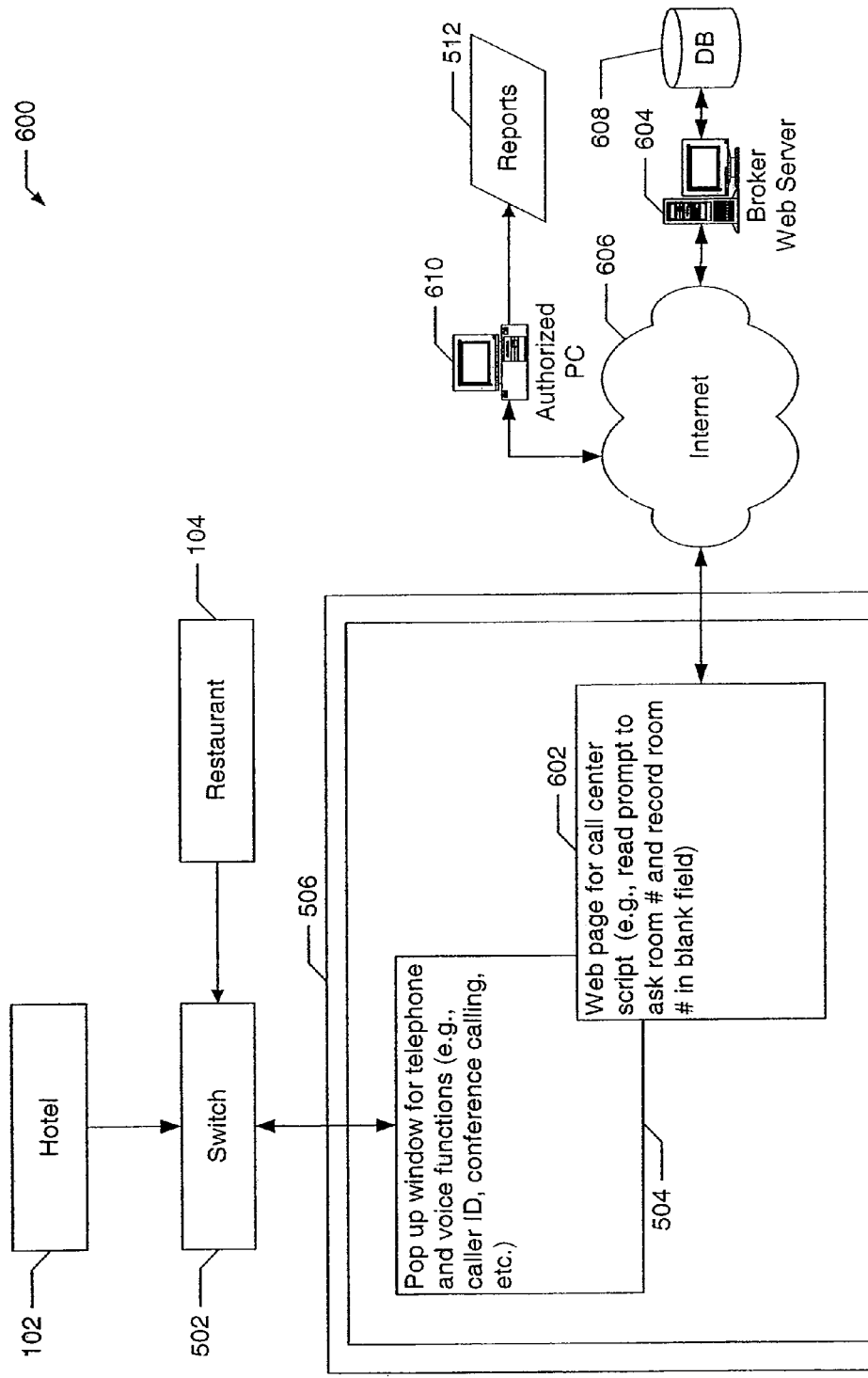
FIG. 6 is a block diagram illustrating an example call center arrangement that is "integrated" with the broker.

FIG. 6 is a block diagram illustrating an example call center arrangement 600 that is "integrated" with the broker 110. Again, the hotel phone system and the restaurant phone system connect to the call center over conventional phone lines and a telephone switching device 502. When a hotel guest calls the telephone number printed on his in-room menu, the call causes a telephone window 504 to appear to one of the call center operators on a computer workstation 506. The telephone window 504 is a standard call center tool used to identify incoming calls, make outgoing calls, connect incoming calls to outgoing calls, etc.

In the integrated call center system 600, the call center operator sees a web-based script window 602. Like the locally generated script window 508 of the non-integrated call center system 500, the web-based script window 602 prompts the call center operator with what to say to the hotel guest including questions for the hotel guest. For example, the operator may thank the hotel guest for calling "Order Inn" and ask the guest what hotel they are calling from.

However, in the integrated call center system 600, the content for the script window 602 is sent to the call center workstation 506 in real-time from a broker web server 604 via the Internet 606 (or some other wide area network). In this manner, changes to the call center script may be made by the broker 110 without the need for call center based data changes and/or programming. For example, the broker 110 may add data associated with a new hotel in an area by simply adding the hotel data (e.g., address, telephone number, area, etc.) to the broker web server database 608. The next time a call center operator services a call from that area, the hotel is automatically added to the list of hotels (e.g., it shows up in a drop-down box for selection by the call center operator). Similarly, the broker 110 may change the order the questions are asked, the phrases used to ask those questions, and/or add or delete questions by simply changing the web pages served by the broker web server 604. Of course, such changes may require supplemental call center operator training.

In the integrated call center arrangement, information gathered by the call center operator (e.g., the guest's name, location, etc.) is stored in the broker database 608 in real-time. For example, when the call center operator advances from one page of the script to another, the form-based inputs are submitted to the broker web server 604, which stores the data in the broker database 608. The broker web server 604 then serves the next page of the script to the call center workstation 506. As with the call center database 510, the broker database 606 may be any type of data store such as a simple text file, an Oracle database file, a Microsoft Access database file, a Microsoft SQL database, etc.

Because the broker database 608 is always up to date (i.e., no periodic data updates from the call center 106 are needed), the broker 110 (or any other authorized entity 610) may generate a report 512 at any time. For example, a restaurant may log in to a web page to generate a web-based restaurant report. An example of a restaurant report 512 is illustrated in FIGS. 10-12. Similarly, a hotel may log in to a web page to generate a web-based hotel report.

Regardless of the type of called center used (integrated or non-integrated), the broker 110 preferably maintains the quality of the call center operations by performing tests. For example, the broker 110 may periodically call each call center 106 and record certain information such as the amount of time or number of rings it took to respond to the call, the amount of time he is placed on hold, whether the appropriate recordings come on during the appropriate hours of operation, requesting updated holiday hours, whether the call center operators are rude, whether the call center operators speak loudly and clearly, whether the call center operators are following the script, etc.

FIGS. 7-9 illustrate an example in-room menu 700. FIG. 7 shows the front 702 and back 704 covers of the example in-room menu 700. FIG. 8 shows an example inside-left page 802 of the example in-room menu 700. FIG. 9 shows an example inside-right page 902 of the example in-room menu 700. The example inside pages 802, 902 includes section headers 804, section pictures 805, meal item titles 806, meal item descriptions 808, meal item prices 810, meal item specialty markers 812, a specialty item legend 814, a policy section 816, a toll-free telephone number 904, an area number 906, service hours section 908, and an affiliation disclaimer 910.

The section headers 804 indicate a groupings of food items. For example, a menu 700 may include a "Soup & Salad" section, a "Sides And Appetizers" section, etc. Preferably all the sections in the menu 700 include a section header. The section pictures 805 reflect an example food item from the associated section. For example, the "Soup & Salad" section may be associated with a picture of a salad. Not all sections necessarily include a section picture 805.

Each section includes a list of meal item titles 806, meal item descriptions 808, and meal item prices 810. For example, in the sandwiches section of this example menu 700 there is a food item titled "Chicago Pocket." The description 808 associated with the "Chicago Pocket" is "A pizza dough Sandwich stuffed With . . . ." The price 810 of the "Chicago Pocket" in this example is $7.95.

Some of the meal item titles 806 are preceded by a specialty marker 812 (e.g., a star). As described in the menu by the specialty item legend 814, the food items associated with this specialty marker 812 are considered favorites and/or specialties of the restaurant 104. Of course, other designations for specialty markers 812 may be conveyed by the specialty item legend 814. For example, low-calorie, low-carbohydrate, and/or low-fat food items may be designated by one or more different specialty markers 812.

As described above, the toll-free telephone number 904 is preferably unique to a certain geographical area 108. In this example, the area 108 may also be identified by the area number 906 or any other geographical identifier (e.g., area 176). Of course, a toll-based number may be used. In addition, an area 108 may be associated with multiple telephone numbers and/or multiple areas may be associated with the same telephone number.

The service hours section 908 indicates the hours the restaurant 104 for that area 108 is normally open. In addition, the service hours section 908 indicates that seasonal hours may vary and that the restaurant 104 is closed on most major holidays. When a hotel guest calls the toll-free telephone number 904 outside the hours of operation for that restaurant 104, a prerecorded message informs the guest that the restaurant 104 is currently closed. In addition, the prerecorded message informs the guest how to connect to a call center operator despite the closed status of the restaurant 104. For example, the guest may need to press a certain touch-tone button and/or simply stay on the line to be connected to a call center operator. In this manner, a guest calling with a question or a complaint (as opposed to an order) may still get through to a call center operator for assistance. In order to ensure that the prerecorded messages come on at the appropriate times (and not at the inappropriate times), the broker 110 may periodically contact each restaurant 104 to ask about the hours of operation (e.g., prior to each holiday period). The restaurant's responses are then entered into a database which feeds into the call center's prerecorded message system.

FIGS. 10-12 illustrate an example restaurant report 512. As discussed above, these restaurant reports 512 may be generated periodically (e.g., daily) and sent to the restaurants 104 by fax, e-mail, and/or ftp. Each report preferably includes a line item 1002 for each call processed by the call center 106. In this example, each line item 1002 shows a unique reference number 1004, the date 1006 and time 1008 of the call, the call type 1010, the duration of the call 1012, the order taker's name 1014, the hotel name and address 1016, the room number 1018, comments and/or resolutions 1020, one or more codes 1022, the delivery time quote 1024, a hotel and room number confirmation flag 1026, a total price difference 1028, an order total 1030, a restaurant total 1032, and a broker total 1034.

Preferably, the unique reference number 1004, the date of the call 1006, the time of the call 1008, and the duration of the call 1012 are automatically recorded by the call center software. The call type 1010, the order taker's name 1014, the hotel name and address 1016, the room number 1018, comments and/or resolutions 1020, one or more codes 1022, the delivery time quote 1024, and the hotel and room number confirmation flag 1026 are preferably recorded in response to inputs from the call center operator.

In order to calculate the broker total 1034 (i.e., the amount of money collected by the restaurant 104 on behalf of the broker 110), a call center operator monitors each call and records each of the items ordered by the hotel guest. Preferably, the call center operator uses the call center workstation 506 to select the ordered items from a list of potential items that are specific to that area's restaurant 104. For example, if a call center operator receives a first call from a first area 108 (e.g., based on the incoming tool-free number), the call center operator's workstation 506 may automatically use a first menu of food items, and when the same call center operator receives a second call from a second area 108, the call center operator's workstation 506 may automatically use a second menu of food items. In this manner, each geographical area 108 may be serviced by a different restaurant 104 with a different set of food items, and at the same time, multiple geographical areas 108 may be serviced by the same call center 106.

For a non-integrated call center 500, these menus are updated at the call center 106. For example, if a menu item is added, a menu item is deleted, the price of a menu item changes, or the description of a menu item changes, these changes are stored in the call center database 510. Similarly, if a new restaurant 104 is replacing an old restaurant 104 or a new restaurant 104 is being added to service a new area, these changes are stored in the call center database 510 for a non-integrated call center 500. For an integrated call center 600, all of the above described menu updates may be made in the broker database 608. The next time the webpage associated with the change is served to the call center operator, the change is reflected in the webpage (e.g., a drop-down menu of food items includes an added food item).

The marked-up prices (i.e., the prices on the in-room menu) associated with the items ordered by the hotel guest are then totaled (along with any normal delivery charges, extended range delivery charges, etc.) to determine the order total 1030 (i.e., the amount owed by the guest according to the call center operator's list of menu items), and a predetermined portion of the marked-up prices is used to determine the restaurant total 1032 (i.e., the amount collected for the restaurant 104 according to the call center operator's list of menu items). The difference between the order total 1030 and the restaurant total 1032 is the broker total 1034 (i.e., the amount collected for the broker 110 according to the call center operator's list of menu items).

In addition, the call center operator records the total quoted by the restaurant order taker (not shown). The total difference 1028 is the difference (if any) between the order total 1030 (based on the call center operator's version of the items ordered) and the total quoted by the restaurant order taker (not shown). As shown in the example of FIGS. 10-12, if the total difference 1028 is in a credit position, then the restaurant 104 charged the hotel guest more than the call center operator would have charged. If the total difference 1028 is in a debit position, then the restaurant 104 charged the hotel guest less than the call center operator would have charged. If the total difference 1028 is zero, then the restaurant 104 charged the hotel guest the same amount the call center operator would have charged. If the total difference 1028 is the same as the order total 1030 (i.e., the amount owed by the guest according to the call center operator's list of menu items), then the restaurant 104 did not give a quoted price and/or the call center operator failed to record the restaurant's quoted price.

The code(s) 1022 recorded by the call center operator help to classify certain types of lines items. In this manner, database queries designed to look for certain situations (e.g., problems that need to be resolved by a customer service agent) may be run against the database. Some examples of codes are listed in FIG. 12. Although specific codes are discussed herein, a person of ordinary skill in the art will readily appreciate that any type of coding system may be used without departing from the scope or spirit of the presently-disclosed system.

As mentioned above, some codes may be used to flag potential problems. For example, a CF code may be used for complaints about the food quality or food service. A customer service agent may then quickly bring up just these line items (e.g., from the previous day) and read the call center operator's comments in order to investigate the problem. Similarly, an O3 or O4 code may be used to indicate a restaurant order taker problem (e.g., the order taker needs additional training and/or the order taker was rude to the hotel guest). In another example, an RB code may be used to indicate that the restaurant 104 was closed during normal business hours. In one example, the call center 106 may make a digital audio recording of the conversation between the hotel guest and the restaurant order taker. Certain ones of these recordings may then be sent to the broker 110 based on an associated flag.

Other codes may be used for billing purposes. For example, an EMP code may be used to designate the order was from a hotel employee, and a GUE code may be used to designate that the order was from a hotel guest. By recording this distinction in the database, a discount may be given to hotel employees. For example, hotel employees may be given a 50% discount as a perk to using the order management system 100. Preferably, the restaurants 104 agree to write off the cost of this discount as part of their participation in the order management system 100. However, the broker 110 may agree to take on some or all of the burden of employee discounted food orders. For example, the broker may agree to cover these discounts during an initial period of operation (to shoulder the burden during its heaviest use "try out" time) and/or if the percentage of discounted orders ever exceeds some threshold of overall orders.

FIG. 13 illustrates an example restaurant invoice 1300. The example invoice 1300 is a weekly invoice showing a total 1302 for each day's orders in dollars as well as a daily total due 1304 and a weekly total due 1306. The total due amounts 1304, 1306 are the amounts of money the restaurant 104 collected on behalf of the broker 110. Preferably, total due amount 1306 is transferred from the restaurant's account to the broker's account via an electronic funds transfer (EFT) on a particular date 1308 which, in this example, is one week after the invoice date 1310. During the time between the invoice date 1310 and the EFT date 1308, the restaurant 104 may dispute any of the total due amounts 1304, 1306.

As described above, the menu 700 placed in each hotel room shows food items available from the restaurant 104 associated with that area 108. In fact, the menu items available in one area 108 are typically different than the menu items available in another area 108. This is a result of "repackaging" the menu of the restaurant 104 associated with that area 108, wherein the restaurant 104 associated with one area 108 may be a different style of restaurant 104 with different owners than a restaurant 104 in another area 108. In order to "repackage" a menu, the menu normally used by a restaurant 104 is modified from the restaurant's typical delivery menu in that the prices are marked up beyond the restaurant's typical delivery prices, and the logos and style typically used by the restaurant 104 are replaced by a nationwide logo and menu style format.

Figure 14:
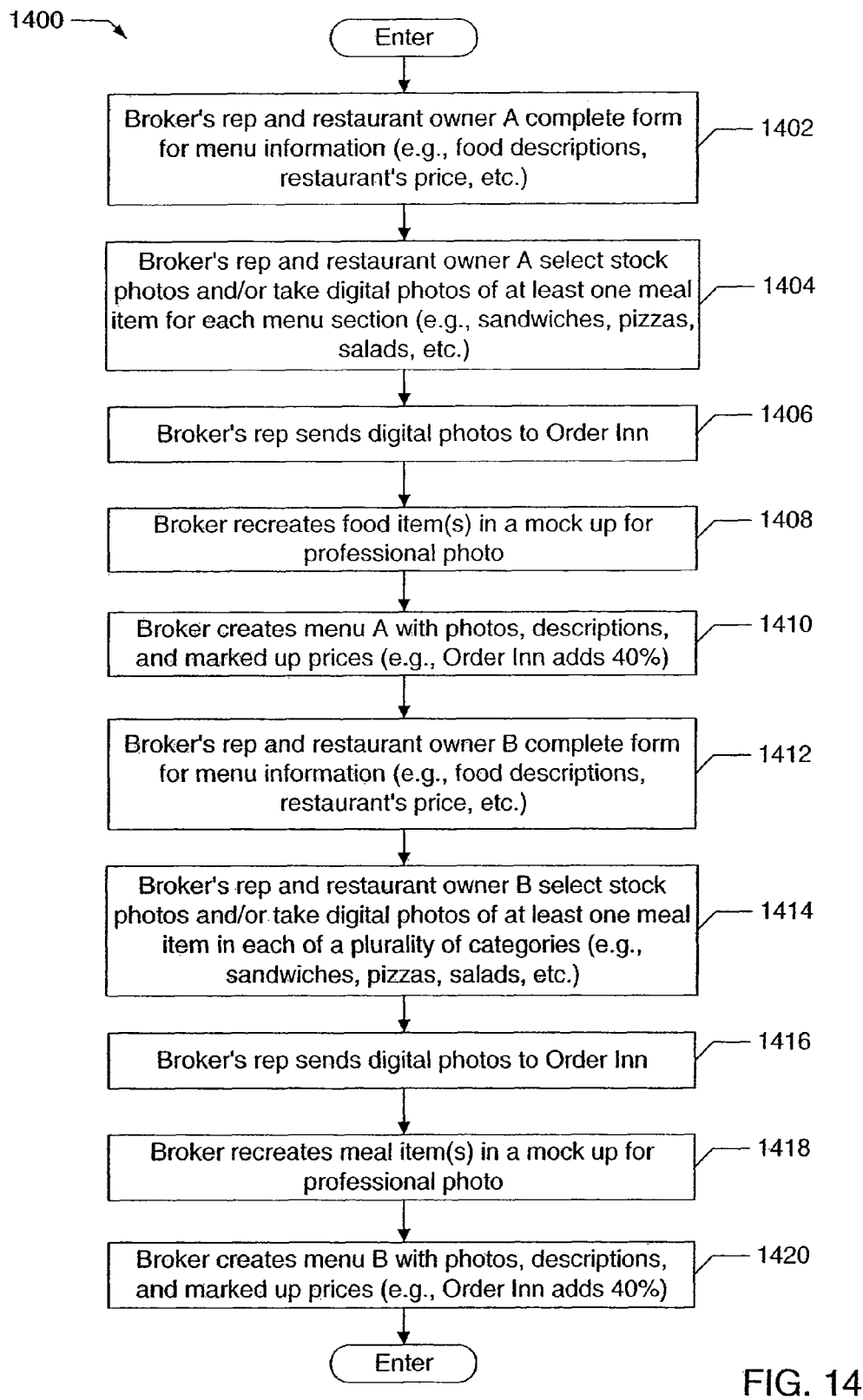
FIG. 14 is a flowchart of an example process for generating a "repackaged" menu.

FIG. 14 is a flowchart of an example process 1400 for generating a "repackaged" menu 700. One or more of the steps of the process 1400 may be embodied in one or more software programs which are stored in one or more memories and executed by one or more processors. In addition, one or more of the steps of the process 1400 may be performed by one or more people. Although the process 1400 is described with reference to the flowchart illustrated in FIG. 14, a person of ordinary skill in the art will readily appreciate that many other methods of performing the acts associated with process 1400 may be used. For example, the order of many of the steps may be changed. In addition, many of the steps described are optional.

Generally, the process 1400 requires a representative of the broker 110 to receive menu information from the restaurant 104 associated with that menu 700. As part of this information, the restaurant 104 approves a stock photograph for each section of the menu 700 and/or a digital photograph is taken of one or more actual food items produced by the restaurant 104. These photographs are then used by the broker 110 to mockup the food items and produce professional photographs. Preferably, the broker 110 makes the ultimate decision as to which of the approved photographs to use (i.e., not all menu categories necessarily receive an associated section picture 805).

The example process 1400 begins when a representative of the broker 110 sits down with an owner of a restaurant 104 to complete a form requesting certain restaurant and menu information (block 1402). The restaurant information may be any information needed to conduct business with the restaurant 104. For example, the name of the restaurant owner, the address of the restaurant, the telephone number of the restaurant, etc. The menu information may be any information needed to construct the menu 700. For example, the information preferably includes meal item titles 806, meal item descriptions 808, meal item prices (before any markup), meal item specialties, service hours, etc.

In addition, the representative of the broker 110 and the owner of the restaurant 104 select a stock photograph and/or take a digital photograph of at least one meal item for each section of the menu 700 (block 1404). For example, if the menu 700 is to include a sandwiches section which includes a chicken sandwich, the representative of the broker 110 may show the owner of the restaurant 104 a plurality of stock photographs of chicken sandwiches. If one of the stock photographs looks similar to the restaurant's chicken sandwich, the restaurant owner may approve that photograph for inclusion in the menu 700. However, as discussed below, the broker 110 may choose not to include a photograph for the sandwiches section at all, despite the pre-approval of a particular photograph for that section.

If none of the stock photographs looks similar to the restaurant's food item(s), or the restaurant owner simply does not like any of the stock photographs associated with that menu section, a digital photograph of one or more actual food items associated with that menu section is taken, and the representative of the broker 110 sends the digital photograph(s) back to the broker 110 along with the other restaurant and menu information (block 1406). Once the broker 110 receives the digital photograph(s), the broker 110 recreates the food items in a mockup for a professional photograph (1408).

Once all of the menu information is ready, the broker 110 creates a "repackaged" menu 700 for that restaurant 104 with section photos, food descriptions, etc. (block 1410). In addition, the "repackaged" menu 700 includes marked-up prices. For example, the "repackaged" menu 700 may mark up all of the restaurant supplied prices by 40%. Alternatively, the "repackaged" menu 700 may mark up different food items by different amounts as hand-selected by the broker 110.

The above-described process (blocks 1402-1410), may then be repeated for any number of different restaurants 104 resulting in many different menus 700 as shown by blocks 1412-1420 of FIG. 14. However, each of the different menus 700 preferably has a similar "look and feel." For example, although two menus for two different restaurants 104 may have different food items and prices, both menus preferably share similar layouts, fonts, logos, color schemes, etc.

Figure 15A:

FIGS. 15*a*-15*c* are an example of a services directory 1500. The example services directory 1500 includes a toll-free telephone number 1502 and a plurality of extension numbers 1504. Each extension number is associated with a service 1506 that may be of interest to a hotel guest. The services 1506 may be categorized. For example, a restaurant category may include a pizza delivery extension, a breakfast extension, a lunch extension, etc.

In order to use the directory 1500, a hotel guest simply dials the toll-free telephone number 1502 and enters the extension number 1504 associated with the service he is interested in. The hotel guest may navigate back through the menu systems by pressing the * key. Similarly, the hotel guest may navigate forward through the menu systems by pressing the # key. The hotel guest may return to the main menu by pressing the 0 key.

In some instances, the hotel guest is connected directly to a business in response to entering the extension number 1504. In other instances, the hotel guest is given a recorded message associated with the selected extension. In such an instance, the guest may press the 1 key to connect directly to a person at the selected business. Recorded messages may be produced by the broker 110 and/or changed at any time by the business associated with the recorded message.

Depending on the service 1506 selected, different businesses are used by the system. Preferably, business names are not included in the directory 1500. In this manner, service providers may be changed without the need to reprint the directory 1500.

Each business that provides one of the listed services 1506 pays the broker 110 a fee. Fees may be based on the number of listings, the positions of listings, the number of directories, recorded message duration, number of calls, number of paying customers, and/or any other metric associated with use of the directory 1500.

As discussed with respect to the food ordering system 100, providing other services via the services directory 1500 may employ a call center 106. In any event, and as discussed above with reference to FIGS. 5 and 6, the call center operator sees a locally generated script window 508 or a web-based script window 602. The script window 508, 602 prompts the call center operator with what to say to the hotel guest including questions for the hotel guest. For example, the operator may thank the hotel guest for calling "Order Inn" and ask the guest what hotel they are calling from. In addition, the script window 508, 602 receives inputs from the call center operator such as what food items the hotel guest ordered. A more detailed discussion of call center operations is discussed in detail below with reference to a plurality of example screenshots associated with the script window 508, 602.

FIGS. 16-34 are a series of example screenshots associated with the script window 508, 602 for taking an order from a hotel guest. As part of this order taking process, information identifying the call center operator is entered. The information identifying the call center operator may be entered by the call center operator, by the call center workstation 506, or by the broker web server 604. For example, the call center operator may enter his/her initials 1602 as shown in FIG. 16. The information identifying the call center operator may be used for customer services purposes (e.g., following up on a rude order taker). Preferably, all of the information entered into the script window 508, 602 is stored in the database 510, 608.

In this example script, the script window 508, 602 displays a prompt 1604 to the call center operator instructing the call center operator to ask the caller, "Are you calling to place a room service order?" The call center operator is then given a drop-down box of choices 1606. In this example, the first choice 1608 is "ORDER ROOM SERVICE." If the call center operator selects this choice 1608, "ORDER" 1702 is entered into the script window 508, 602 (and the database 510, 608) as shown in FIG. 17.

Next, the script window 508, 602 displays a prompt 1704 to the call center operator instructing the call center operator to ask the caller, "What's the extension number after the phone number on your menu?" The call center operator is then given a drop-down box of choices 1706. In this example, the choices 1706 are three digit numbers (or none). Of course, the call center operator may manually enter the extension and/or any other information described herein.

In FIG. 18, the script window 508, 602 displays a prompt 1802 to the call center operator instructing the call center operator to ask the caller, "What hotel are you calling from?" Again, the call center operator is given a drop-down box of choices 1804. Each choice in the list of choices 1804 includes a hotel name, a hotel address, and a hotel telephone number. The selected hotel 1902 is entered as shown in FIG. 19.

Next, the script window 508, 602 displays a prompt 1904 to the call center operator instructing the call center operator to ask the caller, "What is your hotel room/unit #?" The room number 1906 is then entered by the call center operator. In addition, the script window 508, 602 displays a prompt 1908 to the call center operator instructing the call center operator to ask the caller, "Are you a guest at the hotel?" In this case, the drop-down box of choices 1910 includes a "yes" choice 1912 and a "no" choice 1914. Again, as with all of the operator inputs, the choice is displayed in the script window 508, 602 and stored in the database 510, 608.

In FIG. 20, the script window 508, 602 displays a prompt 2002 to the call center operator instructing the call center operator to ask the caller for his/her first and last name. In addition, the call center operator is prompted 2004 to see if he/she should continue with the order 2006, or if he/she would like to skip 2008 to a comment entering portion of the script. If the call center operator chooses to continue with the order, the script window 508, 602 displays a confirmation page 2100 (see FIG. 21). The confirmation page 2100 prompts the call center operator to confirm the callers room number 2102, hotel 2104, and phone number 2106.

Once the guest information is confirmed, the script window 508, 602 prompts 2202 the call center operator to thank the caller for the order and to please remain on the line while he/she is connected with an order taker (FIG. 22). In addition, the script window 508, 602 displays a message 2204 reminding the call center operator to get the order taker's name (i.e., the name of the person at the restaurant 104). The script window 508, 602 also displays a message 2206 prompting the call center operator to introduce himself/herself to the order taker and to tell the order taker he/she has a room service order from a specific person's name in a particular room number at a particular hotel.

In addition, the script window 508, 602 displays a message 2208 prompting the call center operator to ask for the order taker's name and to remind the order taker to confirm the hotel and room number associated with the order. In FIG. 23, the script window 508, 602 asks the call center operator to confirm 2302 that the restaurant order taker did confirm the hotel and room number with the guest. Again, the call center operator is prompted 2402 to see if he/she should continue with the order 2404, or if he/she would like to skip 2406 to a comment entering portion of the script (see FIG. 24).

If the call center operator chooses to continue with the order, the script window 508, 602 displays a menu page 2500 with a food item selection menu 2502 (see FIG. 25). The food item selection menu 2502 displays a list of all of the food items specific to the menu for the restaurant 104 in the area 108 associated with the hotel 102 identified by the caller. Many of the food items are listed more than once under alternate titles in order to help the call center operator find the food items ordered by the caller. For example, a cheeseburger may be listed as "cheeseburger" and as "burger, with cheese."

When the caller orders a food item, the call center operator selects the food item from the food item selection menu 2502 (even though the order taker at the restaurant 104 is actually taking the order for the purpose of preparation and delivery). Each time the call center operator selects a food item from the food item selection menu 2502, the script window 508, 602 preferably adds the food item 2602 to an order list 2604 and shows a more detailed view 2606 of the selected food item (see FIG. 26). The food item 2602 in the order list 2604 preferably includes a unique item number 2608, a short description 2610, a price 2612, a quantity 2614, and a line item total 2616. The detailed view 2606 of the selected food preferably includes a detailed description of the food item.

The detailed description helps resolve ambiguities in the order. For example, if the caller orders the 1 lb. brisket, a side of coleslaw, and a side of baked beans, the call center operator can see from the detailed description that the side dishes are included in the price of the brisket order. Similarly, if the caller in the previous example ordered three side dishes, the call center operator would know to add one side dish charge to the order because only two side dishes are included.

When the caller is finished ordering, the script window 508, 602 prompts 2702 the call center operator to enter the total price quoted to the caller by the restaurant order taker (see FIG. 27). This information is provided to the caller by the restaurant order taker and merely recorded by the call center operator. If the restaurant order taker does not provide a price quote, the call center operator is instructed to bypass the restaurant quote field 2704 by pressing enter. In addition, as shown in FIG. 28, the script window 508, 602 prompts 2802 the call center operator to select the type of payment (e.g., cash, credit, unknown, travelers check, airline voucher, etc.).

FIG. 29 shows any discrepancy 2902 that may exist between the total price quoted by the restaurant order taker 2904 and the total price determined from the food item selections made by the call center operator 2906. Preferably, the amount of money due to the broker 110 is determined using the total price determined from the food item selections made by the call center operator 2906. However, either total 2904, 2906 may be used to determine the amount of money due to the broker 110. Preferably, small discrepancies are ignored and large discrepancies are resolved after an investigation by the broker 110, the restaurant 104, and/or the call center 106.

In addition to a price quote, the script window 508, 602 prompts 3002 the call center operator to enter a delivery time quote (e.g., 30 minutes) as shown in FIG. 30. Again, this information is provided to the caller by the restaurant order taker and merely recorded by the call center operator. If the restaurant order taker does not provide a delivery time quote, the call center operator may select "not quoted." This information may be used for customer service issues. For example, if a complaint is received about the delivery time, the broker may determine who is to blame based on the call time of the order, the call time of the complaint, and the delivery time quote. Restaurants 104 that receive a number of complaints above a predetermined threshold for a predetermined period of time may be warned and/or replaced by the broker 110.

In FIG. 31, the script window 508, 602 displays a prompt 3102 asking the call center operator to classify the call. For example, a call may be classified as a food order, a status check, a customer service issue, an addition to a previous order, or the cancellation of a previous order. By entering a code associated with the status of a call, the broker 110, the restaurant owner, and/or any other person with the appropriate access permission may quickly find certain types of calls in the database 510, 608. For example, a customer service agent of the broker 110 may wish to retrieve all customer service related calls from the previous day in order to follow up, investigate, and resolve any issues associated with those calls.

Similarly, the call center operator may enter a comment code 3202 (see FIG. 32). For example, the call center operator may enter a comment code 3202 indicating the hotel guest is wondering why their order has not arrived, indicating that the restaurant 104 was closed when it should have been open, indicating the restaurant 104 was closed because it was after their normal hours, indicating a caller complained about the food quality or service, indicating that the restaurant order taker needs training, indicating that the restaurant order taker was rude to the customer, etc. By entering a comment code 3202, the broker 110, the restaurant owner, and/or any other person with the appropriate access permission may quickly find certain types of calls in the database 510, 608. For example, a customer service agent of the broker 110 may wish to retrieve all complaint-related calls from the previous day in order to follow up, investigate, and resolve any issues associated with those calls.

In addition, the call center operator may enter free-form comments 3302 (see FIG. 33). Free-form comments 3302 provide the call center operator with the flexibility to enter any type of information. For example, the call center operator may enter actual words used by a rude order taker. Of course, comment codes 3202, free-form comments 3302, and any other field may be used together for information gathering. For example, a customer service agent of the broker 110 may be reviewing all records associated with rude order taker comment codes to see if a pattern exists as to who the order taker was and what the order taker said to the hotel guest.

Once the call is completed, the script window 508, 602 displays a message 3402 indicating the end of the script has been reached (see FIG. 34). At this point, the call center operator is free to handle another call for the broker 110 or any other client of the call center 106.

FIGS. 35-45 are a series of example screenshots associated with the script window 508, 602 for processing a status request from a hotel guest. Again, information identifying the call center operator is entered. The information identifying the call center operator may be entered by the call center operator, by the call center workstation 506, or by the broker web server 604. For example, the call center operator may enter his/her initials 1602 as shown in FIG. 35. Preferably, all of the information entered into the script window 508, 602 is stored in the database 510, 608.

In this example script, the script window 508, 602 displays the prompt 1604 to the call center operator instructing the call center operator to ask the caller, "Are you calling to place a room service order?" The call center operator is then given the drop-down box of choices 1606. In this example, the second choice 3502 is "STATUS OF DELIVERY." If the call center operator selects this choice 3502, "STATUS" 3602 is entered into the script window 508, 602 (and the database 510, 608) as shown in FIG. 36.

Next, the script window 508, 602 displays the prompt 1704 to the call center operator instructing the call center operator to ask the caller, "What's the extension number after the phone number on your menu?" The call center operator is then given the drop-down box of choices 1706. In this example, the choices 1706 are three digit numbers (or none). Of course, the call center operator may manually enter the extension and/or any other information described herein.

In FIG. 37, the script window 508, 602 displays the prompt 1802 to the call center operator instructing the call center operator to ask the caller, "What hotel are you calling from?" Again, the call center operator is given the drop-down box of choices 1804. Each choice in the list of choices 1804 includes a hotel name, a hotel address, and a hotel telephone number. The selected hotel 1902 is entered as shown in FIG. 38.

Next, the script window 508, 602 displays the prompt 1904 to the call center operator instructing the call center operator to ask the caller, "What is your hotel room/unit #?" The room number 1906 is then entered by the call center operator. In addition, the script window 508, 602 displays the prompt 1908 to the call center operator instructing the call center operator to ask the caller, "Are you a guest at the hotel?". In this case, the drop-down box of choices 1910 includes a "yes" choice 1912 and a "no" choice 1914. Again, as with all of the operator inputs, the choice is displayed in the script window 508, 602 and stored in the database 510, 608.

In FIG. 39, the script window 508, 602 displays the prompt 2002 to the call center operator instructing the call center operator to ask the caller for his/her first and last name. In addition, the call center operator is prompted 2004 to see if he/she should continue with the status request 2006, or if he/she would like to skip 2008 to a comment entering portion of the script. If the call center operator chooses to continue with the status request, the script window 508, 602 displays the confirmation page 2100 (see FIG. 40). The confirmation page 2100 prompts the call center operator to confirm the caller's room number 2102, hotel 2104, and phone number 2106.

Once the guest information is confirmed, the script window 508, 602 prompts 4102 the call center operator to tell the caller to please wait one moment while he/she is connected with their order taker (FIG. 41). The script window 508, 602 also displays a message 4104 prompting the call center operator to introduce himself/herself to the order taker and to tell the order taker he/she has a status inquiry from a specific person's name in a particular room number at a particular hotel. At this point, or after the call center operator discusses the situation with the order taker, the call center operator may chose to connect the caller to the order taker or to relay the answer to the caller. As shown in FIG. 42, the call center operator is then prompted 4202 to enter a comment 4204 describing the situation (e.g., the caller wondered where her order is and the restaurant indicated it is on its way).

In FIG. 43, the script window 508, 602 displays a prompt 4302 asking the call center operator to get the order taker's name 4304. The script window 508, 602 also displays a message 4306 instructing the call center operator to enter "REFUSED" if the order taker does not give his/her name. As shown in FIG. 44, if the issue appears to be resolved, the call center operator enters a "yes" response 4402 to a prompt 4404 asking if the issue is resolved. Otherwise, the call center operator enters a "no" response 4406 to the prompt 4404.

Once the call is completed, the script window 508, 602 displays a message 3402 indicating the end of the script has been reached (see FIG. 45). At this point, the call center operator is free to handle another call for the broker 110 or any other client of the call center 106.

FIGS. 46-63 are a series of example screenshots associated with the script window 508, 602 for adding to an order. The process for adding to an order is very similar to the process for taking an order described above with reference to FIGS. 16-34. As part of this process, information identifying the call center operator is entered. The information identifying the call center operator may be entered by the call center operator, by the call center workstation 506, or by the broker web server 604. For example, the call center operator may enter his/her initials 1602 as shown in FIG. 46. Preferably, all of the information entered into the script window 508, 602 is stored in the database 510, 608.

In this example script, the script window 508, 602 displays the prompt 1604 to the call center operator instructing the call center operator to ask the caller, "Are you calling to place a room service order?" The call center operator is then given the drop-down box of choices 1606. In this example, the third choice 4602 is "ADD TO ORDER." If the call center operator selects this choice 4602, "ADD" 4702 is entered into the script window 508, 602 (and the database 510, 608) as shown in FIG. 47.

Next, the script window 508, 602 displays the prompt 1704 to the call center operator instructing the call center operator to ask the caller, "What's the extension number after the phone number on your menu?" The call center operator is then given the drop-down box of choices 1706. In this example, the choices 1706 are three digit numbers (or none). Of course, the call center operator may manually enter the extension and/or any other information described herein.

In FIG. 48, the script window 508, 602 displays the prompt 1802 to the call center operator instructing the call center operator to ask the caller, "What hotel are you calling from?" Again, the call center operator is given the drop-down box of choices 1804. Each choice in the list of choices 1804 includes a hotel name, a hotel address, and a hotel telephone number. The selected hotel 1902 is entered as shown in FIG. 49.

Next, the script window 508, 602 displays the prompt 1904 to the call center operator instructing the call center operator to ask the caller, "What is your hotel room/unit #?" The room number 1906 is then entered by the call center operator. In addition, the script window 508, 602 displays a prompt 1908 to the call center operator instructing the call center operator to ask the caller, "Are you a guest at the hotel?" In this case, the drop-down box of choices 1910 includes a "yes" choice 1912 and a "no" choice 1914. Again, as with all of the operator inputs, the choice is displayed in the script window 508, 602 and stored in the database 510, 608.

In FIG. 50, the script window 508, 602 displays the prompt 2002 to the call center operator instructing the call center operator to ask the caller for his/her first and last name. In addition, the call center operator is prompted 2004 to see if he/she should continue with the order 2006, or if he/she would like to skip 2008 to a comment entering portion of the script. If the call center operator chooses to continue with the order, the script window 508, 602 displays a confirmation page 2100 (see FIG. 51). The confirmation page 2100 prompts the call center operator to confirm the caller's room number 2102, hotel 2104, and phone number 2106.

Once the guest information is confirmed, the script window 508, 602 prompts 2202 the call center operator to thank the caller for the order and to please remain on the line while he/she is connected with an order taker (FIG. 52). In addition, the script window 508, 602 displays the message 2204 reminding the call center operator to get the order taker's name (i.e., the name of the person at the restaurant 104). The script window 508, 602 also displays the message 2206 prompting the call center operator to introduce himself/herself to the order taker and to tell the order taker he/she has a room service order from a specific person's name in a particular room number at a particular hotel.

In addition, the script window 508, 602 displays the message 2208 prompting the call center operator to ask for the order taker's name and to remind the order taker to confirm the hotel and room number associated with the order. In FIG. 53, the script window 508, 602 asks the call center operator to confirm 2302 that the restaurant order taker did confirm the hotel and room number with the guest. Again, the call center operator is prompted 2402 to see if he/she should continue with the order 2404, or if he/she would like to skip 2406 to a comment entering portion of the script (see FIG. 54).

If the call center operator chooses to continue with the order, the script window 508, 602 displays the menu page 2500 with the food item selection menu 2502 (see FIG. 55). The food item selection menu 2502 displays a list of all of the food items specific to the menu for the restaurant 104 in the area 108 associated with the hotel 102 identified by the caller. Many of the food items are listed more than once under alternate titles in order to help the call center operator find the food items ordered by the caller. For example, a cheeseburger may be listed as "cheeseburger" and as "burger, with cheese."

When the caller orders adds a food item, the call center operator selects the food item from the food item selection menu 2502 (even though the order taker at the restaurant 104 actually taking the order for the purpose of preparation and delivery). Each time the call center operator selects a food item from the food item selection menu 2502, the script window 508, 602 preferably adds the food item 2602 to an order list 2604 and shows a more detailed view 2606 of the selected food item (see FIG. 56). The food item 2602 in the an order list 2604 preferably includes a unique item number 2608, a short description 2610, a price 2612, a quantity 2614, and a line item total 2616. The detailed view 2606 of the selected food preferably includes a detailed description of the food item. The detailed description helps resolve ambiguities in the order. For example, if the caller orders the 1 lb. brisket, a side of coleslaw, and a side of baked beans, the call center operator can see from the detailed description that the side dishes are included in the price of the brisket order. Similarly, if the caller in the previous example ordered three side dishes, the call center operator would know to add one side dish charge to the order because only two side dishes are included.

When the caller is finished ordering, the script window 508, 602 prompts 2702 the call center operator to enter the total price quoted to the caller by the restaurant order taker (see FIG. 57). This information is provided to the caller by the restaurant order taker and merely recorded by the call center operator. If the restaurant order taker does not provide a price quote, the call center operator is instructed to bypass the restaurant quote field 2704 by pressing enter.

FIG. 58 shows any discrepancy 2902 that may exist between the total price quoted by the restaurant order taker 2904 and the total price determined from the food item selections made by the call center operator 2906. Preferably, the amount of money due to the broker 110 is determined using the total price 2906 determined from the food item selections made by the call center operator. However, either total 2904, 2906 may be used to determine the amount of money due to the broker 110. Preferably, small discrepancies are ignored and large discrepancies are resolved after an investigation by the broker 110, the restaurant 104, and/or the call center 106. In this example, the restaurant 104 failed to provide a price quote (or the call center operator failed to enter it), therefore the discrepancy 2902 is the total amount 2906 determined from the food item selections made by the call center operator.

In addition to a price quote, the script window 508, 602 prompts 3002 the call center operator to enter a delivery time quote (e.g., 30 minutes) as shown in FIG. 59. Again, this information is provided to the caller by the restaurant order taker and merely recorded by the call center operator. If the restaurant order taker does not provide a delivery time quote, the call center operator may select "not quoted." This information may be used for customer service issues. For example, if a complaint is received about the delivery time, the broker may determine who is to blame based on the call time of the order, the call time of the complaint, and the delivery time quote. Restaurants 104 that receive a number of complaints above a predetermined threshold for a predetermined period of time may be warned and/or replaced by the broker 110.

In FIG. 60, the script window 508, 602 displays the prompt 3102 asking the call center operator to classify the call. For example, a call may be classified as a food order, a status check, a customer service issue, an addition to a previous order, or the cancellation of a previous order. By entering a code associated with the status of a call, the broker 110, the restaurant owner, and/or any other person with the appropriate access permission may quickly find certain types of calls in the database 510, 608. For example, a customer service agent of the broker 110 may wish to retrieve all customer service related calls from the previous day in order to follow up, investigate, and resolve any issues associated with those calls.

Similarly, the call center operator may enter a comment code 3202 (see FIG. 61). For example, the call center operator may enter a comment code 3202 indicating the hotel guest is wondering why their order has not arrived, indicating that the restaurant 104 was closed when it should have been open, indicating the restaurant 104 was closed because it was after their normal hours, indicating a caller complained about the food quality or service, indicating that the restaurant order taker needs training, indicating that the restaurant order taker was rude to the customer, etc. By entering a comment code 3202, the broker 110, the restaurant owner, and/or any other person with the appropriate access permission may quickly find certain types of calls in the database 510, 608. For example, a customer service agent of the broker 110 may wish to retrieve all complaint related calls from the previous day in order to follow up, investigate, and resolve any issues associated with those calls.

In addition, the call center operator may enter free form comments 3302 (see FIG. 62). Free-form comments 3302 provide the call center operator with the flexibility to enter any type of information. For example, the call center operator may enter actual words used by a rude order taker. Of course, comment codes 3202, free-form comments 3302, and any other field may be used together for information gathering. For example, a customer service agent of the broker 110 may be reviewing all records associated with rude order taker comment codes to see if a pattern exists as to who the order taker was and what the order taker said to the hotel guest.

Once the call is completed, the script window 508, 602 displays a message 3402 indicating the end of the script has been reached (see FIG. 63). At this point, the call center operator is free to handle another call for the broker 110 or any other client of the call center 106.

FIGS. 64-76 are a series of example screenshots associated with the script window 508, 602 for canceling an order. As part of this process, information identifying the call center operator is entered. The information identifying the call center operator may be entered by the call center operator, by the call center workstation 506, or by the broker web server 604. For example, the call center operator may enter his/her initials 1602 as shown in FIG. 64. Preferably, all of the information entered into the script window 508, 602 is stored in the database 510, 608.

In this example script, the script window 508, 602 displays the prompt 1604 to the call center operator instructing the call center operator to ask the caller, "Are you calling to place a room service order?" The call center operator is then given the drop-down box of choices 1606. In this example, the fourth choice 6402 is "CANCEL MY ORDER." If the call center operator selects this choice 6402, "CANCEL" 6502 is entered into the script window 508, 602 (and the database 510, 608) as shown in FIG. 65.

Next, the script window 508, 602 displays the prompt 1704 to the call center operator instructing the call center operator to ask the caller, "What's the extension number after the phone number on your menu?". The call center operator is then given the drop-down box of choices 1706. In this example, the choices 1706 are three digit numbers (or none). Of course, the call center operator may manually enter the extension and/or any other information described herein.

In FIG. 66, the script window 508, 602 displays the prompt 1802 to the call center operator instructing the call center operator to ask the caller, "What hotel are you calling from?" Again, the call center operator is given the drop-down box of choices 1804. Each choice in the list of choices 1804 includes a hotel name, a hotel address, and a hotel telephone number. The selected hotel 1902 is entered as shown in FIG. 67.

Next, the script window 508, 602 displays the prompt 1904 to the call center operator instructing the call center operator to ask the caller, "What is your hotel room/unit #?" The room number 1906 is then entered by the call center operator. In addition, the script window 508, 602 displays a prompt 1908 to the call center operator instructing the call center operator to ask the caller, "Are you a guest at the hotel?" In this case, the drop-down box of choices 1910 includes a "yes" choice 1912 and a "no" choice 1914. Again, as with all of the operator inputs, the choice is displayed in the script window 508, 602 and stored in the database 510, 608.

In FIG. 68, the script window 508, 602 displays the prompt 2002 to the call center operator instructing the call center operator to ask the caller for his/her first and last name. In addition, the call center operator is prompted 2004 to see if he/she should continue with the order 2006, or if he/she would like to skip 2008 to a comment entering portion of the script. If the call center operator chooses to continue with the order, the script window 508, 602 displays a confirmation page 2100 (see FIG. 69). The confirmation page 2100 prompts the call center operator to confirm the callers room number 2102, hotel 2104, and phone number 2106.

Once the guest information is confirmed, the script window 508, 602 prompts 7002 the call center operator for a cancellation reason (FIG. 70). If the reason for the cancellation is listed in an associated drop down list 7004 (e.g., delivery taking too long, changed mind, etc.), the call center operator selects that reason. If the reason for the cancellation is not listed in the associated drop down list 7004, the call center operator selects "other" and types in a specific reason given by the hotel guest (e.g., Guest forgot about dinner meeting).

In FIG. 71, the call center operator is prompted 7102 to thank the hotel guest and tell him/her that their order has been canceled. The call center operator is then prompted 7104 to hang up with the hotel guest, call the restaurant 104 associated with that area 108, and inform the restaurant 104 that there has been a cancellation. The call center operator identifies the canceled order to the restaurant 104 by hotel name and room number. In addition, the script window 508, 602 prompts 7202 the call center operator to get the name of the person at the restaurant 104 (FIG. 72).

If the restaurant delivery person received a cancellation reason from the hotel guest, that reason is also entered into the system via a drop-down list of choices 7302 (FIG. 73). Similarly, other comments from the restaurant delivery person may be entered via another drop-down list of choices 7402 (FIG. 74) and/or via a free-form text entry box 7502 (FIG. 75). Once the call is completed, the script window 508, 602 displays a message 7602 indicating the end of the script has been reached (see FIG. 76). At this point, the call center operator is free to handle another call for the broker 110 or any other client of the call center 106.

FIGS. 77-87 are a series of example screenshots associated with the script window 508, 602 for handling other types of calls (e.g., customer service calls). Again, information identifying the call center operator is entered by the call center operator, by the call center workstation 506, or by the broker web server 604. For example, the call center operator may enter his/her initials 1602 as shown in FIG. 77. Preferably, all of the information entered into the script window 508, 602 is stored in the database 510, 608.

In this example script, the script window 508, 602 displays the prompt 1604 to the call center operator instructing the call center operator to ask the caller, "Are you calling to place a room service order?" The call center operator is then given the drop-down box of choices 1606. In this example, the fifth choice 7702 is "OTHER." If the call center operator selects this choice 7702, "CUST SVC" 7802 is entered into the script window 508, 602 (and the database 510, 608) as shown in FIG. 78.

Next, the script window 508, 602 displays the prompt 1704 to the call center operator instructing the call center operator to ask the caller, "What's the extension number after the phone number on your menu?" The call center operator is then given the drop-down box of choices 1706. In this example, the choices 1706 are three digit numbers (or none).

Of course, the call center operator may manually enter the extension and/or any other information described herein.

In FIG. 79, the script window 508, 602 displays the prompt 1802 to the call center operator instructing the call center operator to ask the caller, "What hotel are you calling from?" Again, the call center operator is given the drop-down box of choices 1804. Each choice in the list of choices 1804 includes a hotel name, a hotel address, and a hotel telephone number. The selected hotel 1902 is entered as shown in FIG. 80.

Next, the script window 508, 602 displays the prompt 1904 to the call center operator instructing the call center operator to ask the caller, "What is your hotel room/unit #?" The room number 1906 is then entered by the call center operator. In addition, the script window 508, 602 displays a prompt 1908 to the call center operator instructing the call center operator to ask the caller, "Are you a guest at the hotel?" In this case, the drop-down box of choices 1910 includes a "yes" choice 1912 and a "no" choice 1914. Again, as with all of the operator inputs, the choice is displayed in the script window 508, 602 and stored in the database 510, 608.

In FIG. 81, the script window 508, 602 displays the prompt 2002 to the call center operator instructing the call center operator to ask the caller for his/her first and last name. In addition, the call center operator is prompted 2004 to see if he/she should continue with the order 2006, or if he/she would like to skip 2008 to a comment entering portion of the script. If the call center operator chooses to continue with the order, the script window 508, 602 displays a confirmation page 2100 (see FIG. 82). The confirmation page 2100 prompts the call center operator to confirm the caller's room number 2102, hotel 2104, and phone number 2106.

Once the guest information is confirmed, the script window 508, 602 prompts 4102 the call center operator to tell the caller to please wait one moment while he/she is connected with their order taker (FIG. 83). The script window 508, 602 also displays a message 4104 prompting the call center operator to introduce himself/herself to the order taker and to tell the order taker he/she has a status inquiry from a specific person's name in a particular room number at a particular hotel. At this point, or after the call center operator discusses the situation with the order taker, the call center operator may choose to connect the caller to the order taker or to relay the answer to the caller. As shown in FIG. 84, the call center operator is then prompted 4202 to enter a comment 8402 describing the situation (e.g., the hotel guest was double charged).

In FIG. 85, the script window 508, 602 displays a prompt 4302 asking the call center operator to get the order taker's name 4304. The script window 508, 602 also displays a message 4306 instructing the call center operator to enter "REFUSED" if the order taker does not give his/her name. As shown in FIG. 86, if the issue appears to be resolved, the call center operator enters a "yes" response 4402 to a prompt 4404 asking if the issue is resolved. Otherwise, the call center operator enters a "no" response 4406 to the prompt 4404.

Once the call is completed, the script window 508, 602 displays a message 3402 indicating the end of the script has been reached (see FIG. 87). At this point, the call center operator is free to handle another call for the broker 110 or any other client of the call center 106.

FIGS. 88-104 are a series of example screenshots associated with the script window 508, 602 for taking an order from a hotel employee. As part of this order taking process, information identifying the call center operator is entered. The information identifying the call center operator may be entered by the call center operator, by the call center workstation 506, or by the broker web server 604. For example, the call center operator may enter his/her initials 1602 as shown in FIG. 88. Preferably, all of the information entered into the script window 508, 602 is stored in the database 510, 608.

In this example script, the script window 508, 602 displays a prompt 1604 to the call center operator instructing the call center operator to ask the caller, "Are you calling to place a room service order?" The call center operator is then given a drop-down box of choices 1606. In this example, the first choice 1608 is "ORDER ROOM SERVICE." If the call center operator selects this choice 1608, "ORDER" 1702 is entered into the script window 508, 602 (and the database 510, 608) as shown in FIG. 89.

Next, the script window 508, 602 displays a prompt 1704 to the call center operator instructing the call center operator to ask the caller, "What's the extension number after the phone number on your menu?" The call center operator is then given a drop-down box of choices 1706. In this example, the choices 1706 are three digit numbers (or none). Of course, the call center operator may manually enter the extension and/or any other information described herein.

In FIG. 90, the script window 508, 602 displays a prompt 1802 to the call center operator instructing the call center operator to ask the caller, "What hotel are you calling from?" Again, the call center operator is given a drop-down box of choices 1804. Each choice in the list of choices 1804 includes a hotel name, a hotel address, and a hotel telephone number. The selected hotel 1902 is entered as shown in FIG. 91.

Next, the script window 508, 602 displays a prompt 1908 to the call center operator instructing the call center operator to ask the caller, "Are you a guest at the hotel?" In this case, the drop-down box of choices 1910 includes a "yes" choice 1912 and a "no" choice 1914. If the call center operator chooses the "no" choice 1914, "FRONT" is entered as the room number 9102.

In other words, this is not a hotel guest calling, it is an employee of the hotel. In one embodiment, hotel employees are given a discount (e.g., 50%) on room service orders as a perk and as a way to promote the service via the hotel employees. Preferably, the restaurant 104 agrees to cover the cost of this discount as part of their agreement to participate in the program. However, the broker 110 may agree to cover this cost during an initial time period (e.g., 90 days) in order to remove the burden of handling the large number of employee orders that may occur at the beginning of opening up a new area 108. In addition, the broker 110 may agree to cover this cost if the number of orders exceeds a predetermined threshold in a predetermined amount of time (e.g., if more than 2% of the orders are employee orders in any given month based on number of orders and/or dollars of orders).

In FIG. 92, the script window 508, 602 displays a prompt 2002 to the call center operator instructing the call center operator to ask the caller for his/her first and last name. In addition, the call center operator is prompted 2004 to see if he/she should continue with the order 2006, or if he/she would like to skip 2008 to a comment entering portion of the script. If the call center operator chooses to continue with the order, the script window 508, 602 displays a confirmation page 2100 (see FIG. 93). The confirmation page 2100 prompts the call center operator to confirm the caller's room number 2102, hotel 2104, and phone number 2106.

Once the guest information is confirmed, the script window 508, 602 prompts 2202 the call center operator to thank the caller for the order and to please remain on the line while he/she is connected with an order taker (FIG. 94). In addition, the script window 508, 602 displays a message 2204 reminding the call center operator to get the order taker's name (i.e., the name of the person at the restaurant 104). The script window 508, 602 also displays a message 2206 prompting the call center operator to introduce himself/herself to the order taker and to tell the order taker he/she has a room service order from a specific person's name in a particular room number at a particular hotel.

In addition, the script window 508, 602 displays a message 2208 prompting the call center operator to ask for the order taker's name and to remind the order taker to confirm the hotel and room number associated with the order. In FIG. 95, the script window 508, 602 asks the call center operator to confirm 2302 that the restaurant order taker did confirm the hotel and room number with the guest. Again, the call center operator is prompted 2402 to see if he/she should continue with the order 2404, or if he/she would like to skip 2406 to a comment entering portion of the script (see FIG. 96).

If the call center operator chooses to continue with the order, the script window 508, 602 displays a menu page 2500 with a food item selection menu 2502 (see FIG. 97). The food item selection menu 2502 displays a list of all of the food items specific to the menu for the restaurant 104 in the area 108 associated with the hotel 102 identified by the caller. Many of the food items are listed more than once under alternate titles in order to help the call center operator find the food items ordered by the caller. For example, a cheeseburger may be listed as "cheeseburger" and as "burger, with cheese."

When the caller orders a food item, the call center operator selects the food item from the food item selection menu 2502 (even though the order taker at the restaurant 104 actually taking the order for the purpose of preparation and delivery). Each time the call center operator selects a food item from the food item selection menu 2502, the script window 508, 602 preferably adds the food item 2602 to a order list 2604 (see FIG. 98). The food item 2602 in the order list 2604 preferably includes a unique item number 2608, a short description 2610, a price 2612, a quantity 2614, and a line item total 2616.

In addition, a detailed view (not shown) of the selected food preferably includes a detailed description of the food item. The detailed description helps resolve ambiguities in the order. For example, if the caller orders the 1 lb. brisket, a side of coleslaw, and a side of baked beans, the call center operator can see from the detailed description that the side dishes are included in the price of the brisket order. Similarly, if the caller in the previous example ordered three side dishes, the call center operator would know to add one side dish charge to the order because only two side dishes are included.

FIG. 99 shows any discrepancy 2902 that may exist between the total price quoted by the restaurant order taker 2904 and the total price determined from the food item selections made by the call center operator 2906. Preferably, the amount of money due to the broker 110 is determined using the total price determined from the food item selections made by the call center operator 2906. However, either total 2904, 2906 may be used to determine the amount of money due to the broker 110. Preferably, small discrepancies are ignored and large discrepancies are resolved after an investigation by the broker 110, the restaurant 104, and/or the call center 106.

In addition to a price quote, the script window 508, 602 prompts 3002 the call center operator to enter a delivery time quote (e.g., 30 minutes) as shown in FIG. 100. Again, this information is provided to the caller by the restaurant order taker and merely recorded by the call center operator. If the restaurant order taker does not provide a delivery time quote, the call center operator may select "not quoted." This information may be used for customer service issues. For example, if a complaint is received about the delivery time, the broker may determine who is to blame based on the call time of the order, the call time of the complaint, and the delivery time quote. Restaurants 104 that receive a number of complaints above a predetermined threshold for a predetermined period of time may be warned and/or replaced by the broker 110.

In FIG. 101, the script window 508, 602 displays a prompt 3102 asking the call center operator to classify the call. For example, a call may be classified as a food order, a status check, a customer service issue, an addition to a previous order, or the cancellation of a previous order. By entering a code associated with the status of a call, the broker 110, the restaurant owner, and/or any other person with the appropriate access permission may quickly find certain types of calls in the database 510, 608. For example, a customer service agent of the broker 110 may wish to retrieve all customer service related calls from the previous day in order to follow up, investigate, and resolve any issues associated with those calls.

Similarly, the call center operator may enter a comment code 3202 (see FIG. 102). For example, the call center operator may enter a comment code 3202 indicating the hotel guest is wondering why their order has not arrived, indicating that the restaurant 104 was closed when it should have been open, indicating the restaurant 104 was closed because it was after their normal hours, indicating a caller complained about the food quality or service, indicating that the restaurant order taker needs training, indicating that the restaurant order taker was rude to the customer, etc. By entering a comment code 3202, the broker 110, the restaurant owner, and/or any other person with the appropriate access permission may quickly find certain types of calls in the database 510, 608. For example, a customer service agent of the broker 110 may wish to retrieve all complaint related calls from the previous day in order to follow up, investigate, and resolve any issues associated with those calls.

In addition, the call center operator may enter free-form comments 3302 (see FIG. 103). Free-form comments 3302 provide the call center operator with the flexibility to enter any type of information. For example, the call center operator may enter actual words used by a rude order taker. Of course, comment codes 3202, free-form comments 3302, and any other field may be used together for information gathering. For example, a customer service agent of the broker 110 may be reviewing all records associated with rude order taker comment codes to see if a pattern exists as to who the order taker was and what the order taker said to the hotel guest.

Once the call is completed, the script window 508, 602 displays a message 3402 indicating the end of the script has been reached (see FIG. 104). At this point, the call center operator is free to handle another call for the broker 110 or any other client of the call center 106.

FIGS. 105-122 are a series of example screenshots associated with the script window 508, 602 for taking an order from a house. Menus for residential delivery may be the same as the menus described above, or they may be hybrid menus. For example, the broker 110 may create a menu including food items from a plurality of different restaurants. Preferably, each of the plurality of restaurants already operates a food delivery service. These menus may then be mailed to a plurality of homes. Under this arrangement, the restaurants may pay the food service broker a fee based on a number of food orders received and/or a periodic broker fee. Preferably, these menus do not include a markup.

As part of this order taking process, information identifying the call center operator is entered. The information identifying the call center operator may be entered by the call center operator, by the call center workstation 506, or by the broker web server 604. For example, the call center operator may enter his/her initials 1602 as shown in FIG. 105. Preferably, all of the information entered into the script window 508, 602 is stored in the database 510, 608.

In this example script, the script window 508, 602 displays a prompt 1604 to the call center operator instructing the call center operator to ask the caller, "Are you calling to place a room service order?" The call center operator is then given a drop-down box of choices 1606. In this example, the first choice 1608 is "ORDER ROOM SERVICE." If the call center operator selects this choice 1608, "ORDER" 1702 is entered into the script window 508, 602 (and the database 510, 608) as shown in FIG. 106.

Next, the script window 508, 602 displays a prompt 1704 to the call center operator instructing the call center operator to ask the caller, "What's the extension number after the phone number on your menu?" The call center operator is then given a drop-down box of choices 1706. In this example, the choices 1706 are three digit numbers (or none). Of course, the call center operator may manually enter the extension and/or any other information described herein.

In FIG. 107, the script window 508, 602 displays a prompt 1802 to the call center operator instructing the call center operator to ask the caller, "What hotel are you calling from?" Again, the call center operator is given a drop-down box of choices 1804. Each choice in the list of choices 1804 includes a hotel name, a hotel address, and a hotel telephone number. In addition, the list of choices 1804 includes a "house delivery" option 10702. If the "house delivery" option 10702 is selected, "HOUSE DELIVERY (PUT ADDRESS IN COMMENT FIELD)" 10802 is entered as shown in FIG. 108.

The "house delivery" option 10702 may be used to differentiate delivery to non-rented homes, rented homes, non-rented condominiums, rented condominiums, etc. from delivery to hotel rooms. One reason for this distinction is that additional address information not already stored in the database 510, 608 may be required to complete the delivery. Another reason for this distinction is the potential lack of a "front desk" telephone number used to resolve problems with the room service order.

Next, the script window 508, 602 displays a prompt 1904 to the call center operator instructing the call center operator to ask the caller, "What is your hotel room/unit #?" If there is a unit number associated with the home/condo, the unit number 1906 is entered by the call center operator. In addition, the script window 508, 602 displays a prompt 1908 to the call center operator instructing the call center operator to ask the caller, "Are you a guest?" In this case, the drop-down box of choices 1910 includes a "yes" choice 1912 and a "no" choice 1914. Again, as with all of the operator inputs, the choice is displayed in the script window 508, 602 and stored in the database 510, 608.

Because "home" deliveries may have problems that cannot be corrected via a front desk telephone number, the script window 508, 602 displays a prompt 10902 to the call center operator instructing the call center operator to ask the caller, "What number can we reach you at in the event we need to contact you?" In addition, the prompt 10902 instructs the call center operator to use the caller identification information associated with the call if the caller does not know the number he is calling from. The phone number given by the caller is preferred over the caller identification information, because the caller may be using a cellular phone or the call may have been routed via a switch.

In FIG. 110, the script window 508, 602 displays a prompt 2002 to the call center operator instructing the call center operator to ask the caller for his/her first and last name. In addition, the call center operator is prompted 2004 to see if he/she should continue with the order 2006, or if he/she would like to skip 2008 to a comment entering portion of the script. If the call center operator chooses to continue with the order, the script window 508, 602 displays a confirmation page 2100 (see FIG. 111). The confirmation page 2100 prompts the call center operator to confirm the callers room number 2102 (if any) and reminds 11102 the call center operator that this is a home delivery. Therefore, the address needs to be entered (e.g., in the comment field).

Once the guest information is confirmed, the script window 508, 602 prompts 2202 the call center operator to thank the caller for the order and to please remain on the line while he/she is connected with an order taker (FIG. 112). In addition, the script window 508, 602 displays a message 2204 reminding the call center operator to get the order taker's name (i.e., the name of the person at the restaurant 104). The script window 508, 602 also displays a message 2206 prompting the call center operator to introduce himself/herself to the order taker and to tell the order taker he/she has room service order from a specific person's name for home delivery.

In addition, the script window 508, 602 displays a message 2208 prompting the call center operator to ask for the order taker's name and to remind the order taker to confirm the address associated with the order. In FIG. 113, the script window 508, 602 asks the call center operator to confirm 2302 that the restaurant order taker did confirm the address associated with the order. Again, the call center operator is prompted 2402 to see if he/she should continue with the order 2404, or if he/she would like to skip 2406 to a comment entering portion of the script (see FIG. 114).

If the call center operator chooses to continue with the order, the script window 508, 602 displays a menu page 2500 with a food item selection menu 2502 (see FIG. 115). The food item selection menu 2502 displays a list of all of the food items specific to the menu for the restaurant 104 in the area 108 associated with the hotel 102 identified by the caller. Many of the food items are listed more than once under alternate titles in order to help the call center operator find the food items ordered by the caller. For example, a cheeseburger may be listed as "cheeseburger" and as "burger, with cheese."

When the caller orders a food item, the call center operator selects the food item from the food item selection menu 2502 (even though the order taker at the restaurant 104 actually taking the order for the purpose of preparation and delivery). Each time the call center operator selects a food item from the food item selection menu 2502, the script window 508, 602 preferably adds the food item 2602 to a order list 2604 (see FIG. 116). The food item 2602 in the order list 2604 preferably includes a unique item number 2608, a short description 2610, a price 2612, a quantity 2614, and a line item total 2616. In addition, the script window 508, 602 prompts 2802 the call center operator to select the type of payment (e.g., cash, credit, unknown, travelers check, airline voucher, etc.).

FIG. 117 shows any discrepancy 2902 that may exist between the total price quoted by the restaurant order taker 2904 and the total price determined from the food item selections made by the call center operator 2906. Preferably, the amount of money due to the broker 110 is determined using the total price determined from the food item selections made by the call center operator 2906. However, either total 2904, 2906 may be used to determine the amount of money due to the broker 110. Preferably, small discrepancies are ignored and large discrepancies are resolved after an investigation by the broker 110, the restaurant 104, and/or the call center 106.

In addition to a price quote, the script window 508, 602 prompts 3002 the call center operator to enter a delivery time quote (e.g., 30 minutes) as shown in FIG. 118. Again, this information is provided to the caller by the restaurant order taker and merely recorded by the call center operator. If the restaurant order taker does not provide a delivery time quote, the call center operator may select "not quoted." This information may be used for customer service issues. For example, if a complaint is received about the delivery time, the broker may determine who is to blame based on the call time of the order, the call time of the complaint, and the delivery time quote. Restaurants 104 that receive a number of complaints above a predetermined threshold for a predetermined period of time may be warned and/or replaced by the broker 110.

In FIG. 119, the script window 508, 602 displays a prompt 3102 asking the call center operator to classify the call. For example, a call may be classified as a food order, a status check, a customer service issue, an addition to a previous order, or the cancellation of a previous order. By entering a code associated with the status of a call, the broker 110, the restaurant owner, and/or any other person with the appropriate access permission may quickly find certain types of calls in the database 510, 608. For example, a customer service agent of the broker 110 may wish to retrieve all customer service related calls from the previous day in order to follow up, investigate, and resolve any issues associated with those calls.

Similarly, the call center operator may enter a comment code 3202 (see FIG. 120). For example, the call center operator may enter a comment code 3202 indicating the hotel guest is wondering why their order has not arrived, indicating that the restaurant 104 was closed when it should have been open, indicating the restaurant 104 was closed because it was after their normal hours, indicating a caller complained about the food quality or service, indicating that the restaurant order taker needs training, indicating that the restaurant order taker was rude to the customer, etc. By entering a comment code 3202, the broker 110, the restaurant owner, and/or any other person with the appropriate access permission may quickly find certain types of calls in the database 510, 608. For example, a customer service agent of the broker 110 may wish to retrieve all complaint-related calls from the previous day in order to follow up, investigate, and resolve any issues associated with those calls.

Because this is a home delivery, the call center operator enters the address of the customer manually. For example, the call center operator may enter the address of the customer 12102 in the comment field as shown in FIG. 121. Of course, a dedicated address field could also be used.

Once the call is completed, the script window 508, 602 displays a message 3402 indicating the end of the script has been reached (see FIG. 34). At this point, the call center operator is free to handle another call for the broker 110 or any other client of the call center 106.

In summary, persons of ordinary skill in the art will readily appreciate that methods and apparatus for brokering services have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of providing food delivery associated with a hotel room service menu, the method comprising:
   supplying information for a food menu, the food menu bearing (i) a toll-free telephone number used to connect to a call center and (ii) a restaurant identifier;
   receiving a call to an order taker at a restaurant from a hotel guest via a call center associated with the toll-free telephone number;
   preparing a digital audio recording of at least a portion of a verbal exchange between the order taker and the hotel guest during said call;
   delivering at least one food item associated with the verbal exchange from the restaurant to the hotel guest; and
   transferring funds from a first account associated with the restaurant to a second account associated with a food services broker in an amount based on information in the digital audio recording.

2. A method as defined in claim 1, wherein the call center plays a recorded message to a hotel guest.

3. A method as defined in claim 2, wherein the call center connects the hotel guest to the first restaurant in response to the hotel guest entering a number associated with the first restaurant.

4. A method as defined in claim 3, wherein the call center makes a digital audio recording of a conversation between a hotel guest and a restaurant order taker.

5. A method as defined in claim 4, wherein the call center sends the digital audio recording to a food broker.

6. A method as defined in claim 1, wherein the call center connects a hotel guest to the first restaurant in response to the hotel guest entering a number associated with the first restaurant.

7. A method as defined in claim 1, wherein the call center makes a digital audio recording of a conversation between a hotel guest and a restaurant order taker.

8. A method as defined in claim 1, wherein the call center records data related to brokerage fees.

9. A method as defined in claim 1, wherein the call center records data related to customer service.

10. A method as defined in claim 1, wherein the call center records an estimated delivery time.

11. A method as defined in claim 1, wherein the call center records order taker comments.

12. A method as defined in claim 1, wherein the call center records a complaint call from a hotel guest.

13. A method as defined in claim 1, wherein the call center records a food item ordered by a hotel guest.

14. A method as defined in claim 13, wherein the record of the food item ordered by the hotel guest is used to calculate a cut owed to a food broker.

15. A method as defined in claim 1, wherein the call center records a price quoted by a restaurant order taker.

16. A method as defined in claim 15, wherein the record of the price quoted by the restaurant order taker is used to calculate a cut owed to the food brokering operation.

17. A method as defined in claim 1, wherein the call center plays a prerecorded message informing a hotel guest that the first restaurant is closed.

18. A method as defined in claim 1, wherein a live operator at the call center monitors a verbal exchange associated with a food order between an order taker at the first restaurant and a guest at the first hotel.

19. A method as defined in claim 1, wherein the first menu includes a plurality of prices associated with the first food items, the plurality of prices being marked up relative to a plurality of corresponding restaurant prices associated with (i) the first food items and (ii) the first restaurant.

20. A method as defined in claim 19, wherein the plurality of prices are marked up by a particular percentage.

21. A method as defined in claim 19, wherein the plurality of prices are not marked up by a particular percentage, the plurality of prices being marked up by different percentage amounts.

* * * * *